United States Patent
Gada et al.

(10) Patent No.: US 11,227,599 B2
(45) Date of Patent: Jan. 18, 2022

(54) METHODS AND USER INTERFACES FOR VOICE-BASED CONTROL OF ELECTRONIC DEVICES

(71) Applicant: Apple Inc., Cupertino, CA (US)

(72) Inventors: Jigar Vasant Gada, Sunnyvale, CA (US); Mosab Hatem Elagha, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,603

(22) Filed: May 29, 2020

(65) Prior Publication Data

US 2020/0379728 A1     Dec. 3, 2020

Related U.S. Application Data

(60) Provisional application No. 62/856,044, filed on Jun. 1, 2019.

(51) Int. Cl.
*G06F 3/16*      (2006.01)
*G06F 3/048*     (2013.01)
*G10L 15/22*     (2006.01)

(52) U.S. Cl.
CPC .............. *G10L 15/22* (2013.01); *G06F 3/167* (2013.01)

(58) Field of Classification Search
CPC ........... G10L 15/22; G06F 3/167; G06F 3/048
See application file for complete search history.

(56) References Cited

U.S. PATENT DOCUMENTS

| | | | |
|---|---|---|---|
| 7,599,918 B2 | 10/2009 | Shen et al. | |
| 7,698,131 B2 | 4/2010 | Bennett | |
| 7,725,320 B2 | 5/2010 | Bennett | |
| 7,725,321 B2 | 5/2010 | Bennett | |
| 7,778,632 B2 | 8/2010 | Kurlander et al. | |
| 7,779,357 B2 | 8/2010 | Naik | |
| 7,809,569 B2 | 10/2010 | Attwater et al. | |
| 8,898,568 B2 | 11/2014 | Bull et al. | |
| 9,245,151 B2 * | 1/2016 | LeBeau ................... G06F 21/70 |
| 10,346,753 B2 | 7/2019 | Soon-Shiong et al. | |
| 2010/0064218 A1 | 3/2010 | Bull et al. | |
| 2010/0217604 A1 | 8/2010 | Baldwin et al. | |
| 2012/0295708 A1 | 11/2012 | Hernandez-Abrego et al. | |
| 2013/0185059 A1 | 7/2013 | Riccardi | |
| 2013/0316679 A1 | 11/2013 | Miller et al. | |

(Continued)

FOREIGN PATENT DOCUMENTS

CN     104951077 A     9/2015

OTHER PUBLICATIONS

Ashbrook, Daniel L., "Enabling Mobile Micro interactions", May 2010, 186 pages.

(Continued)

*Primary Examiner* — Hugo Molina

(74) *Attorney, Agent, or Firm* — Dentons US LLP

(57) ABSTRACT

The present disclosure generally relates to voice-control for electronic devices. In some embodiments, the method includes, in response to detecting a plurality of utterances, associating the plurality of operations with a first stored operation set and detecting a second set of one or more inputs corresponding to a request to perform the operations associated with the first stored operation set; and performing the plurality of operations associated with the first stored operation set, in the respective order.

18 Claims, 74 Drawing Sheets

(56) References Cited

U.S. PATENT DOCUMENTS

| | | | |
|---|---|---|---|
| 2013/0322634 A1 | 12/2013 | Bennett et al. | |
| 2014/0214429 A1 | 7/2014 | Pantel | |
| 2014/0330560 A1* | 11/2014 | Venkatesha | G10L 15/26 704/235 |
| 2014/0350924 A1* | 11/2014 | Zurek | G10L 15/20 704/231 |
| 2015/0082180 A1* | 3/2015 | Ames | G06F 3/04815 715/738 |
| 2015/0106085 A1* | 4/2015 | Lindahl | G06F 3/167 704/231 |
| 2015/0120641 A1 | 4/2015 | Soon-Shiong et al. | |
| 2016/0005320 A1 | 1/2016 | DeCharms et al. | |
| 2016/0217794 A1* | 7/2016 | Imoto | G06K 9/00604 |
| 2017/0242478 A1* | 8/2017 | Ma | H04N 9/3147 |
| 2017/0262051 A1* | 9/2017 | Tall | G06F 3/04842 |
| 2018/0165857 A1* | 6/2018 | Lee | G06T 11/60 |
| 2018/0336184 A1 | 11/2018 | Bellegarda et al. | |
| 2019/0129499 A1* | 5/2019 | Li | G06F 3/0481 |
| 2019/0369748 A1 | 12/2019 | Hindi et al. | |
| 2020/0285327 A1 | 9/2020 | Hindi et al. | |

OTHER PUBLICATIONS

Bell, Jason, "Machine Learning Hands-on for Developers and Technical Professionals", Wiley, 2014, 82 pages.
Coulouris et al., "Distributed Systems: Concepts and Design (Fifth Edition)", Addison-Wesley, 2012, 391 pages.
Findlater et al., "Beyond QWERTY: Augmenting Touch-Screen Keyboards with MultiTouch Gestures for Non-Alphanumeric Input", CHI '12, May 5-10, 2012, 4 pages.
Gupta, Naresh, "Inside Bluetooth Low Energy", Artech House, 2013, 274 pages.
Loukides et al., "What Is the Internet of Things?", O'Reilly Media, Inc., Online Available at: <https://www.oreilly.com/library/view/what-is-the/9781491975633/>, 2015, 31 pages.
Nakamura Satoshi, "Overcoming the Language Barrier with Speech Translation Technology", Science & Technology Trends, Quarterly Review No. 31, Apr. 2009, pp. 36-49.
Navigli Roberto, "Word Sense Disambiguation: A Survey", ACM Computing Surveys, vol. 41, No. 2, Article 10, Feb. 2009, 69 pages.
Phoenix Solutions, Inc., "Declaration of Christopher Schmandt Regarding the MIT Galaxy System", West Interactive Corp., A Delaware Corporation, Document 40, Jul. 2, 2010, 162 pages.
Rowland et al., "Designing Connected Products: UX for the Consumer Internet of Things", O'Reilly, May 2015, 452 pages.
Samsung, "SGH-a885 Series—Portable Quad-Band Mobile Phone-User Manual", Retrieved from the Internet http://web.archive.org/web/20100106113758/http://www.comparecellular.com/images/phones/userguide1896.pdf, Jan. 1, 2009, 144 pages.
Seroter et al., "SOA Patterns with BizTalk Server 2013 and Microsoft Azure", Packt Publishing, Jun. 2015, 454 pages.
Tur et al., "The CALO Meeting Assistant System", IEEE Transactions on Audio, Speech, and Language Processing, vol. 18, No. 6, Aug. 2010, pp. 1601-1611.
Wang et al., "End-to-end Anchored Speech Recognition", Proc. ICASSP2019, May 12-17, 2019, 5 pages.

* cited by examiner

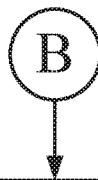

1524
In response to detecting the first set of one or more inputs, display a second iteration of the grid overlay that includes:

1526
A second number of columns

1528
A second number of rows

1530
A second number of cells formed by the columns and rows that is different from the first number of cells, including:

1532
A third cell corresponding to a third location of the first user interface different from the first location, the third cell including the displayed first alphanumeric text string 1534
A fourth cell corresponding to a fourth location of the first user interface different from the second location, the fourth cell including the displayed second alphanumeric text string

*FIG. 15C*

METHODS AND USER INTERFACES FOR VOICE-BASED CONTROL OF ELECTRONIC DEVICES

CROSS-REFERENCE TO RELATED APPLICATIONS

This application claims priority to U.S. Provisional Patent Application No. 62/856,044, entitled "METHODS AND USER INTERFACES FOR VOICE-BASED CONTROL OF ELECTRONIC DEVICES," filed Jun. 1, 2019, the contents of which is hereby incorporated by reference in its entirety.

FIELD

The present disclosure relates generally to methods and computer user interfaces for control of electronic devices, and more specifically to techniques for voice-based control of electronic devices.

BACKGROUND

User interfaces provide users of electronic devices with various methods and modalities for controlling electronic devices, such as computing devices and mobile devices. User interfaces can be based on keyboard and pointer device models, touch-based models, and voice-based models for controlling electronic devices.

BRIEF SUMMARY

Some techniques for voice-based control of electronic devices, however, are generally cumbersome and inefficient. For example, some existing techniques use a complex and time-consuming commands, which may include elaborate or repeated commands to perform common functions. Existing techniques require more time than necessary, wasting user time and device energy. This latter consideration is particularly important in battery-operated devices.

Accordingly, the present technique provides electronic devices with faster, more efficient methods and interfaces for voice-based control of electronic devices. Such methods and interfaces optionally complement or replace other methods for voice-based control of electronic devices. Such methods and interfaces reduce the cognitive burden on a user and produce a more efficient human-machine interface. Such methods further allow for more precise voice-based control, with more precise and effective inputs as well as less unintentional inputs. For battery-operated computing devices, such methods and interfaces conserve power and increase the time between battery charges.

In accordance with some embodiments, a method is described. In some embodiments, the method is performed at an electronic device with a display device and a microphone. In some embodiments, the method comprises: while the electronic device is in a first mode, detecting a first set of one or more inputs including detecting, in a respective order and via the microphone, a plurality of utterances corresponding to a plurality of operations, including: a first utterance corresponding to a request to perform a first operation; and a second utterance corresponding to a request to perform a second operation, detected after the first utterance; in response to detecting the plurality of utterances, associating the plurality of operations with a first stored operation set; after detecting the plurality of utterances, detecting a second set of one or more inputs corresponding to a request to perform the operations associated with the first stored operation set; and in response to detecting the second set of one or more inputs: in accordance with a determination that a set of performance criteria are met, performing the plurality of operations associated with the first stored operation set, in the respective order; and in accordance with a determination that a set of performance criteria are not met, forgoing performing the plurality of operations associated with the first stored operation set.

In accordance with some embodiments, a non-transitory computer-readable storage medium storing one or more programs configured to be executed by one or more processors of an electronic device with a display device and a microphone is described. In some embodiments, the one or more programs include instructions for: while the electronic device is in a first mode, detecting a first set of one or more inputs including detecting, in a respective order and via the microphone, a plurality of utterances corresponding to a plurality of operations, including: a first utterance corresponding to a request to perform a first operation; and a second utterance corresponding to a request to perform a second operation, detected after the first utterance; in response to detecting the plurality of utterances, associating the plurality of operations with a first stored operation set; after detecting the plurality of utterances, detecting a second set of one or more inputs corresponding to a request to perform the operations associated with the first stored operation set; and in response to detecting the second set of one or more inputs: in accordance with a determination that a set of performance criteria are met, performing the plurality of operations associated with the first stored operation set, in the respective order; and in accordance with a determination that a set of performance criteria are not met, forgoing performing the plurality of operations associated with the first stored operation set.

In accordance with some embodiments, a transitory computer-readable storage medium storing one or more programs configured to be executed by one or more processors of an electronic device with a display device and a microphone is described. In some embodiments, the one or more programs include instructions for: while the electronic device is in a first mode, detecting a first set of one or more inputs including detecting, in a respective order and via the microphone, a plurality of utterances corresponding to a plurality of operations, including: a first utterance corresponding to a request to perform a first operation; and a second utterance corresponding to a request to perform a second operation, detected after the first utterance; in response to detecting the plurality of utterances, associating the plurality of operations with a first stored operation set; after detecting the plurality of utterances, detecting a second set of one or more inputs corresponding to a request to perform the operations associated with the first stored operation set; and in response to detecting the second set of one or more inputs: in accordance with a determination that a set of performance criteria are met, performing the plurality of operations associated with the first stored operation set, in the respective order; and in accordance with a determination that a set of performance criteria are not met, forgoing performing the plurality of operations associated with the first stored operation set.

In accordance with some embodiments, an electronic device is described. In some embodiments, the electronic device includes: a display device; a microphone; one or more processors; and memory storing one or more programs configured to be executed by the one or more processors, the one or more programs including instructions for: while the electronic device is in a first mode, detecting a first set of one or more inputs including detecting, in a respective order and via the microphone, a plurality of utterances corresponding to a plurality of operations, including: a first utterance corresponding to a request to perform a first operation; and a second utterance corresponding to a request to perform a second operation, detected after the first utterance; in response to detecting the plurality of utterances, associating the plurality of operations with a first stored operation set; after detecting the plurality of utterances, detecting a second set of one or more inputs corresponding to a request to perform the operations associated with the first stored operation set; and in response to detecting the second set of one or more inputs: in accordance with a determination that a set of performance criteria are met, performing the plurality of operations associated with the first stored operation set, in the respective order; and in accordance with a determination that a set of performance criteria are not met, forgoing performing the plurality of operations associated with the first stored operation set.

In accordance with some embodiments, an electronic device is described. In some embodiments, the electronic device includes: a display device; a microphone; and means, while the electronic device is in a first mode, for detecting a first set of one or more inputs including detecting, in a respective order and via the microphone, a plurality of utterances corresponding to a plurality of operations, including: a first utterance corresponding to a request to perform a first operation; and a second utterance corresponding to a request to perform a second operation, detected after the first utterance; means, to detecting the plurality of utterances, responsive to associating the plurality of operations with a first stored operation set; means, after detecting the plurality of utterances, for detecting a second set of one or more inputs corresponding to a request to perform the operations associated with the first stored operation set; and means, responsive to detecting the second set of one or more inputs, for: in accordance with a determination that a set of performance criteria are met, performing the plurality of operations associated with the first stored operation set, in the respective order; and in accordance with a determination that a set of performance criteria are not met, forgoing performing the plurality of operations associated with the first stored operation set.

In accordance with some embodiments, a method is described. In some embodiments, the method is performed at an electronic device with a display device and a microphone. In some embodiments, the method comprises: displaying, via the display device, a first user interface; while displaying the first user interface and at a first time, detecting, via the microphone, a first utterance; and in response to detecting the first utterance: in accordance with a determination that a set of performance criteria are met, the set of performance criteria including a criterion that is met when the first utterance corresponds to a first operation, performing the first operation; and in accordance with a determination that the set of performance criteria are not met, displaying, in the first user interface, displaying a suggestion graphical object that includes a first text utterance suggestion corresponding to a second utterance that, when detected via the microphone, causes a second operation to be performed, where the first text utterance suggestion is selected based on a context of the first user interface at the first time and based on the first utterance.

In accordance with some embodiments, a non-transitory computer-readable storage medium storing one or more programs configured to be executed by one or more processors of an electronic device with a display device and a microphone is described. In some embodiments, the one or more programs include instructions for: displaying, via the display device, a first user interface; while displaying the first user interface and at a first time, detecting, via the microphone, a first utterance; and in response to detecting the first utterance: in accordance with a determination that a set of performance criteria are met, the set of performance criteria including a criterion that is met when the first utterance corresponds to a first operation, performing the first operation; and in accordance with a determination that the set of performance criteria are not met, displaying, in the first user interface, displaying a suggestion graphical object that includes a first text utterance suggestion corresponding to a second utterance that, when detected via the microphone, causes a second operation to be performed, where the first text utterance suggestion is selected based on a context of the first user interface at the first time and based on the first utterance.

In accordance with some embodiments, a transitory computer-readable storage medium storing one or more programs configured to be executed by one or more processors of an electronic device with a display device and a microphone is described. In some embodiments, the one or more programs include instructions for: displaying, via the display device, a first user interface; while displaying the first user interface and at a first time, detecting, via the microphone, a first utterance; and in response to detecting the first utterance: in accordance with a determination that a set of performance criteria are met, the set of performance criteria including a criterion that is met when the first utterance corresponds to a first operation, performing the first operation; and in accordance with a determination that the set of performance criteria are not met, displaying, in the first user interface, displaying a suggestion graphical object that includes a first text utterance suggestion corresponding to a second utterance that, when detected via the microphone, causes a second operation to be performed, where the first text utterance suggestion is selected based on a context of the first user interface at the first time and based on the first utterance.

In accordance with some embodiments, an electronic device is described. In some embodiments, the electronic device includes: a display device; a microphone; one or more processors; and memory storing one or more programs configured to be executed by the one or more processors, the one or more programs including instructions for: displaying, via the display device, a first user interface; while displaying the first user interface and at a first time, detecting, via the microphone, a first utterance; and in response to detecting the first utterance: in accordance with a determination that a set of performance criteria are met, the set of performance criteria including a criterion that is met when the first utterance corresponds to a first operation, performing the first operation; and in accordance with a determination that the set of performance criteria are not met, displaying, in the first user interface, displaying a suggestion graphical object that includes a first text utterance suggestion corresponding to a second utterance that, when detected via the microphone, causes a second operation to be performed, where the first text utterance suggestion is selected based on a context of the first user interface at the first time and based on the first utterance.

In accordance with some embodiments, an electronic device is described. In some embodiments, the electronic device includes: a display device; a microphone; and means for displaying, via the display device, a first user interface;

means, while displaying the first user interface and at a first time, for detecting, via the microphone, a first utterance; and means, responsive to detecting the first utterance, for: in accordance with a determination that a set of performance criteria are met, the set of performance criteria including a criterion that is met when the first utterance corresponds to a first operation, performing the first operation; and in accordance with a determination that the set of performance criteria are not met, displaying, in the first user interface, displaying a suggestion graphical object that includes a first text utterance suggestion corresponding to a second utterance that, when detected via the microphone, causes a second operation to be performed, where the first text utterance suggestion is selected based on a context of the first user interface at the first time and based on the first utterance.

In accordance with some embodiments, a method is described. In some embodiments, the method is performed at an electronic device with a display device and a microphone. In some embodiments, the method comprises: displaying, via the display device, a first user interface that includes a plurality of affordances, including: a first affordance at a first location that, when selected, performs a first operation; and a second affordance at a second location that, when selected, performs a second operation; while displaying the first user interface, detecting, via the microphone, a first utterance; in response to detecting the first utterance, displaying: a first text object that includes a first text string at or near the first location; and a second text object that includes a second text string at or near the second location; while displaying the first text object and the second text object, detecting, via the microphone, a second utterance; and in response to detecting the second utterance: in accordance with a determination that the second utterance includes the first text string, performing the first operation; and in accordance with a determination that the second utterance includes the second text string, performing the second operation.

In accordance with some embodiments, a non-transitory computer-readable storage medium storing one or more programs configured to be executed by one or more processors of an electronic device with a display device and a microphone is described. In some embodiments, the one or more programs include instructions for: displaying, via the display device, a first user interface that includes a plurality of affordances, including: a first affordance at a first location that, when selected, performs a first operation; and a second affordance at a second location that, when selected, performs a second operation; while displaying the first user interface, detecting, via the microphone, a first utterance; in response to detecting the first utterance, displaying: a first text object that includes a first text string at or near the first location; and a second text object that includes a second text string at or near the second location; while displaying the first text object and the second text object, detecting, via the microphone, a second utterance; and in response to detecting the second utterance: in accordance with a determination that the second utterance includes the first text string, performing the first operation; and in accordance with a determination that the second utterance includes the second text string, performing the second operation.

In accordance with some embodiments, a transitory computer-readable storage medium storing one or more programs configured to be executed by one or more processors of an electronic device with a display device and a microphone is described. In some embodiments, the one or more programs include instructions for: displaying, via the display device, a first user interface that includes a plurality of affordances, including: a first affordance at a first location that, when selected, performs a first operation; and a second affordance at a second location that, when selected, performs a second operation; while displaying the first user interface, detecting, via the microphone, a first utterance; in response to detecting the first utterance, displaying: a first text object that includes a first text string at or near the first location; and a second text object that includes a second text string at or near the second location; while displaying the first text object and the second text object, detecting, via the microphone, a second utterance; and in response to detecting the second utterance: in accordance with a determination that the second utterance includes the first text string, performing the first operation; and in accordance with a determination that the second utterance includes the second text string, performing the second operation.

In accordance with some embodiments, an electronic device is described. In some embodiments, the electronic device includes: a display device; a microphone; one or more processors; and memory storing one or more programs configured to be executed by the one or more processors, the one or more programs including instructions for: displaying, via the display device, a first user interface that includes a plurality of affordances, including: a first affordance at a first location that, when selected, performs a first operation; and a second affordance at a second location that, when selected, performs a second operation; while displaying the first user interface, detecting, via the microphone, a first utterance; in response to detecting the first utterance, displaying: a first text object that includes a first text string at or near the first location; and a second text object that includes a second text string at or near the second location; while displaying the first text object and the second text object, detecting, via the microphone, a second utterance; and in response to detecting the second utterance: in accordance with a determination that the second utterance includes the first text string, performing the first operation; and in accordance with a determination that the second utterance includes the second text string, performing the second operation.

In accordance with some embodiments, an electronic device is described. In some embodiments, the electronic device includes: a display device; a microphone; and means for displaying, via the display device, a first user interface that includes a plurality of affordances, including: a first affordance at a first location that, when selected, performs a first operation; and a second affordance at a second location that, when selected, performs a second operation; means, while displaying the first user interface, for detecting, via the microphone, a first utterance; means, responsive to detecting the first utterance, for displaying: a first text object that includes a first text string at or near the first location; and a second text object that includes a second text string at or near the second location; means, while displaying the first text object and the second text object, for detecting, via the microphone, a second utterance; and means, responsive to detecting the second utterance, for: in accordance with a determination that the second utterance includes the first text string, performing the first operation; and in accordance with a determination that the second utterance includes the second text string, performing the second operation.

In accordance with some embodiments, a method is described. In some embodiments, the method is performed at an electronic device with a display device, a set of one or more biometric sensors, and a microphone. In some embodiments, the method comprises: while the electronic device is in a first mode, detecting, via the microphone, a first utterance that corresponds to request to perform a first operation; in response to detecting the utterance: in accordance with a determination that a first set of attention criteria are met, where the first set of attention criteria include a criterion that is met when data from the one or more biometric sensors indicates that the attention of a user of the electronic device is focused on the electronic device, performing the first operation; in accordance with a determination that the first set of attention criteria are not met, forgoing performance of the first operation.

In accordance with some embodiments, a non-transitory computer-readable storage medium storing one or more programs configured to be executed by one or more processors of an electronic device with a display device, a set of one or more biometric sensors, and a microphone is described. In some embodiments, the one or more programs include instructions for: while the electronic device is in a first mode, detecting, via the microphone, a first utterance that corresponds to request to perform a first operation; in response to detecting the utterance: in accordance with a determination that a first set of attention criteria are met, where the first set of attention criteria include a criterion that is met when data from the one or more biometric sensors indicates that the attention of a user of the electronic device is focused on the electronic device, performing the first operation; in accordance with a determination that the first set of attention criteria are not met, forgoing performance of the first operation.

In accordance with some embodiments, a transitory computer-readable storage medium storing one or more programs configured to be executed by one or more processors of an electronic device with a display device, a set of one or more biometric sensors, and a microphone is described. In some embodiments, the one or more programs include instructions for: while the electronic device is in a first mode, detecting, via the microphone, a first utterance that corresponds to request to perform a first operation; in response to detecting the utterance: in accordance with a determination that a first set of attention criteria are met, where the first set of attention criteria include a criterion that is met when data from the one or more biometric sensors indicates that the attention of a user of the electronic device is focused on the electronic device, performing the first operation; in accordance with a determination that the first set of attention criteria are not met, forgoing performance of the first operation.

In accordance with some embodiments, an electronic device is described. In some embodiments, the electronic device includes: a display device; a set of one or more biometric sensors; a microphone; one or more processors; and memory storing one or more programs configured to be executed by the one or more processors, the one or more programs including instructions for: while the electronic device is in a first mode, detecting, via the microphone, a first utterance that corresponds to request to perform a first operation; in response to detecting the utterance: in accordance with a determination that a first set of attention criteria are met, where the first set of attention criteria include a criterion that is met when data from the one or more biometric sensors indicates that the attention of a user of the electronic device is focused on the electronic device, performing the first operation; in accordance with a determination that the first set of attention criteria are not met, forgoing performance of the first operation.

In accordance with some embodiments, an electronic device is described. In some embodiments, the electronic device includes: a display device; a set of one or more biometric sensors; a microphone; and means, while the electronic device is in a first mode, detecting, via the microphone, a first utterance that corresponds to request to perform a first operation; in response to detecting the utterance, for: in accordance with a determination that a first set of attention criteria are met, where the first set of attention criteria include a criterion that is met when data from the one or more biometric sensors indicates that the attention of a user of the electronic device is focused on the electronic device, performing the first operation; in accordance with a determination that the first set of attention criteria are not met, forgoing performance of the first operation.

In accordance with some embodiments, a method is described. In some embodiments, a method is performed at an electronic device with a display device and a microphone. In some embodiments, the method comprises: displaying, via the display device, a first user interface that includes a first iteration of a grid overlay that includes: a first number of columns; a first number of rows; and a first number of cells formed by the columns and rows, including: a first cell corresponding to a first location of the first user interface, the first cell including a displayed first alphanumeric text string; and a second cell corresponding to a second location of the first user interface, the second cell including a displayed second alphanumeric text string; while displaying the first grid overlay, detecting, via the microphone, a first utterance that corresponds to a request to perform a first operation; in response to detecting the first utterance: in accordance with a determination that the first utterance includes the first alphanumeric text string, performing at least a portion of the first operation at the first location; and in accordance with a determination that the first utterance includes the second alphanumeric text string, performing at least a portion of the first operation at the second location; and after detecting the first utterance, detecting a first set of one or more inputs that correspond to a request to modify the number of columns or the number of rows of the grid overlay; in response to detecting the first set of one or more inputs, displaying a second iteration of the grid overlay that includes: a second number of columns; a second number of rows; and a second number of cells formed by the columns and rows that is different from the first number of cells, including: a third cell corresponding to a third location of the first user interface different from the first location, the third cell including the displayed first alphanumeric text string; and a fourth cell corresponding to a fourth location of the first user interface different from the second location, the fourth cell including the displayed second alphanumeric text string; while displaying the second iteration of the grid overlay, detecting, via the microphone, a second utterance that corresponds to a request to perform a second operation; in response to detecting the second utterance: in accordance with a determination that the second utterance includes the first alphanumeric text string, performing at least a portion of the second operation at the third location; and in accordance with a determination that the second utterance includes the second alphanumeric text string, performing at least a portion of the second operation at the fourth location.

In accordance with some embodiments, a non-transitory computer-readable storage medium storing one or more programs configured to be executed by one or more processors of an electronic device with a display device and a microphone is described. In some embodiments, the one or more programs include instructions for: displaying, via the display device, a first user interface that includes a first iteration of a grid overlay that includes: a first number of columns; a first number of rows; and a first number of cells formed by the columns and rows, including: a first cell corresponding to a first location of the first user interface, the first cell including a displayed first alphanumeric text string; and a second cell corresponding to a second location of the first user interface, the second cell including a displayed second alphanumeric text string; while displaying the first grid overlay, detecting, via the microphone, a first utterance that corresponds to a request to perform a first operation; in response to detecting the first utterance: in accordance with a determination that the first utterance includes the first alphanumeric text string, performing at least a portion of the first operation at the first location; and in accordance with a determination that the first utterance includes the second alphanumeric text string, performing at least a portion of the first operation at the second location; and after detecting the first utterance, detecting a first set of one or more inputs that correspond to a request to modify the number of columns or the number of rows of the grid overlay; in response to detecting the first set of one or more inputs, displaying a second iteration of the grid overlay that includes: a second number of columns; a second number of rows; and a second number of cells formed by the columns and rows that is different from the first number of cells, including: a third cell corresponding to a third location of the first user interface different from the first location, the third cell including the displayed first alphanumeric text string; and a fourth cell corresponding to a fourth location of the first user interface different from the second location, the fourth cell including the displayed second alphanumeric text string; while displaying the second iteration of the grid overlay, detecting, via the microphone, a second utterance that corresponds to a request to perform a second operation; in response to detecting the second utterance: in accordance with a determination that the second utterance includes the first alphanumeric text string, performing at least a portion of the second operation at the third location; and in accordance with a determination that the second utterance includes the second alphanumeric text string, performing at least a portion of the second operation at the fourth location.

In accordance with some embodiments, a transitory computer-readable storage medium storing one or more programs configured to be executed by one or more processors of an electronic device with a display device and a microphone is described. In some embodiments, the one or more programs include instructions for: displaying, via the display device, a first user interface that includes a first iteration of a grid overlay that includes: a first number of columns; a first number of rows; and a first number of cells formed by the columns and rows, including: a first cell corresponding to a first location of the first user interface, the first cell including a displayed first alphanumeric text string; and a second cell corresponding to a second location of the first user interface, the second cell including a displayed second alphanumeric text string; while displaying the first grid overlay, detecting, via the microphone, a first utterance that corresponds to a request to perform a first operation; in response to detecting the first utterance: in accordance with a determination that the first utterance includes the first alphanumeric text string, performing at least a portion of the first operation at the first location; and in accordance with a determination that the first utterance includes the second alphanumeric text string, performing at least a portion of the first operation at the second location; and after detecting the first utterance, detecting a first set of one or more inputs that correspond to a request to modify the number of columns or the number of rows of the grid overlay; in response to detecting the first set of one or more inputs, displaying a second iteration of the grid overlay that includes: a second number of columns; a second number of rows; and a second number of cells formed by the columns and rows that is different from the first number of cells, including: a third cell corresponding to a third location of the first user interface different from the first location, the third cell including the displayed first alphanumeric text string; and a fourth cell corresponding to a fourth location of the first user interface different from the second location, the fourth cell including the displayed second alphanumeric text string; while displaying the second iteration of the grid overlay, detecting, via the microphone, a second utterance that corresponds to a request to perform a second operation; in response to detecting the second utterance: in accordance with a determination that the second utterance includes the first alphanumeric text string, performing at least a portion of the second operation at the third location; and in accordance with a determination that the second utterance includes the second alphanumeric text string, performing at least a portion of the second operation at the fourth location.

In accordance with some embodiments, an electronic device is described. In some embodiments, the electronic device includes: a display device; a microphone; one or more processors; and memory storing one or more programs configured to be executed by the one or more processors, the one or more programs including instructions for: displaying, via the display device, a first user interface that includes a first iteration of a grid overlay that includes: a first number of columns; a first number of rows; and a first number of cells formed by the columns and rows, including: a first cell corresponding to a first location of the first user interface, the first cell including a displayed first alphanumeric text string; and a second cell corresponding to a second location of the first user interface, the second cell including a displayed second alphanumeric text string; while displaying the first grid overlay, detecting, via the microphone, a first utterance that corresponds to a request to perform a first operation; in response to detecting the first utterance: in accordance with a determination that the first utterance includes the first alphanumeric text string, performing at least a portion of the first operation at the first location; and in accordance with a determination that the first utterance includes the second alphanumeric text string, performing at least a portion of the first operation at the second location; and after detecting the first utterance, detecting a first set of one or more inputs that correspond to a request to modify the number of columns or the number of rows of the grid overlay; in response to detecting the first set of one or more inputs, displaying a second iteration of the grid overlay that includes: a second number of columns; a second number of rows; and a second number of cells formed by the columns and rows that is different from the first number of cells, including: a third cell corresponding to a third location of the first user interface different from the first location, the third cell including the displayed first alphanumeric text string; and a fourth cell corresponding to a fourth location of the first user interface different from the second location, the fourth cell including the displayed second alphanumeric text string; while displaying the second iteration of the grid overlay, detecting, via the microphone, a second utterance that corresponds to a request to perform a second operation; in response to detecting the second utterance: in accordance with a determination that the second utterance includes the first alphanumeric text string, performing at least a portion of the second operation at the third location; and in accordance with a determination that the second utterance includes the second alphanumeric text string, performing at least a portion of the second operation at the fourth location.

In accordance with some embodiments, an electronic device is described. In some embodiments, the electronic device includes: a display device; a microphone; and means for displaying, via the display device, a first user interface that includes a first iteration of a grid overlay that includes: a first number of columns; a first number of rows; and a first number of cells formed by the columns and rows, including: a first cell corresponding to a first location of the first user interface, the first cell including a displayed first alphanumeric text string; and a second cell corresponding to a second location of the first user interface, the second cell including a displayed second alphanumeric text string; means, while displaying the first grid overlay, for detecting, via the microphone, a first utterance that corresponds to a request to perform a first operation; means, responsive to detecting the first utterance, for: in accordance with a determination that the first utterance includes the first alphanumeric text string, performing at least a portion of the first operation at the first location; and in accordance with a determination that the first utterance includes the second alphanumeric text string, performing at least a portion of the first operation at the second location; and means, after detecting the first utterance, for detecting a first set of one or more inputs that correspond to a request to modify the number of columns or the number of rows of the grid overlay; means, responsive to detecting the first set of one or more inputs, for displaying a second iteration of the grid overlay that includes: a second number of columns; a second number of rows; and a second number of cells formed by the columns and rows that is different from the first number of cells, including: a third cell corresponding to a third location of the first user interface different from the first location, the third cell including the displayed first alphanumeric text string; and a fourth cell corresponding to a fourth location of the first user interface different from the second location, the fourth cell including the displayed second alphanumeric text string; means, while displaying the second iteration of the grid overlay, for detecting, via the microphone, a second utterance that corresponds to a request to perform a second operation; means, responsive to detecting the second utterance, for: in accordance with a determination that the second utterance includes the first alphanumeric text string, performing at least a portion of the second operation at the third location; and in accordance with a determination that the second utterance includes the second alphanumeric text string, performing at least a portion of the second operation at the fourth location.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for voice-based control of electronic devices, thereby increasing the effectiveness, efficiency, and user satisfaction with such devices. Such methods and interfaces may complement or replace other methods for voice-based control of electronic devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 15A-15D is a flow diagram illustrating a method for voice-based control of electronic devices in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for voice-based control of electronic devices. For example, existing methods for voice-control often not well-adapted for primarily touch-based interface models. Moreover, such methods do not provide for intuitive use of voice commands that leverage graphical interface elements. Disclosed herein are techniques for voice-based control of electronic devices. Such techniques can reduce the cognitive burden on a user who employ voice-based control of electronic devices, thereby enhancing productivity. Further, such techniques can reduce processor and battery power otherwise wasted on redundant user inputs.

Figure 6A:
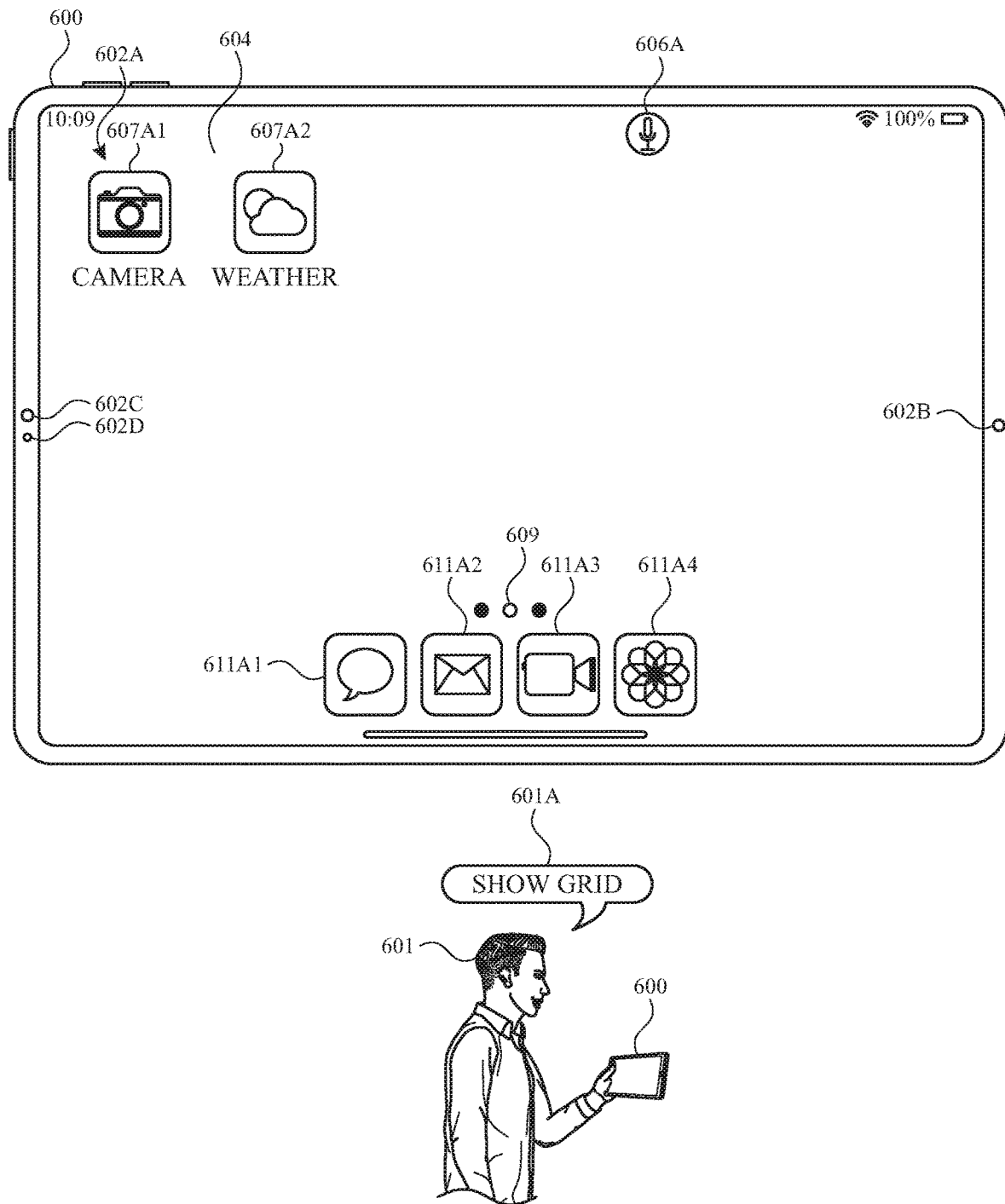
FIGS. 6A-6Z illustrate exemplary user interfaces for voice-based control of electronic devices.
Figure 6Z:
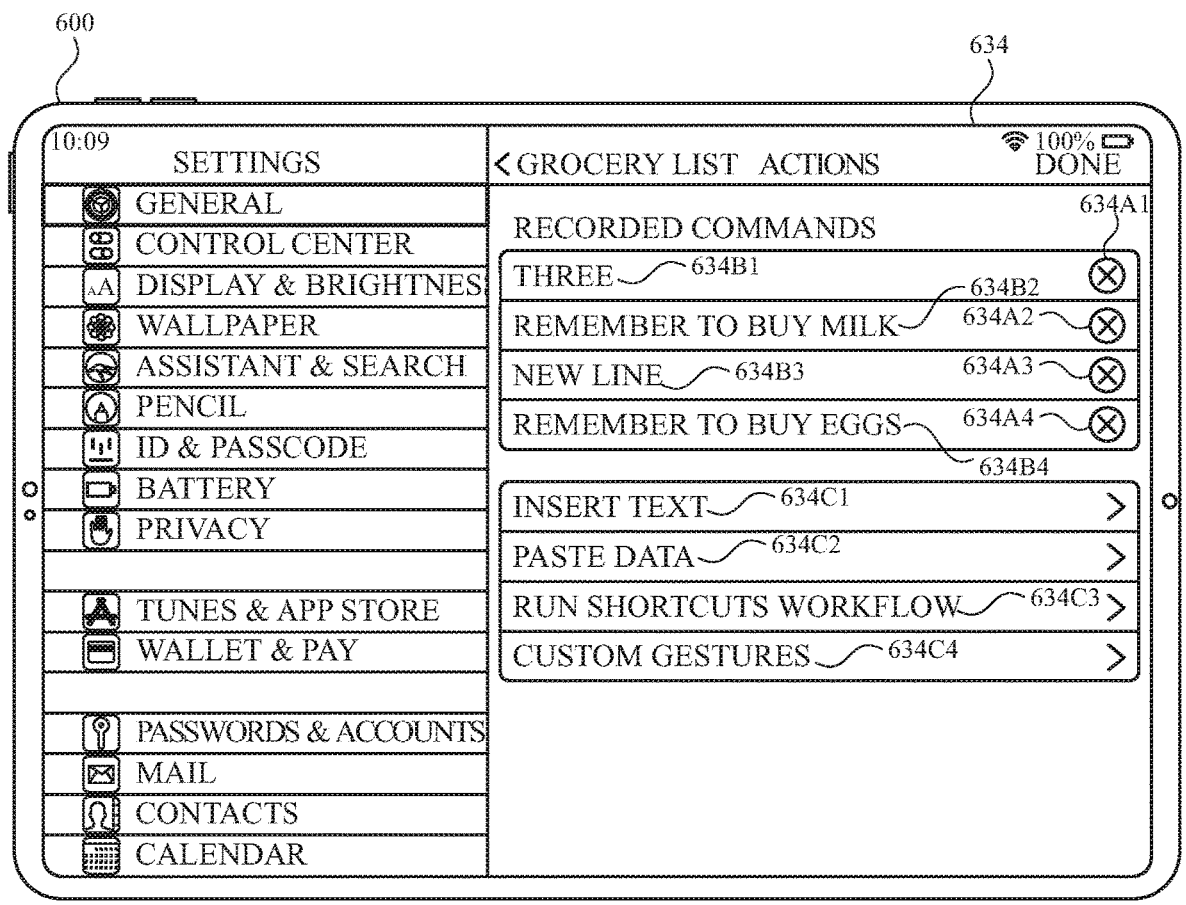
Figure 7A:
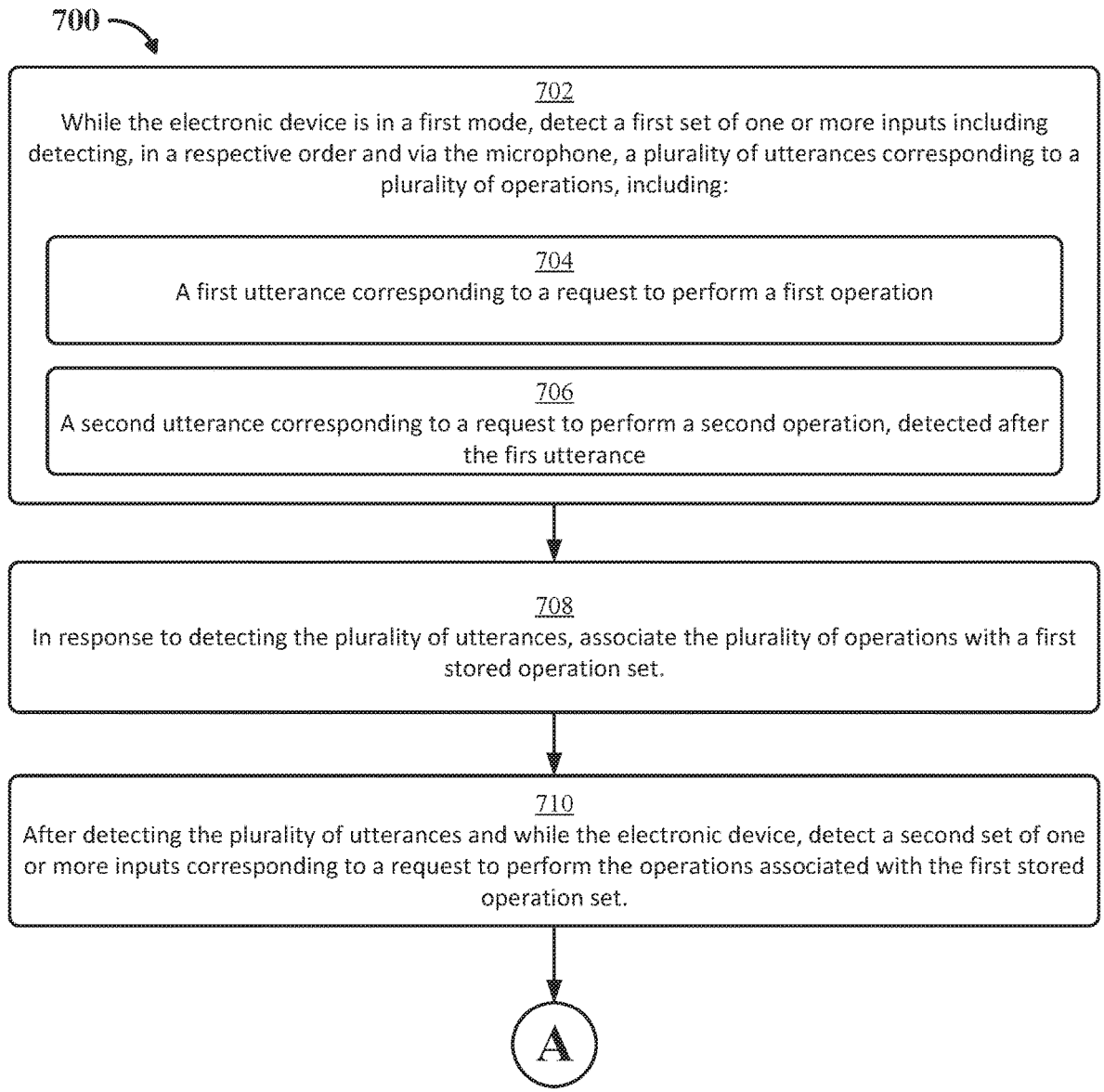
FIGS. 7A-7B is a flow diagram illustrating a method for voice-based control of electronic devices in accordance with some embodiments.
Figure 7B:
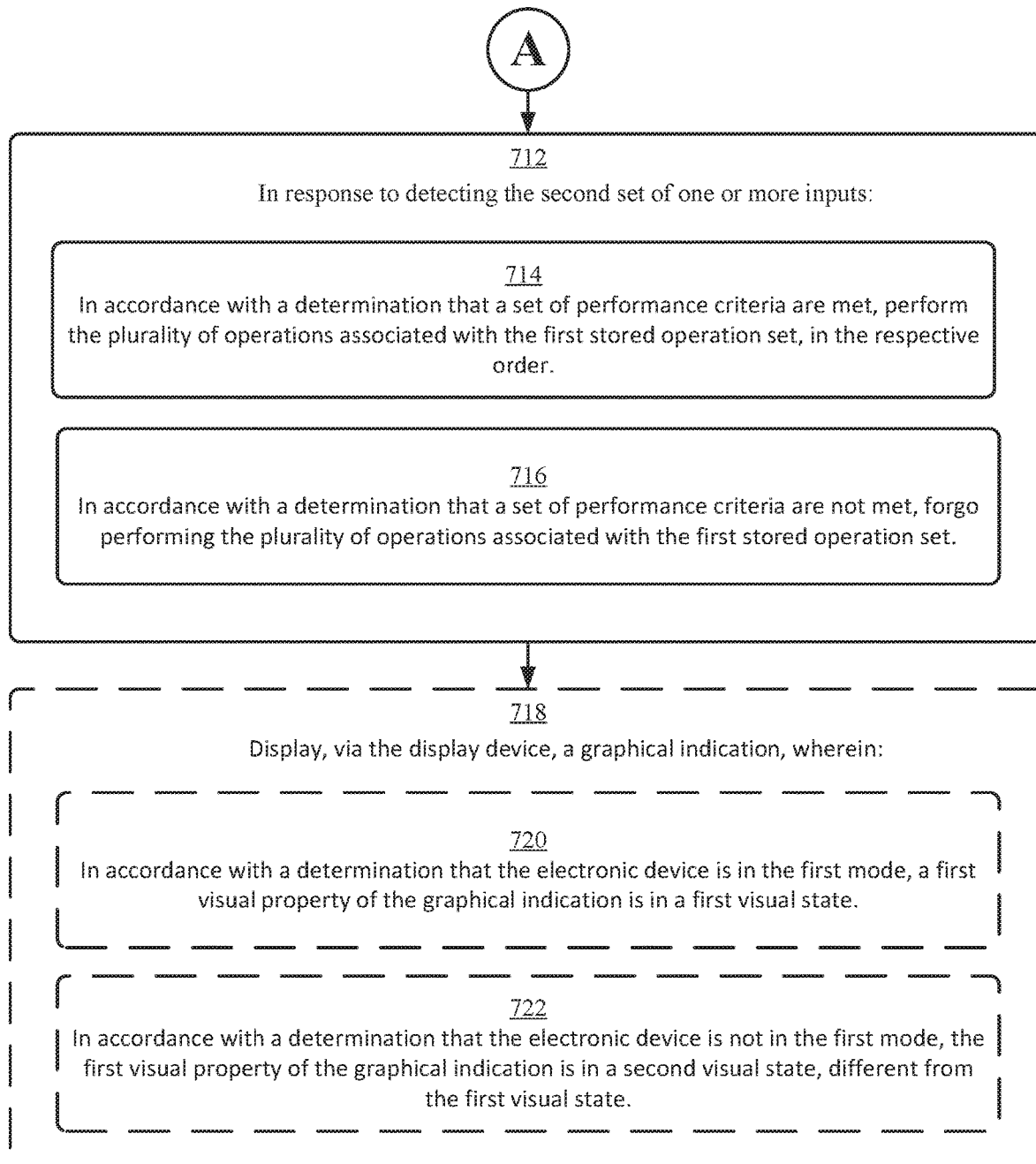

Below, FIGS. 1A-1B, 2, 3, 4A-4B, and 5A-5B provide a description of exemplary devices for performing the techniques for voice-based control of electronic devices. FIGS. 6A-6Z illustrate exemplary user interfaces for voice-based control of electronic devices. FIGS. 7A-7B is a flow diagram illustrating methods of voice-based control of electronic devices. The user interfaces in FIGS. 6A-6Z are used to illustrate the processes described below, including the processes in FIGS. 7A-7B. FIGS. 8A-8D illustrate exemplary user interfaces for voice-based control of electronic devices. FIGS. 9A-9B is a flow diagram illustrating methods of voice-based control of electronic devices in accordance with some embodiments. The user interfaces in FIGS. 8A-8D are used to illustrate the processes described below, including the processes in FIGS. 9A-9B.

FIGS. 10A-10H illustrate exemplary user interfaces for voice-based control of electronic devices. FIGS. 11A-11D is a flow diagram illustrating methods of voice-based control of electronic devices in accordance with some embodiments. The user interfaces in FIGS. 10A-10H are used to illustrate the processes described below, including the processes in FIGS. 11A-11D.

FIGS. 12A-12H illustrate exemplary user interfaces for voice-based control of electronic devices. FIGS. 13A-13B is a flow diagram illustrating methods of voice-based control of electronic devices in accordance with some embodiments. The user interfaces in FIGS. 12A-12H are used to illustrate the processes described below, including the processes in FIGS. 13A-13B.

FIGS. 14A-14F illustrate exemplary user interfaces for voice-based control of electronic devices. FIGS. 15A-15D is a flow diagram illustrating methods of voice-based control of electronic devices in accordance with some embodiments. The user interfaces in FIGS. 14A-14F are used to illustrate the processes described below, including the processes in FIGS. 15A-15D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
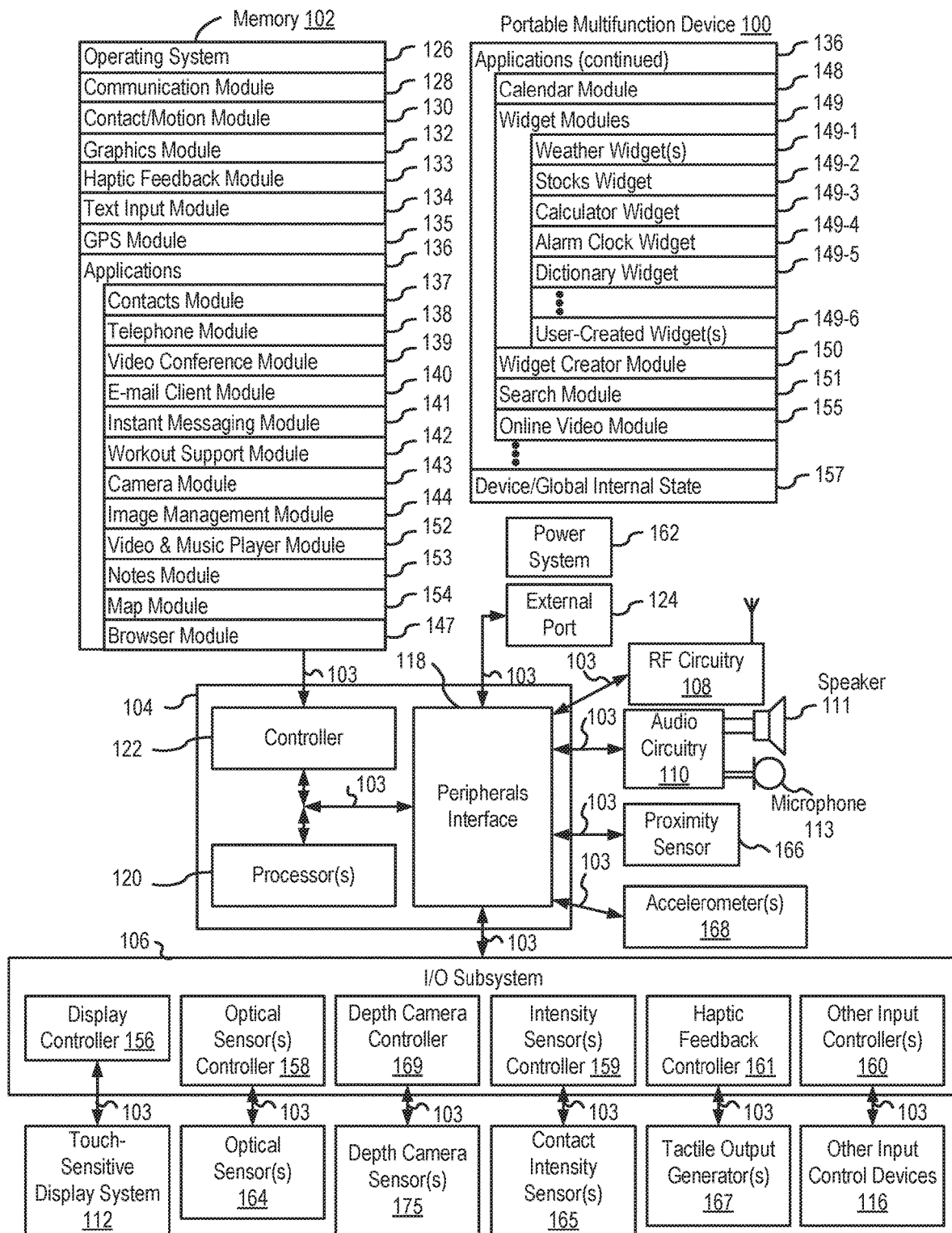
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
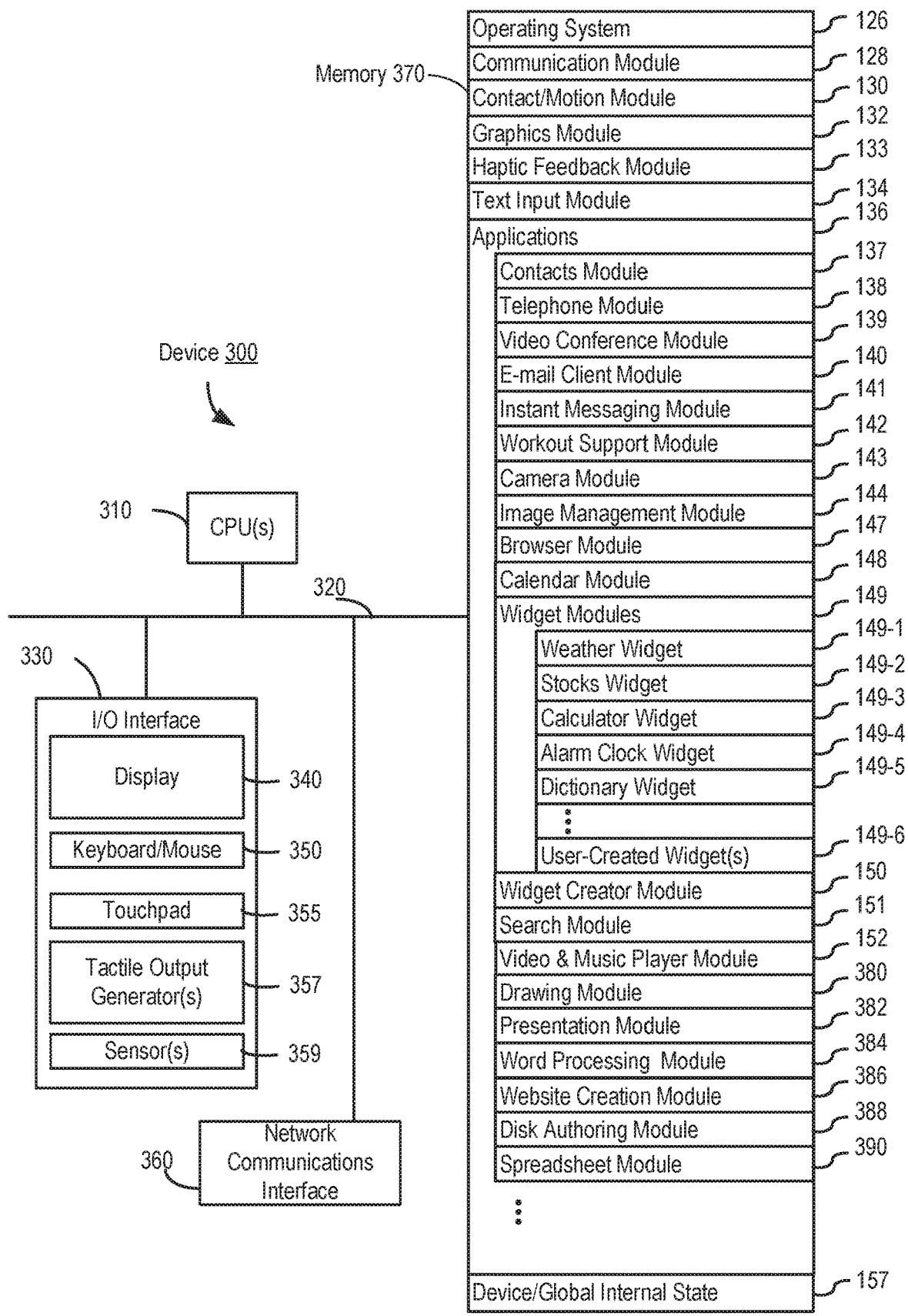
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser modul 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
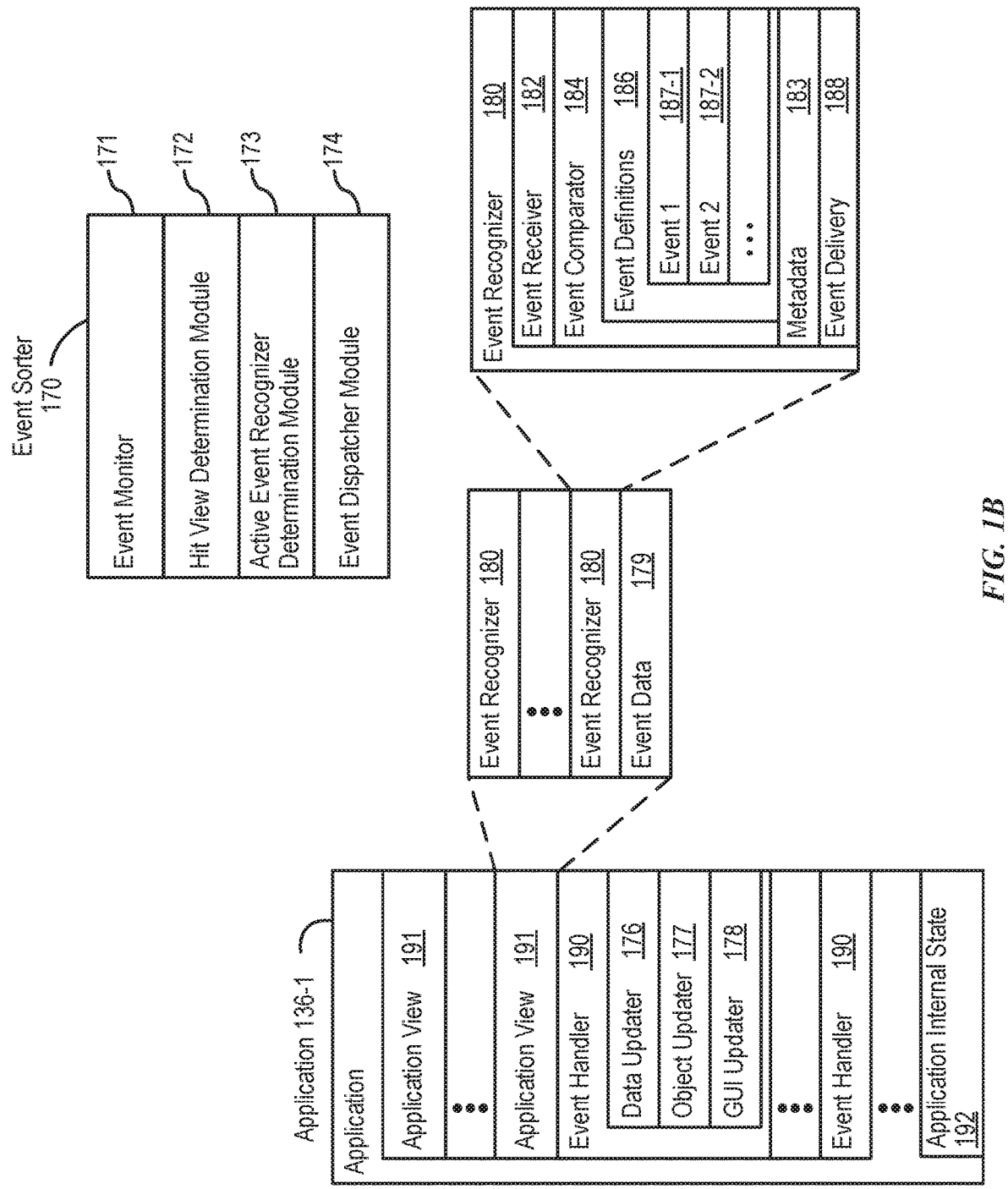
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
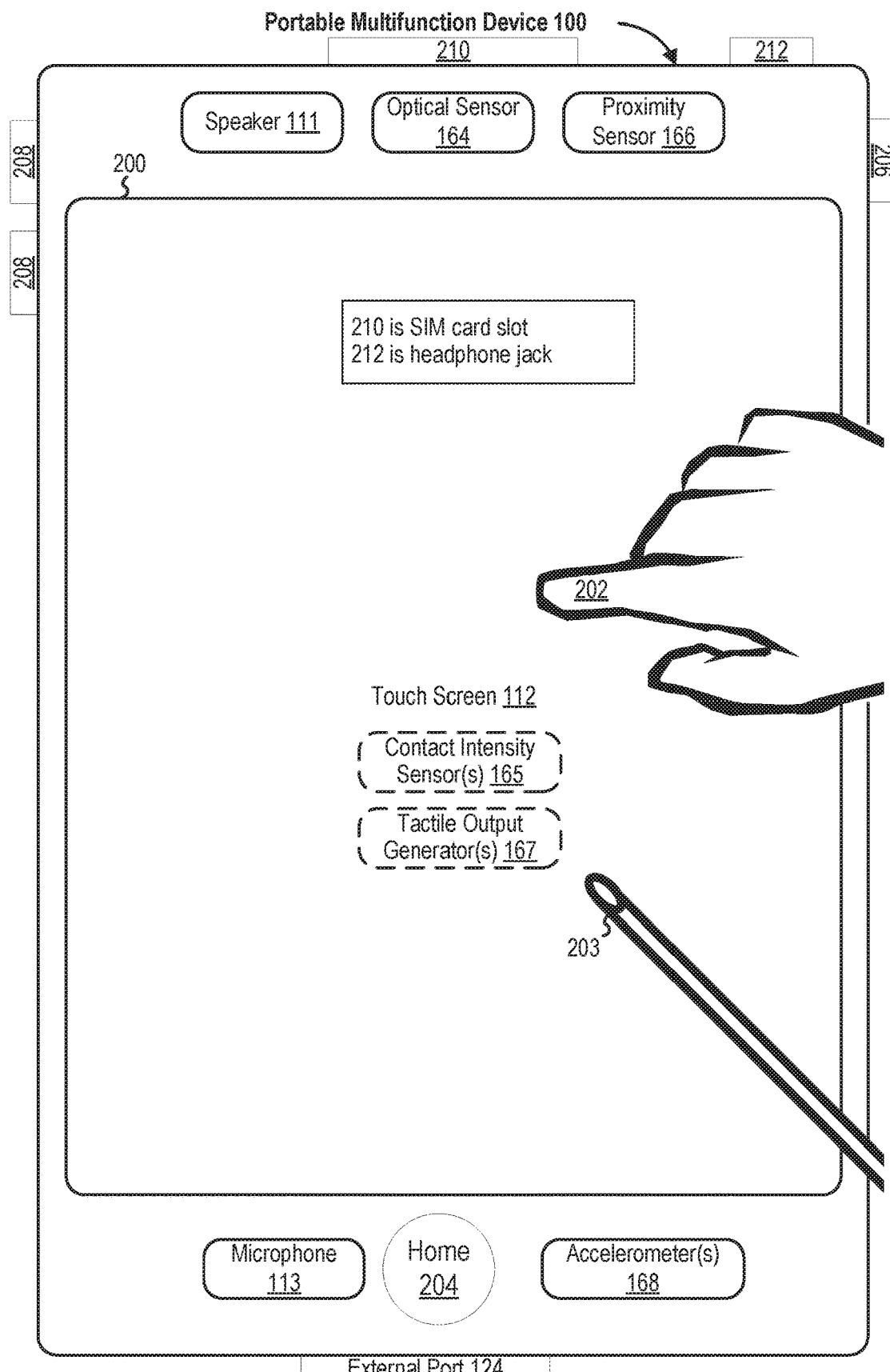
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
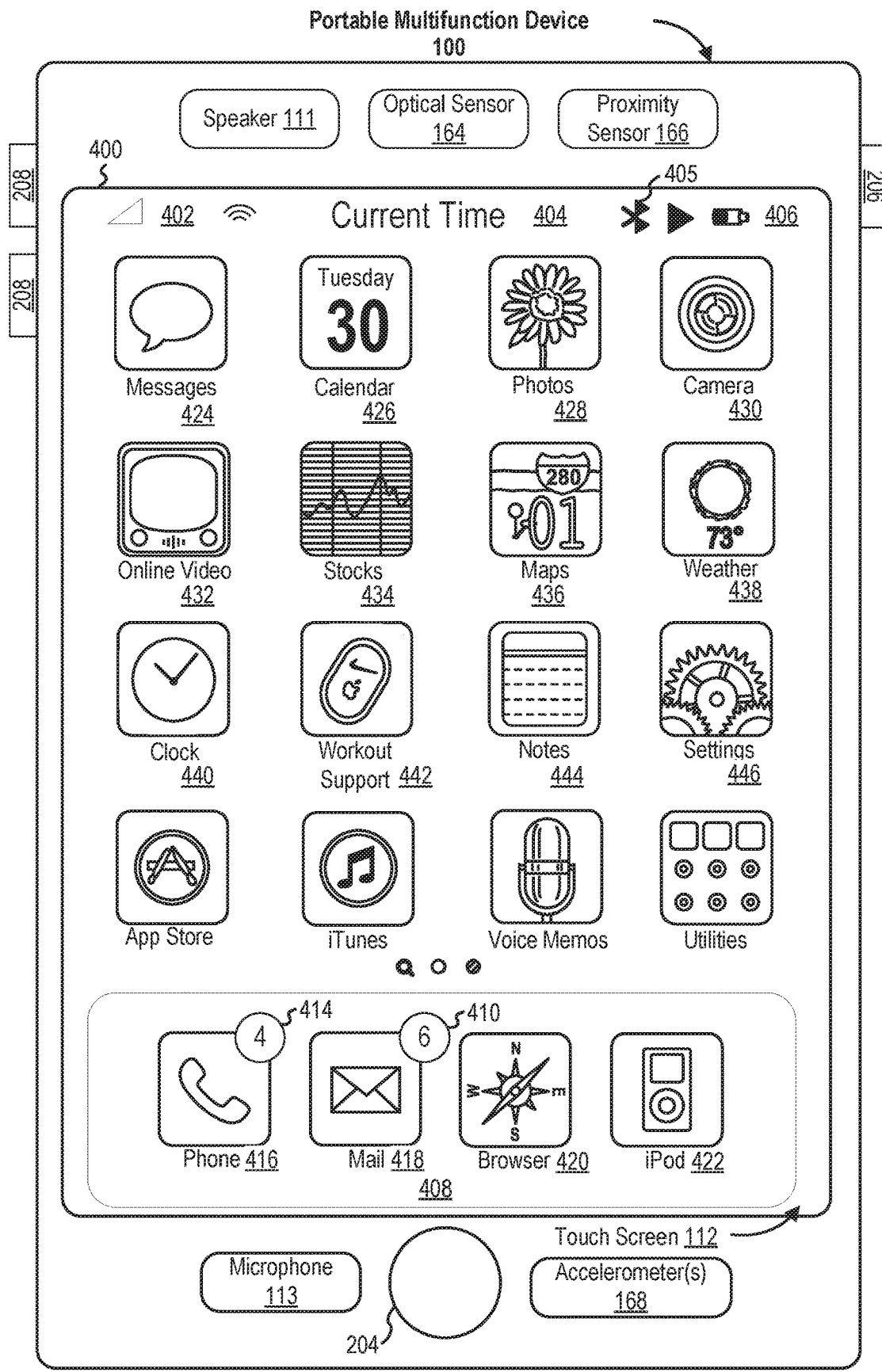
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;

Tray 408 with icons for frequently used applications, such as:
- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
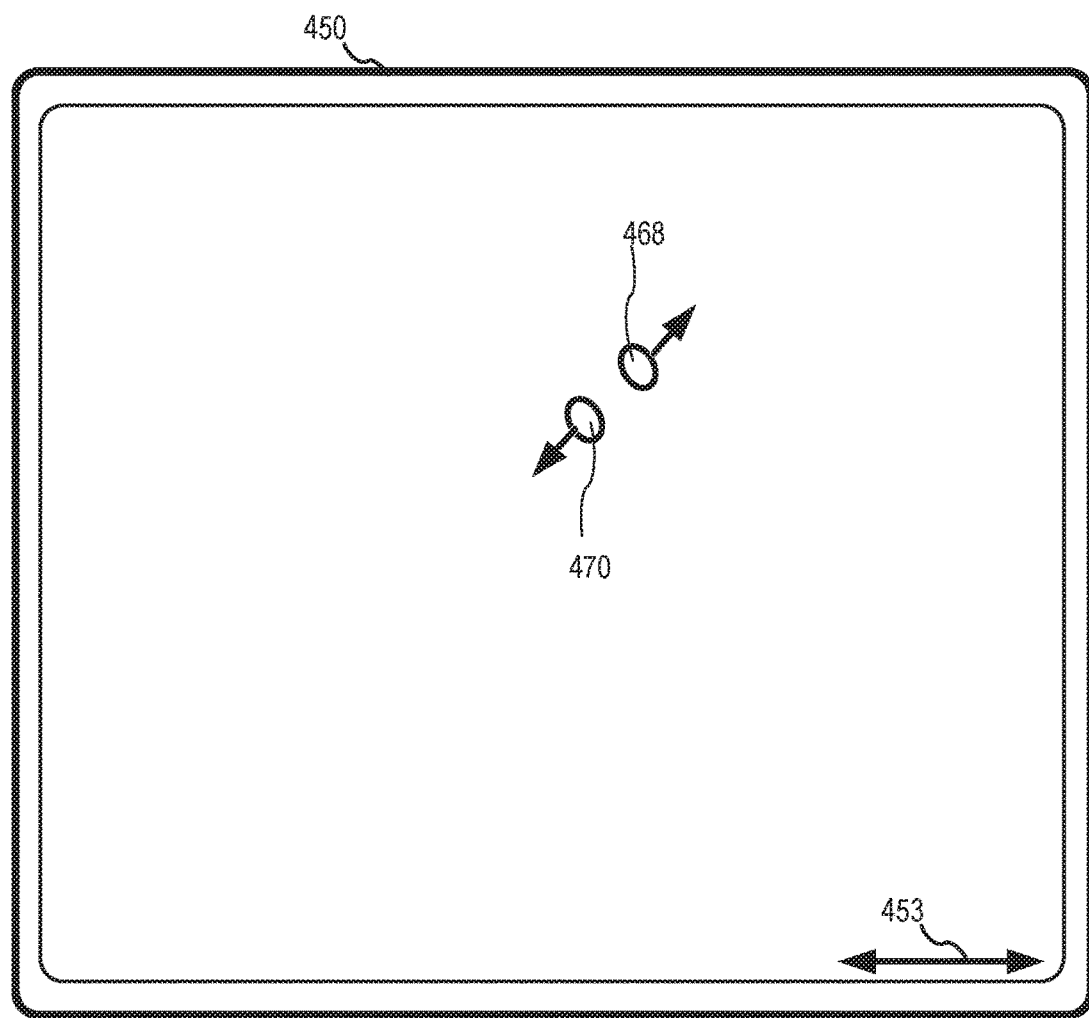
FIG. 4B illustrates an exemplary user interface for a multifunction device with a touch-sensitive surface that is separate from the display in accordance with some embodiments.
Figure 4B:
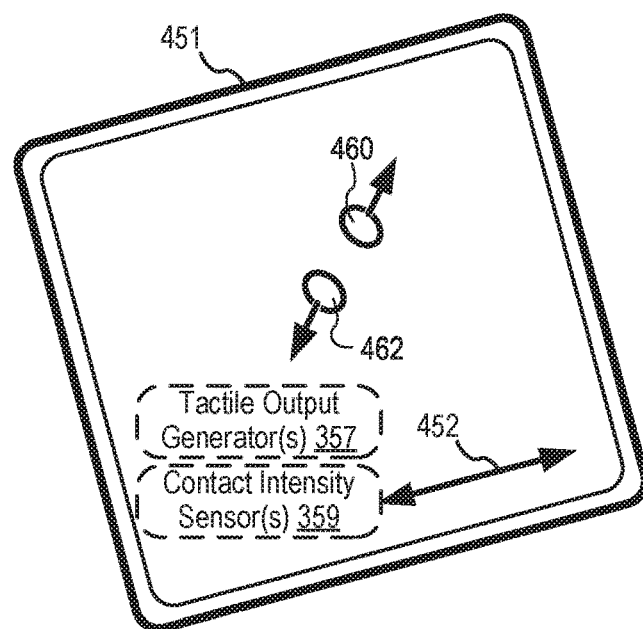

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
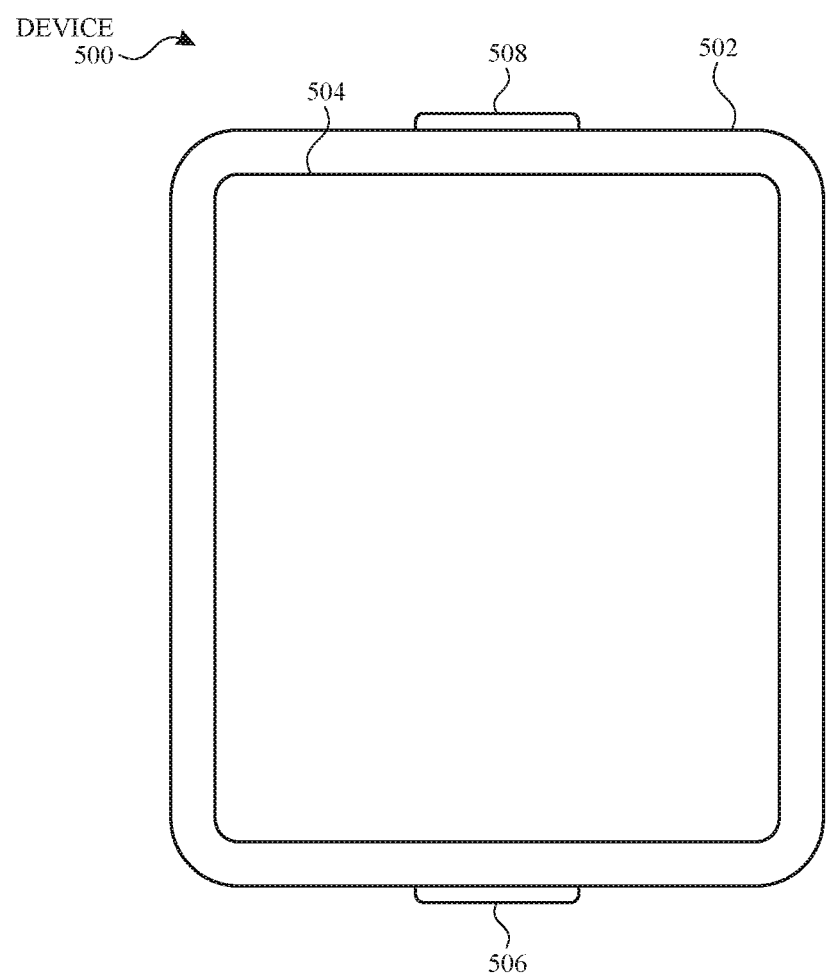
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
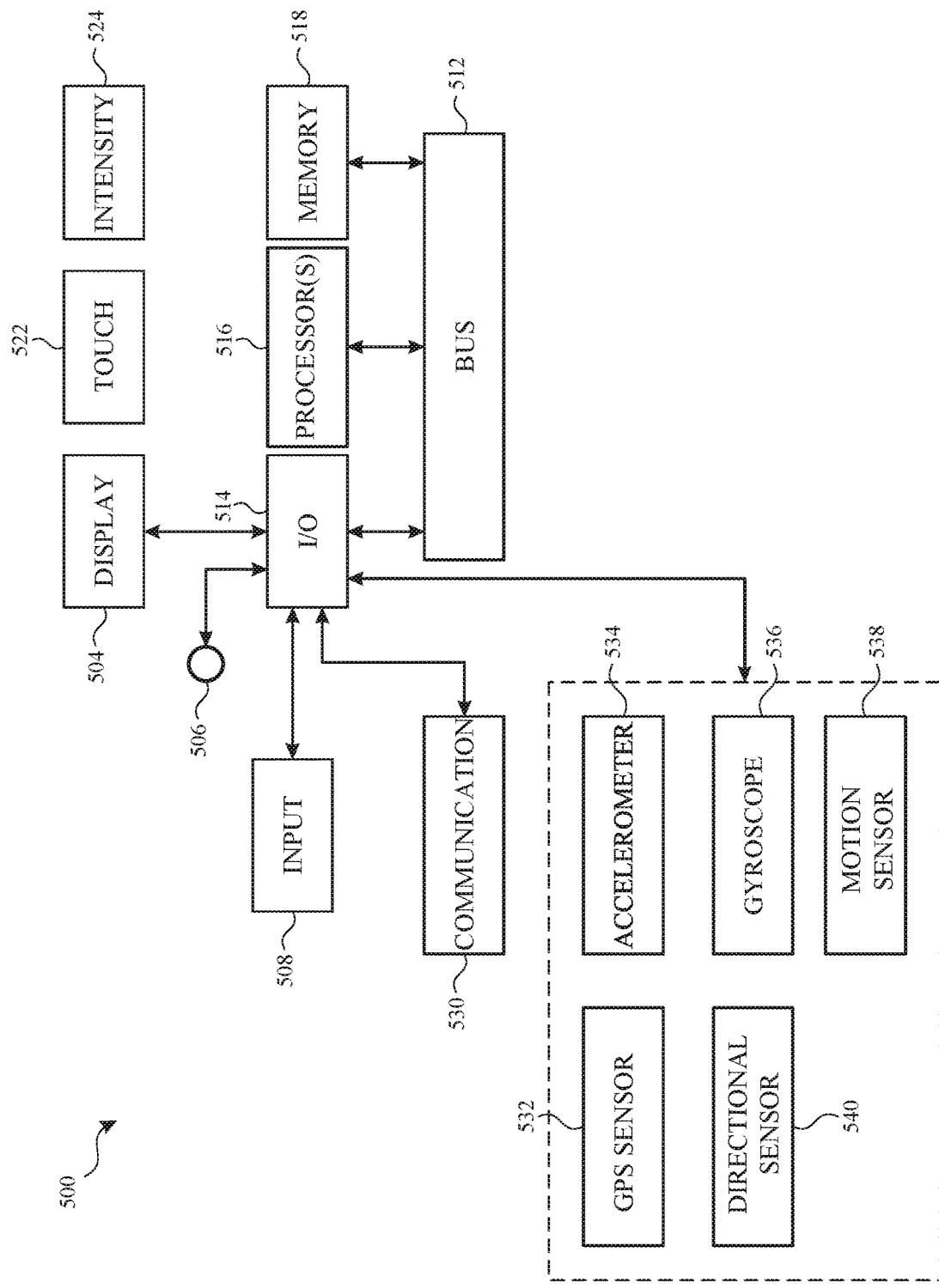
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, and 1500 (FIGS. 7, 9, 11, 13, and 15, respectively). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, or a device including one or more features of devices 100, 300, and 500.

FIGS. 6A-6Z illustrate exemplary user interfaces for voice-based control of electronic devices, in accordance with some embodiments. FIGS. 6A-6Z also illustrate an exemplary electronic device, voice-based control scheme, and computerized method for capture and re-execution of voice-based commands. The user interfaces in these figures are used to illustrate the processes described below, including the processes in FIGS. 7A-7B.

In FIG. 6A, a user 601 is interacting with a device 600, which is a tablet computer. Device 600 includes a display screen 602A, which is a touch-sensitive display screen. Device 600 also includes a microphone 602B, which is capable of detecting audio input, including speech input (e.g., utterances). In some embodiments, device 600 includes a plurality of microphones configured to identify the position of an audio source, such as user 601. In some embodiments, device 600 is connected to one or more external microphones, such as microphones included in wireless headphone(s) connected to electronic device 600 via a wireless connection standard. Device 600 also includes camera 602C, which has a field-of-view that includes user 601 and, in particular, the face and eyes of user 601. In some embodiments, camera 602C includes an image sensor that is capable of capturing data representing a portion of the light spectrum (e.g., visible light, infrared light, or ultraviolet light). In some embodiments, camera 602C includes multiple image sensors and/or other types of sensors. In addition to capturing data representing sensed light, in some embodiments, camera 602-3 is capable of capturing other types of data, such as depth data. For example, in some embodiments, camera 602-3 also captures depth data using techniques based on speckle, time-of-flight, parallax, or focus. Image data that device 600 captures using camera 602C includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the data for the portion of the light spectrum. In some embodiments, device 600 also includes one or more features of devices 100, 300, and 500.

Electronic device 600 includes a depth camera 602D, in addition to camera 602C, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of a subject (e.g., user 601) captured by the visible light camera. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa). In some embodiments, data from camera 602C and/or depth camera 602D can be used to determine the direction a user (e.g., user 601) is facing and/or to determine (e.g., via eye position) where a user is currently focusing their attention.

In FIG. 6A, device 600 is displaying a home interface 604 that includes a first set of application affordances 607A, specifically affordances 607A1 and 607A2, and a second set of application affordances 611A, specifically 611A1-611A2. The first set of application affordances 602A are displayed on a second page of the multi-page home interface 604, as indicated by the appearance of page indication 602C. In FIG. 6A, device 600 is also displaying a voice control icon 606 in a current visual state 606A, which is a first visual state (e.g., having a primarily blue color scheme) that indicates that device 600 is capable of receiving voice commands. As discussed in more detail below, the visual state of icon 606 can change to indicate various voice-command states of device 600.

Figure 6B:
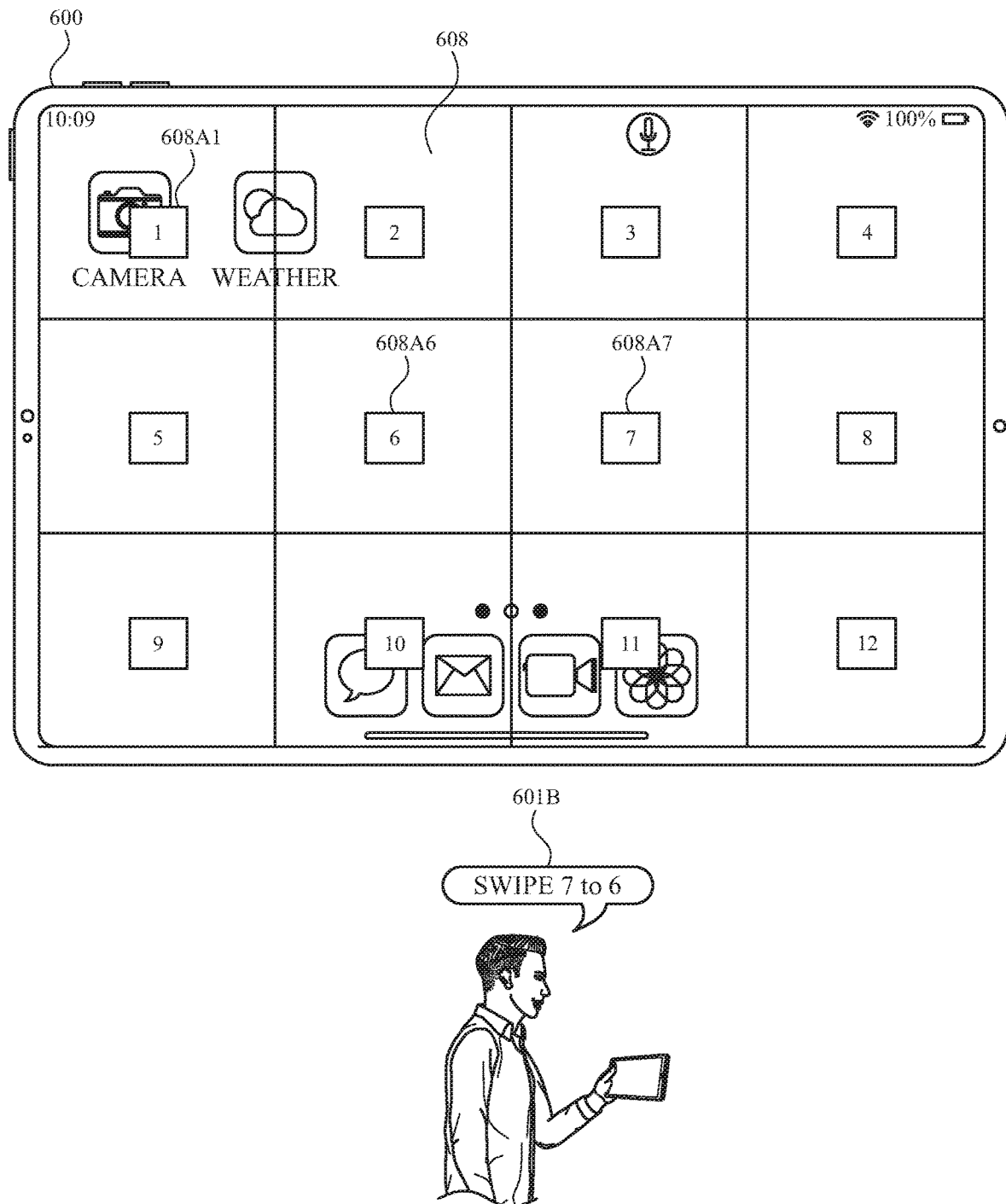

In FIG. 6A, device 600 detects, via microphone 602B, voice input 601A ("SHOW GRID") and, in response, displays the grid shown in FIG. 6B. Throughout the following embodiments, voice inputs are shown on an initial figure (e.g. FIG. 6A), while the response of device 600 to the voice input is shown in the subsequent figure(s) (e.g., FIG. 6B).

In FIG. 6B, device 600 displays a grid 608 that includes cell cues 608A, including specific cues 608A1, 608A6, and 608A7, that each correspond to a cell of grid 608. As discussed in more detail below, cell cues 608A provide visual cues of voice commands that can be processed by device 600 using grid 608.

Figure 6C:
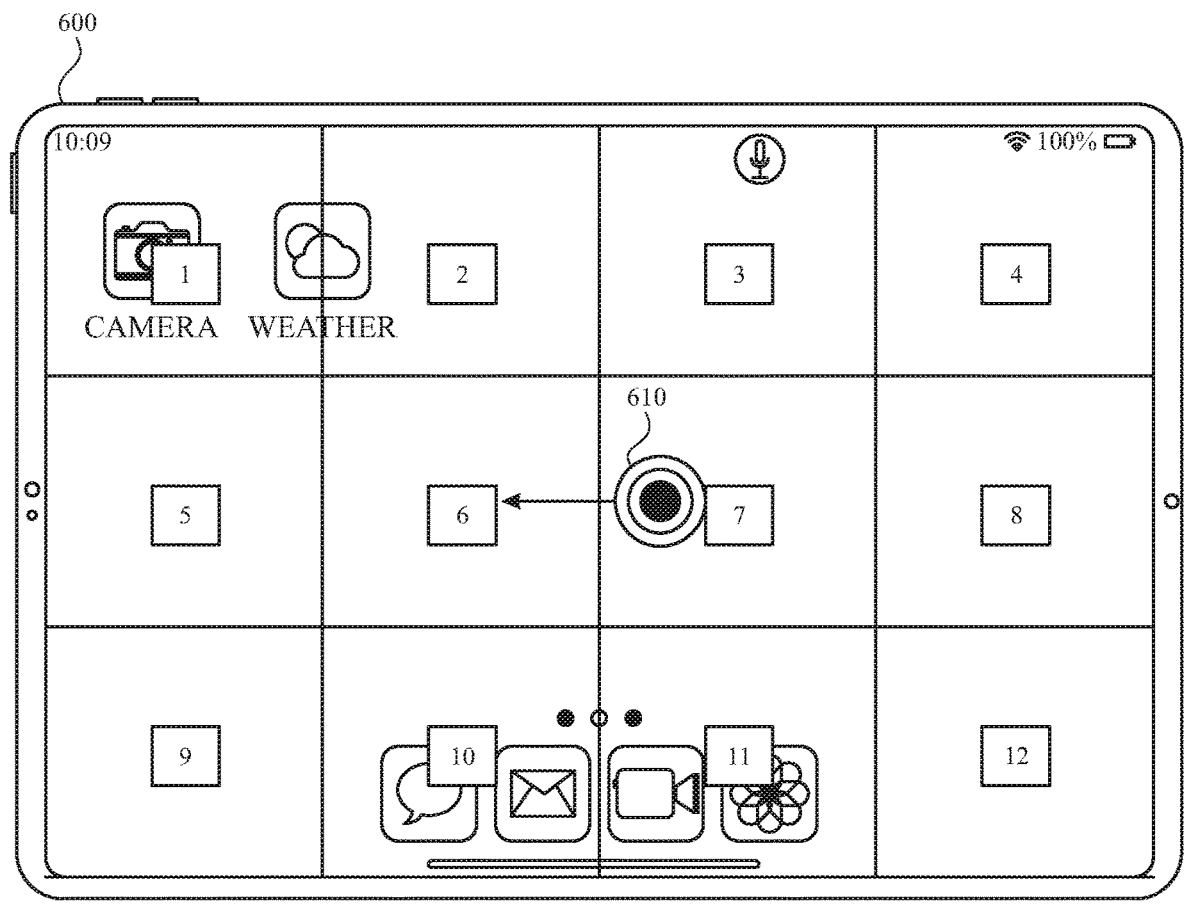
Figure 6C:
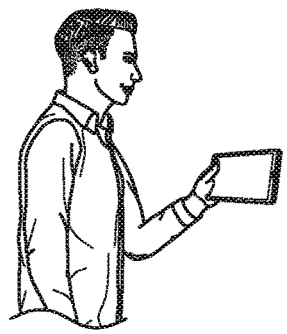
Figure 6D:
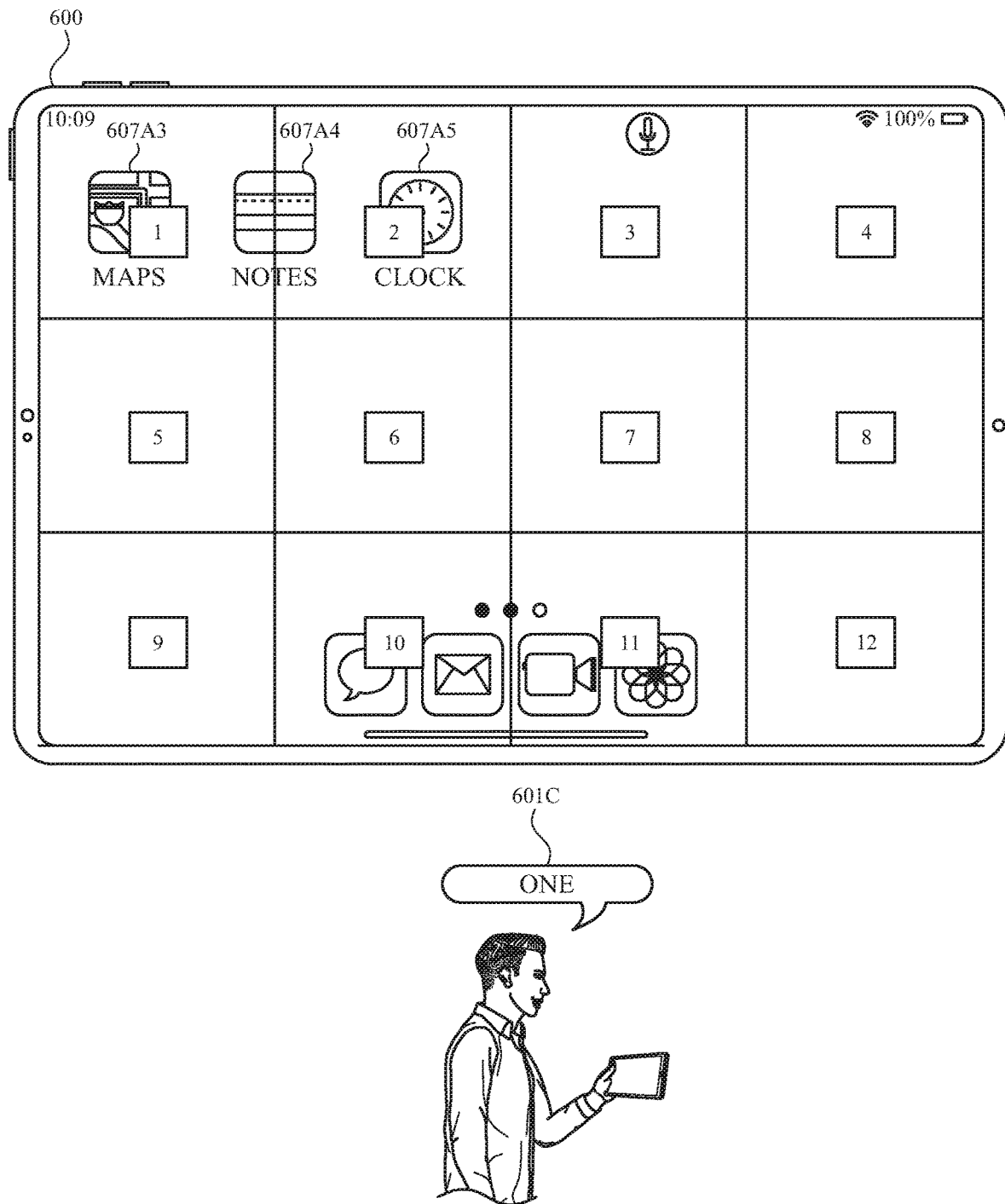

In FIG. 6B, device 600 detects, via microphone 602B, voice input 601B ("SWIPE 7 TO 6"), which is processed as a request to perform an operation based on the locations on display 602A that correspond to the cells of cell cues 608A7 and 608A6, and, in response, displays the user interfaces in FIGS. 6C and 6D.

In FIG. 6C, device 600 displays an initial state of a visual gesture indicator 610 that includes a directional arrow to visually indicate a simulated touch gesture operation (e.g., a process that simulates a response that would be provided on detection of a touch gesture) corresponding to a swipe from cell 7 to cell 6 of grid 608. In some embodiments, a visual gesture indicator is not displayed; rather device 600 performs a simulated touch gesture operation without displaying any visual indicators.

In FIG. 6D, device 600 displays, in response to voice input 601B, a second page of home interface 608 that includes application affordances 607A3, 607A4, and 607A5. Device 600 also updates the visual state of page indication 602C to show that the second page of home interface 608 is being displayed.

Figure 6E:
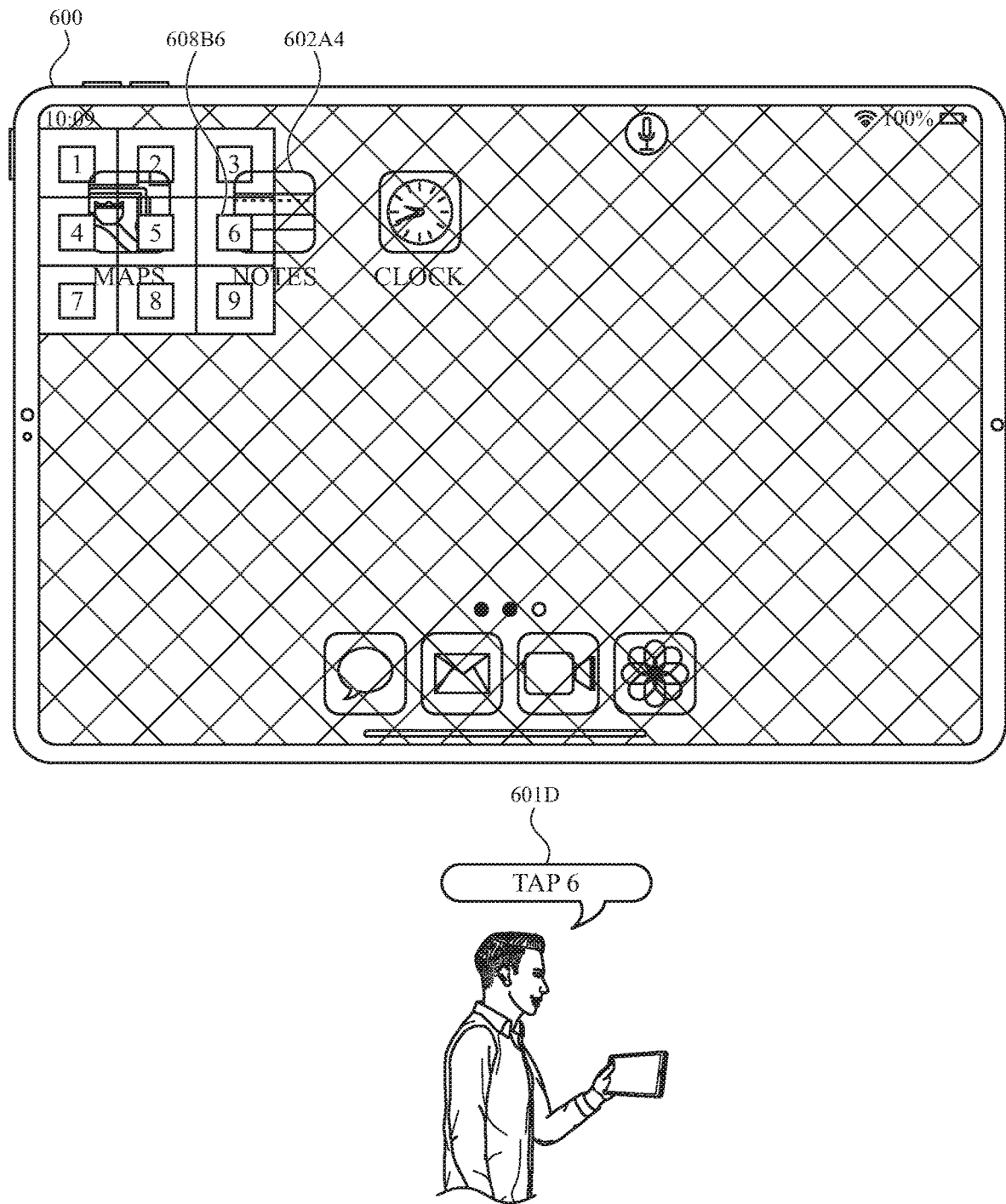

In FIG. 6D, device 600 detects, via microphone 602B, voice input 601C ("ONE"), which is processed by device 600 as a request to modify grid 608 and, in response, displays the user interface in FIG. 6E.

In FIG. 6E, device 600 modifies the size and location of grid 608, displaying it within the area occupied by the cell corresponding to cell cue 608A1 of FIG. 6B. In FIG. 6E, grid 608 now includes cell cues 608B, including cell cue 608B6.

Figure 6F:
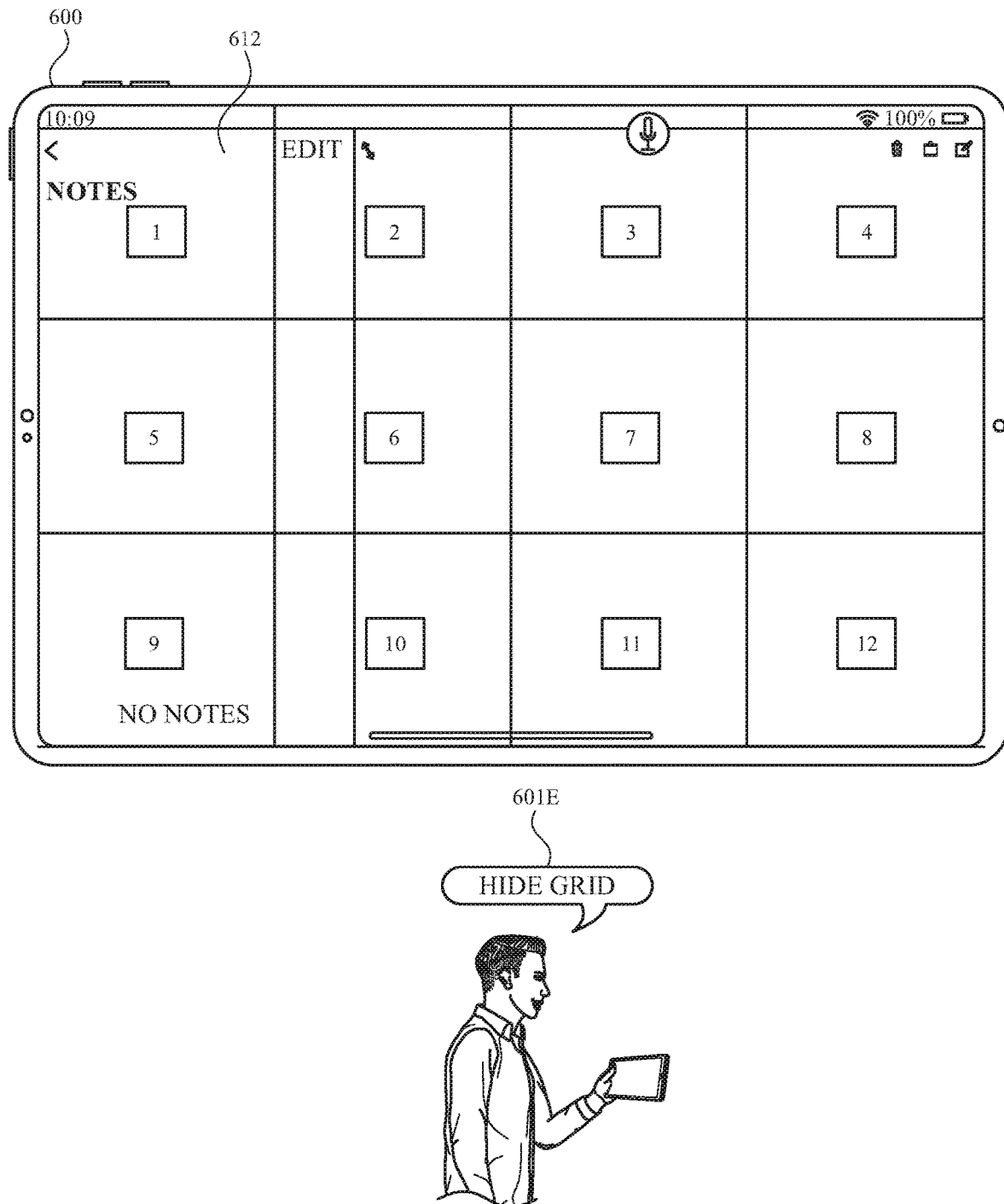

In FIG. 6E, device 600 detects, via microphone 602B, voice input 601D ("TAP 6"), which is processed as a request to perform a simulated tap gesture operation based on the location on display 602A that correspond to the cell of cell cue 608B6 that includes Notes application affordance 602A4, and, in response, displays the user interface in FIG. 6F.

In FIG. 6F, device 600 displays a Notes user interface 612 that corresponds to a word processing application for generating written notes. In FIG. 6F, grid 608 has returned to a default full screen size, because device 600 displays grid 608 in reduced size (e.g., detailed size) formats until a grid-based command is received. In some embodiments, the grid would remain in the reduced size of FIG. 6E until explicitly altered via an input (e.g., a voice input).

Figure 6G:
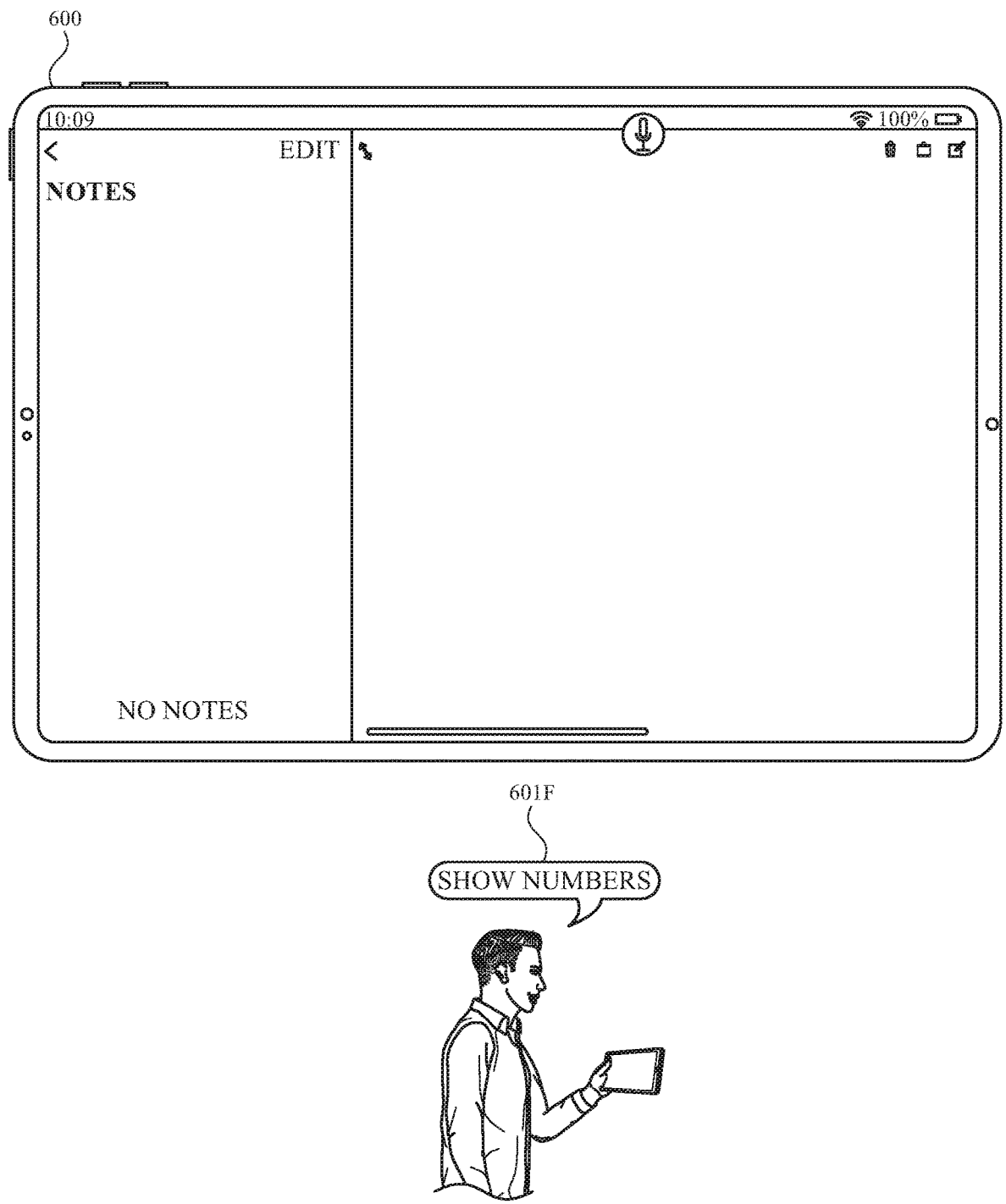

In FIG. 6F, device 600 detects, via microphone 602B, voice input 601E ("HIDE GRID"), which is processed by device 600 as a request to cease display of grid 608 and, in response, displays the user interface in FIG. 6G.

In FIG. 6G, device 600 ceases to display grid 608, providing a less obstructed view of user interface 612.

Figure 6H:
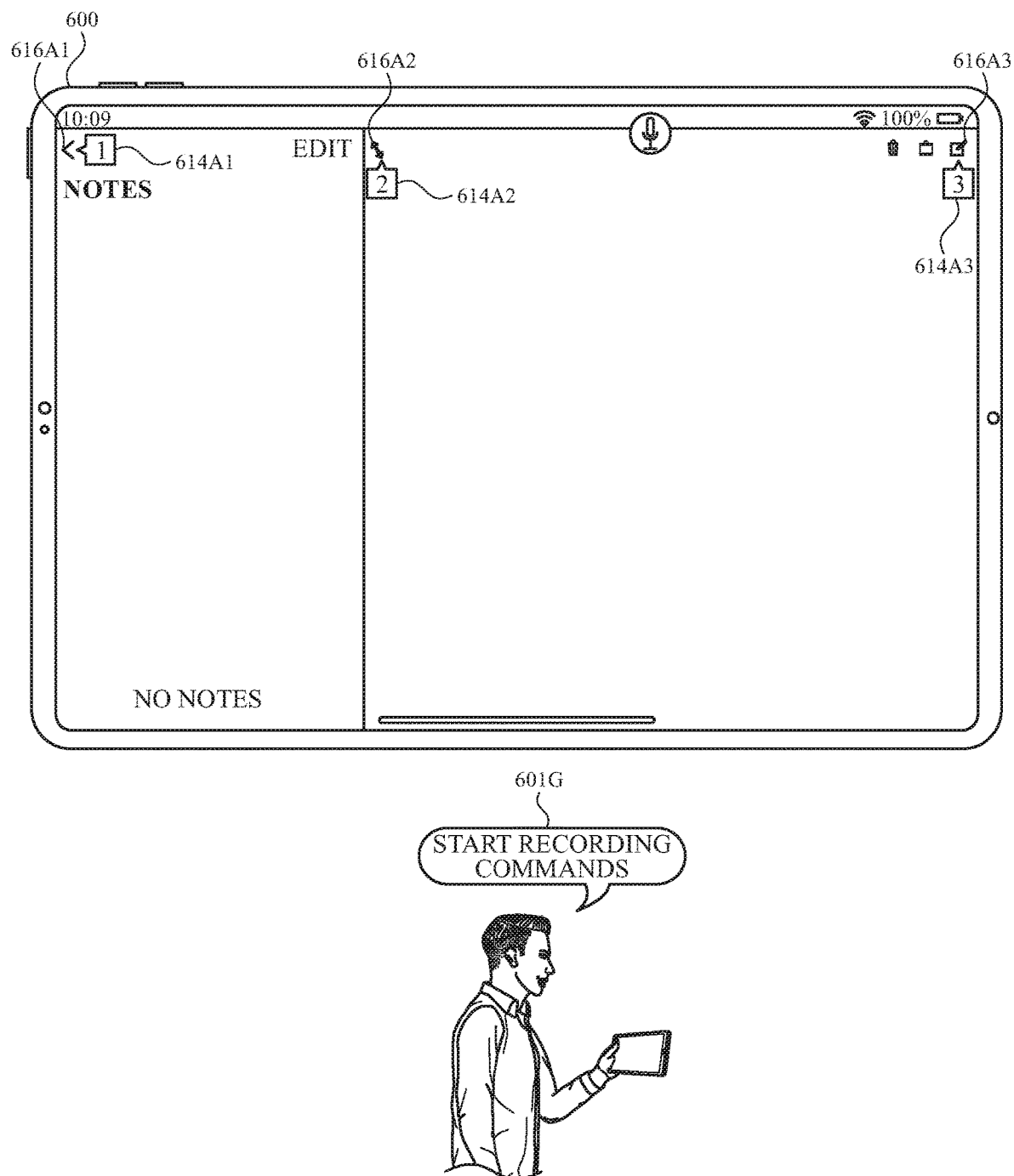

In FIG. 6G, device 600 detects, via microphone 602B, voice input 601F ("SHOW NUMBERS"), which is processed by device 600 as a request to display number-based visual cues and, in response, displays the user interface in FIG. 6H.

FIGS. 6H-6M depict an exemplary process for performing operations in response to a series of voice commands while simultaneously recording the performed operations for later performance as a macro operation. In FIG. 6H, device 600 displays affordance cues 614A, including specific affordance cues 614A1, 614A2, and 614A3. Each affordance cue corresponds to an affordance (616A1-616A3, respectively) displayed in user interface 612, and provides a visual indication of an affordance that will be affected by a voice input referencing the number of the affordance cue (e.g., affordance 616A1 if affordance cue 614A1 is referenced), as discussed in more detail, below. In some embodiments, including the present embodiment, an affordance cue is not displayed for affordances that are not in an active (e.g., selectable state).

In FIG. 6H, device 600 detects, via microphone 602B, voice input 601G ("START RECORDING COMMANDS"), which is processed by device 600 as a request to initiate a process for capturing voice-command triggered operations for later performance, and displays, in response, the user interface of FIG. 6I.

Figure 6I:
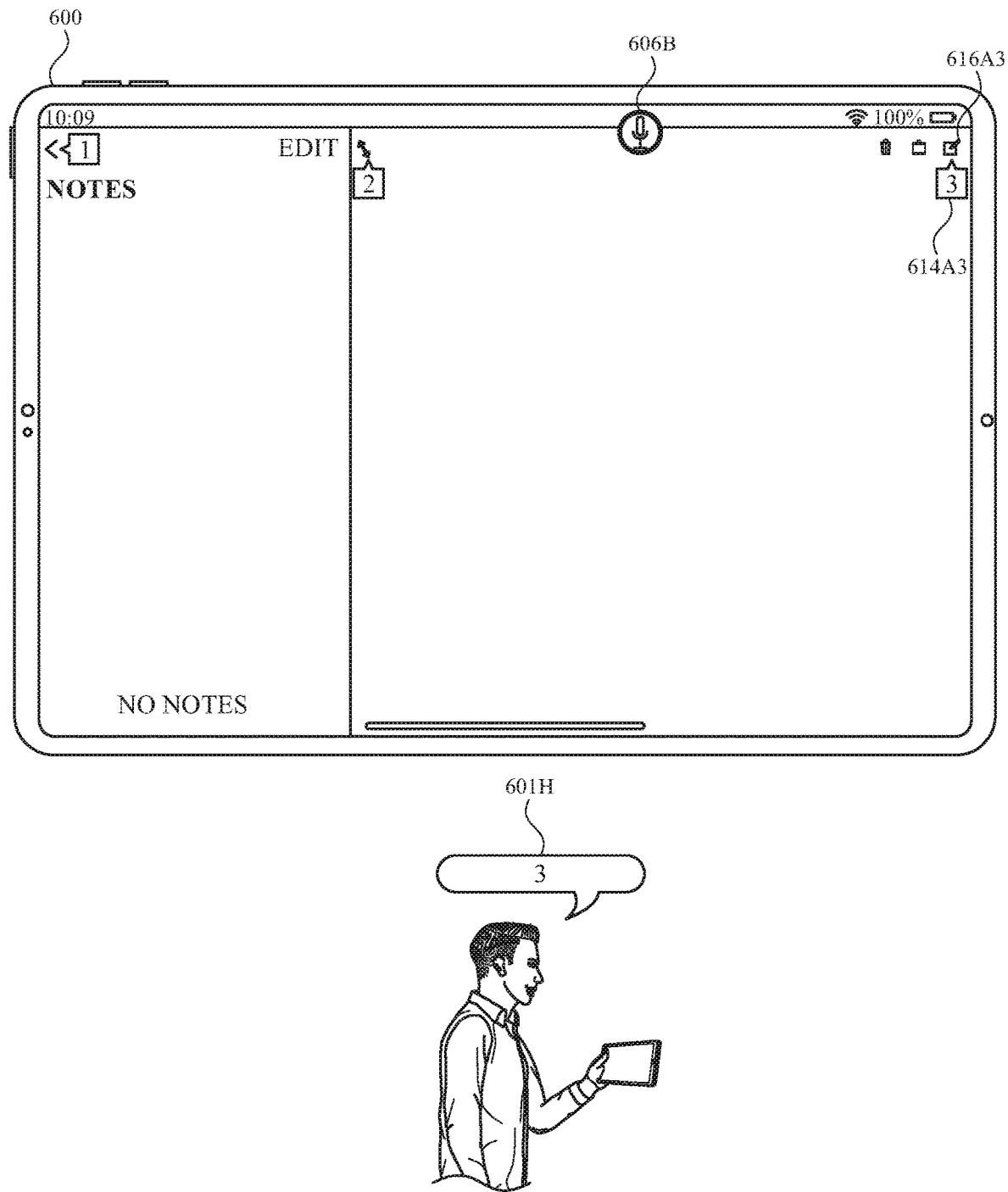

In FIG. 6I, device 600 displays voice control icon 606B having a second visual state (e.g., having a bolded appearance, having a particular color (e.g., having a primarily red color scheme)) that is different than the first visual state of voice control icon 606A. Voice control icon 606B indicates that device 600 is currently configured to both perform operations in response to received voice commands and to capture (e.g., record) those operations for later performance. In some embodiments, operations are captured in response to received voice commands, but are not also performed, while in the capture mode indicated by icon 606B.

Figure 6J:
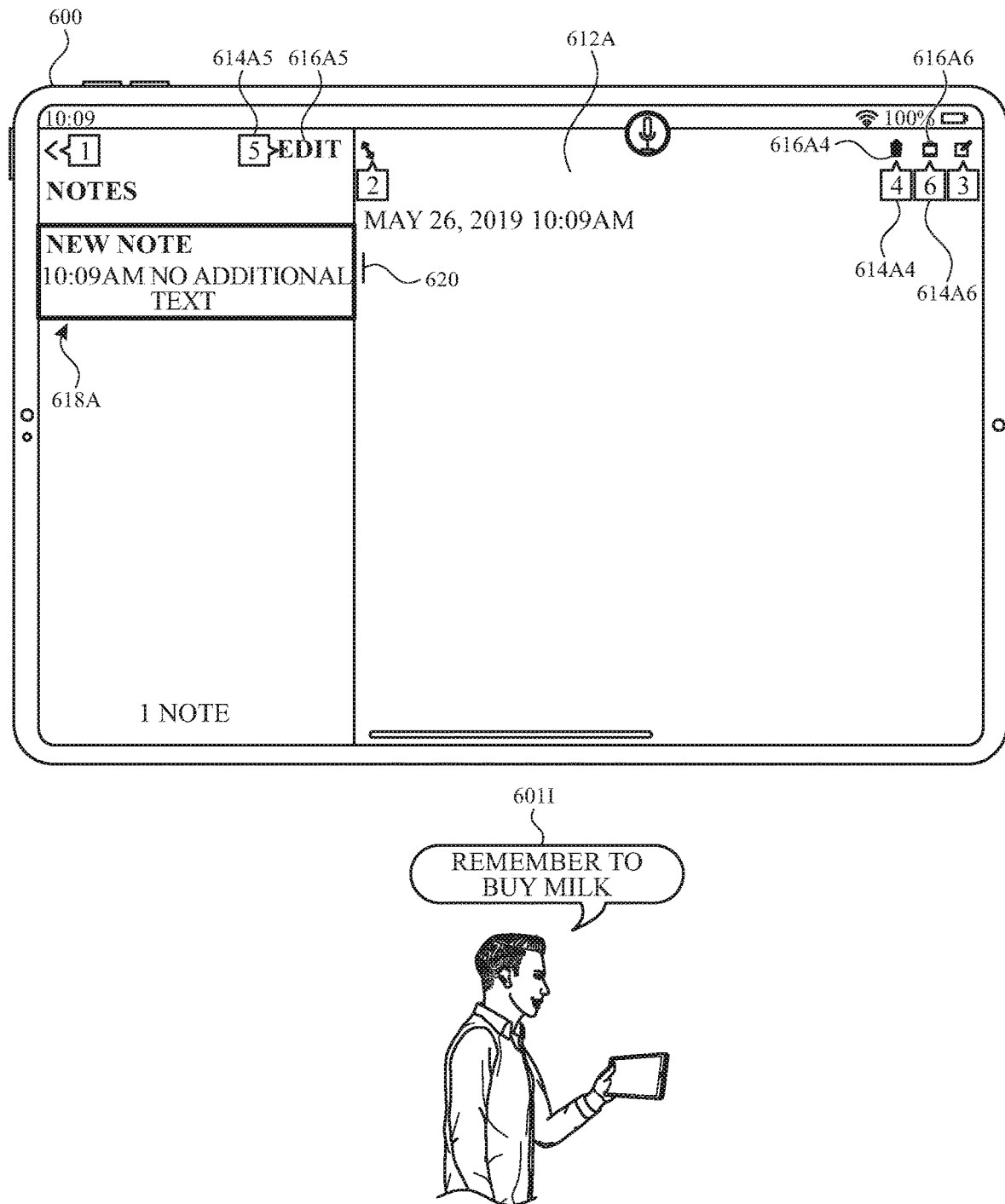

In FIG. 6I, device 600 detects, via microphone 602B, voice input 601H ("3"), which is processed by device 600 as a request to perform an operation afforded by affordance 616A3, a compose affordance, that corresponds to affordance cue 614A3, and, in response, displays the user interface in FIG. 6J. As noted above, device 600 also captures the operation for later performance.

In FIG. 6J, device 600 displays, in response to performing the operation afforded by compose affordance 616A3, notes user interface 612 with a new note (e.g., as indicated by display of note indication 618) started and a text insertion marker 620 in composition area 612A of interface 612. Device 600 also displays affordance cues 614A4, 614A5, and 614A6 corresponding to affordances 616A4, 616A5, and 616A6, respectively, which are now selectable affordances (e.g., affordances that are only selectable when a respective note is being created/edited).

Figure 6K:
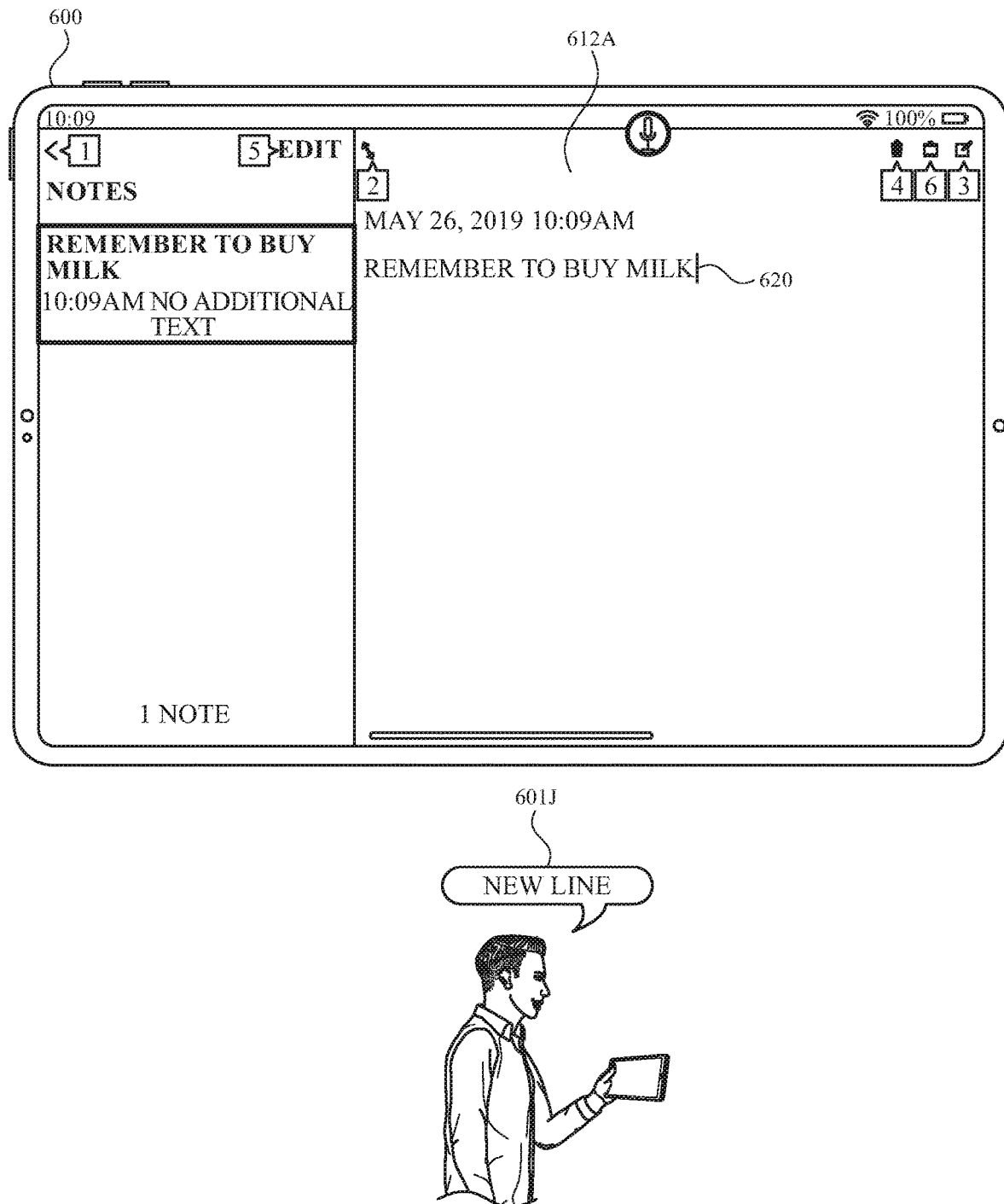

In FIG. 6J, device 600 detects, via microphone 602B, voice input 601I ("REMEMBER TO BUY MILK"), which is processed by device 600 as a dictation of the uttered phrase and a request to perform a text-entry operation, and, in response, displays the user interface in FIG. 6K. In some embodiments, while an insertion marker is displayed, voice inputs that do not match a stored command syntax are processed as dictation of the uttered phrase and a request to perform a text-entry operation. As noted above, device 600 also captures the operation for later performance.

In FIG. 6K, device 600 displays entered text ("REMEMBER TO BUY MILK") in composition area 612A. Text insertion marker 620 has moved to a position at the end of the entered text.

Figure 6L:
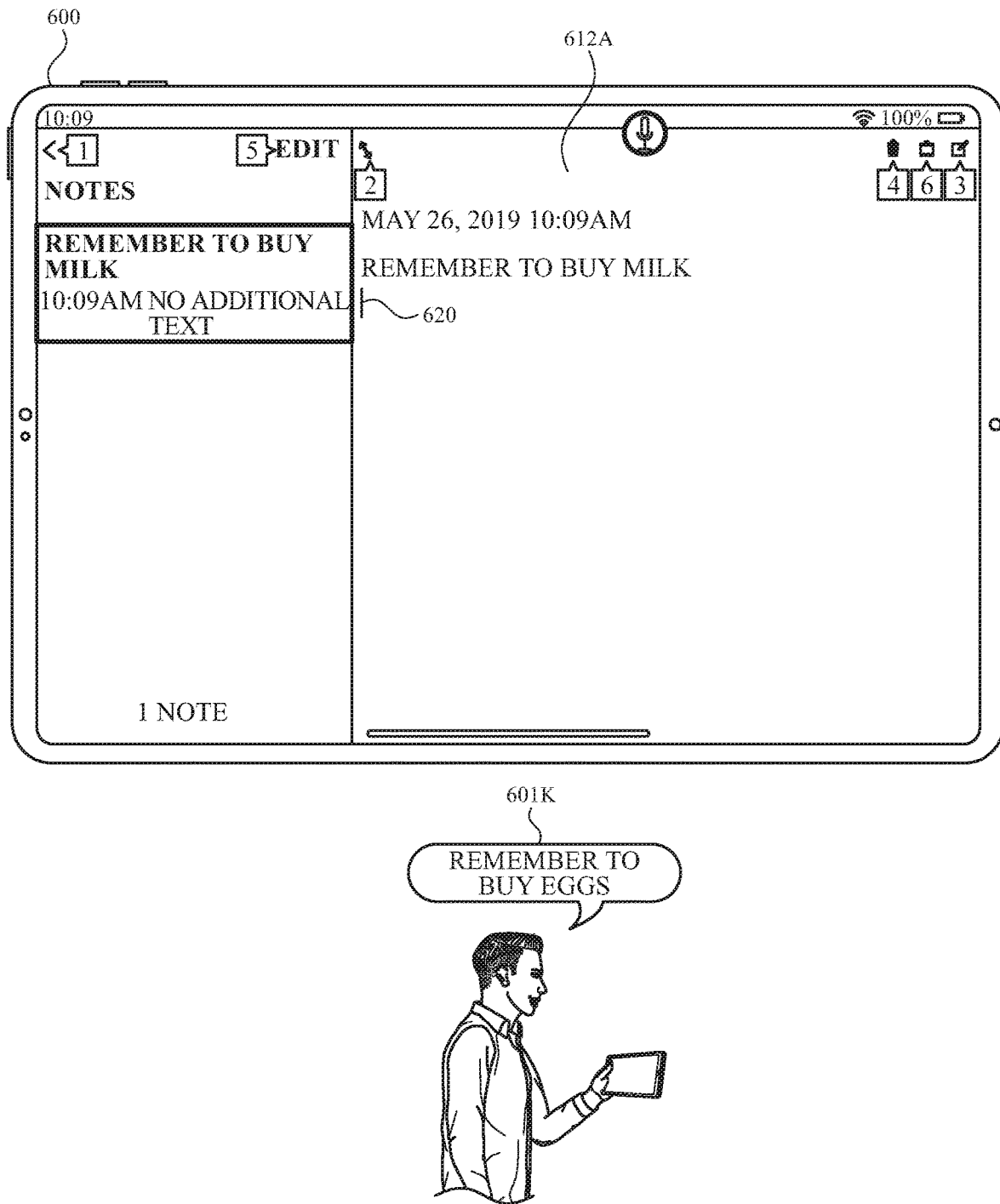

In FIG. 6K, device 600 detects, via microphone 602B, voice input 601J ("NEW LINE"), which is processed by device 600 as a request to a perform a new line (e.g., carriage return) operation, and, in response, displays the user interface in FIG. 6L. As noted above, device 600 also captures the operation for later performance.

In FIG. 6L, device 600 displays text insertion marker 620 at the start of a second line in composition area 612A.

Figure 6M:
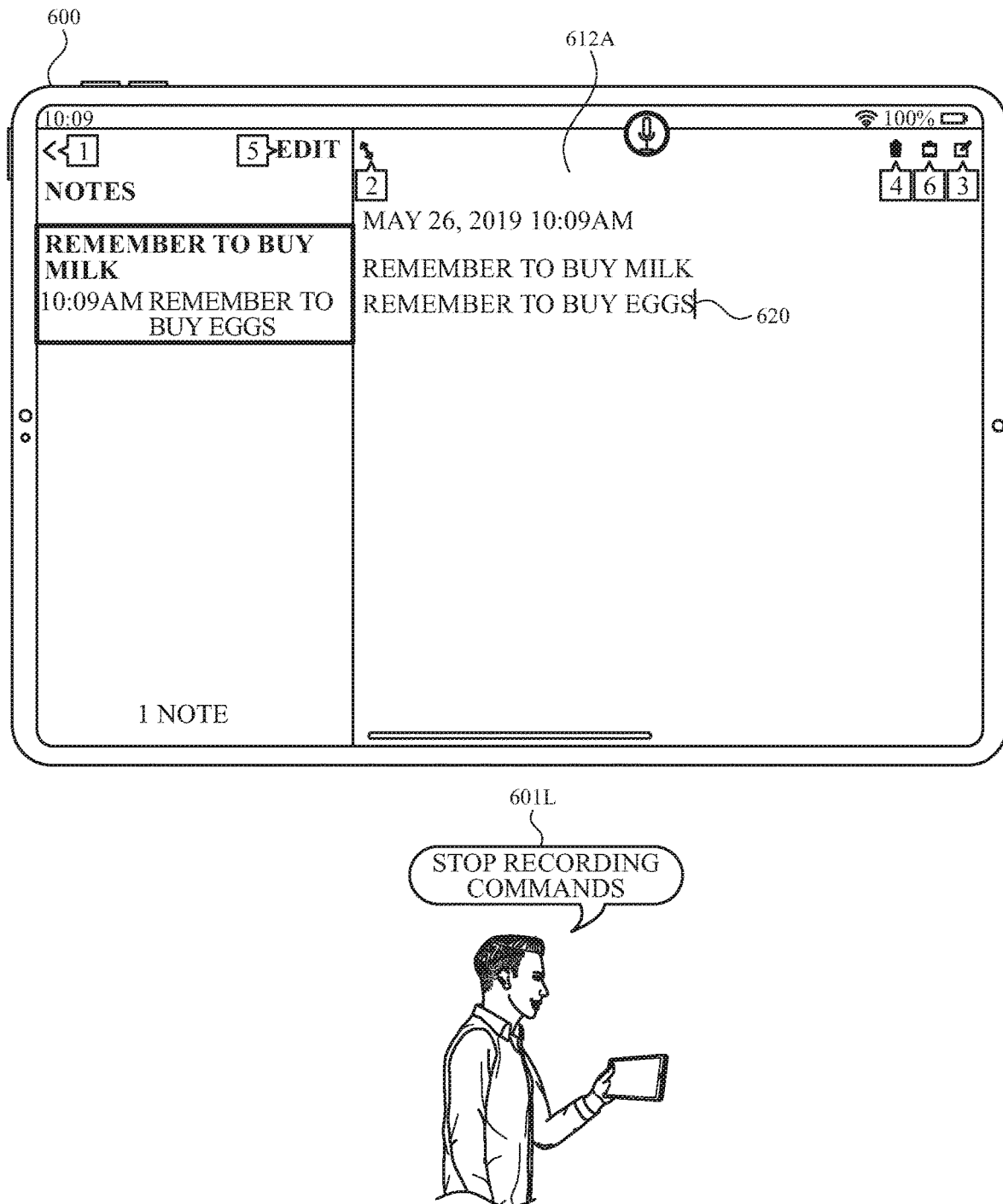

In FIG. 6L, device 600 detects, via microphone 602B, voice input 601K ("REMEMBER TO BUY EGGS"), which is processed by device 600 as a dictation of the uttered phrase and a request to perform a text-entry operation, and, in response, displays the user interface in FIG. 6M. As noted above, device 600 also captures the operation for later performance.

In FIG. 6M, device 600 displays entered text ("REMEMBER TO BUY EGGS") in composition area 612A at the second line. Text insertion marker 620 has moved to a position at the end of the newly-entered text.

In FIG. 6M, device 600 detects, via microphone 602B, voice input 601L ("STOP RECORDING COMMANDS"), which is processed by device 600 as a request to stop capturing further received voice commands for later performance and proceeds with a second phase of the process for capturing the already-received voice-command triggered operations for later performance, and displays, in response, the user interface of FIG. 6N. The operation corresponding to voice input 601L is not recorded for later performance.

Figure 6N:
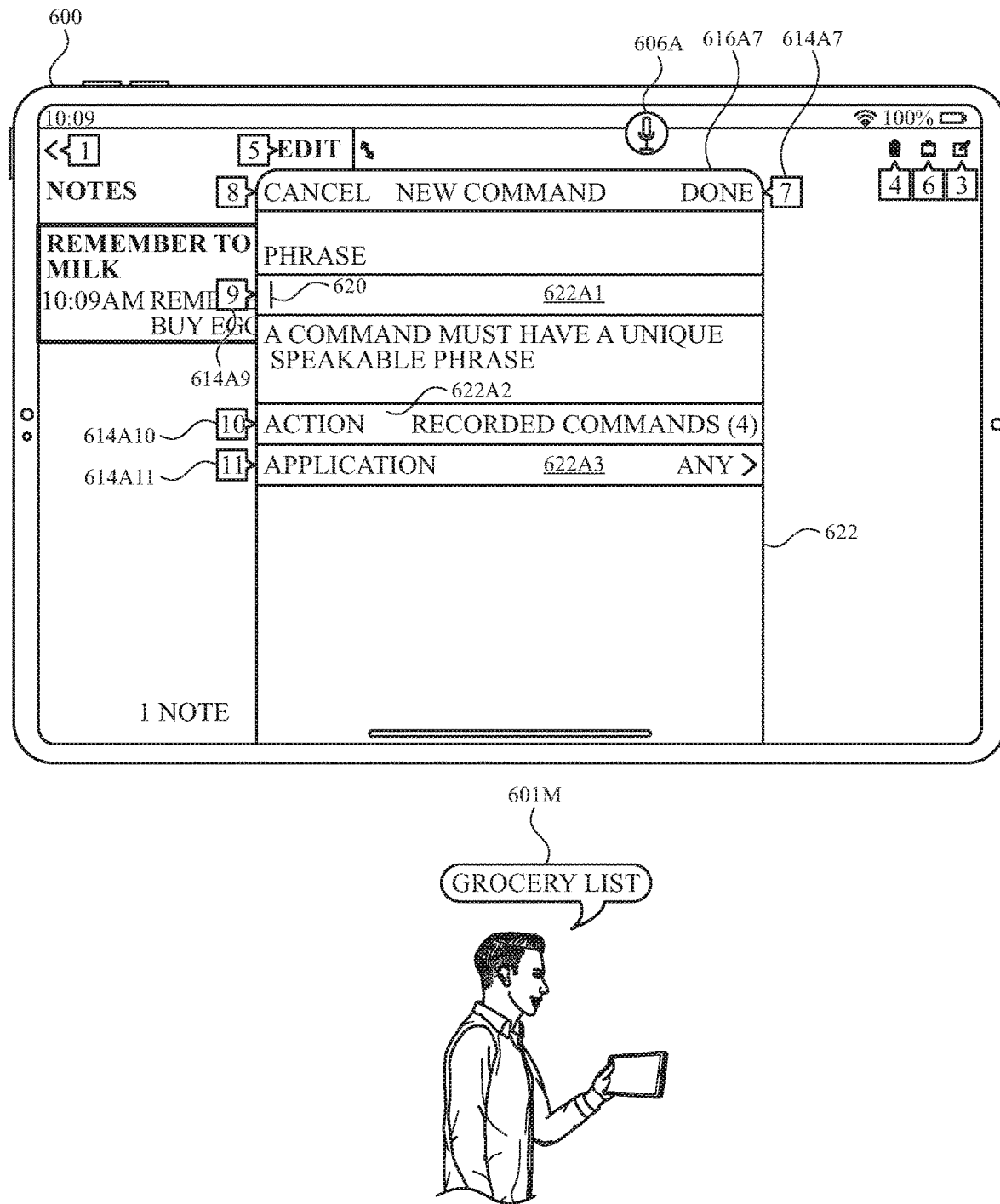

In FIG. 6N, device 600 displays a new record command interface 622 that includes selectable regions (e.g., affordances) 622A1, 622A2, and 622A3. Text insertion marker 620 is positioned in region 622A1, which corresponds to a field for entering a trigger phrase for latter performance of the operations captured in response to voice commands 601H-601L. Selectable region 622A2 when selected, displays further information about the operations (e.g., recorded commands, recorded actions) that were captured during the process shown in FIGS. 6H-6M and also provides options for modifying the operations. As shown in FIG. 6N, selectable region 622A2 includes a number ("4") corresponding to the count of recorded operations. Selectable region 622A3 indicates that the newly recorded command macro can be used in any application. Selectable region 622A3 when selected, displays options for identifying which applications that the newly recorded command macro can be used in. Device 600 also displays additional affordance cues 614A, including affordance cues 614A9, 614A10, and 614A11 corresponding to selectable regions 622A1-622A3, respectively. Device 600 also displays done affordance 616A7 with affordance cue 614A7. Device 600 also displays voice control icon 606 with state 606A, indicating that voice inputs are no longer being recorded for later performance.

Figure 6O:
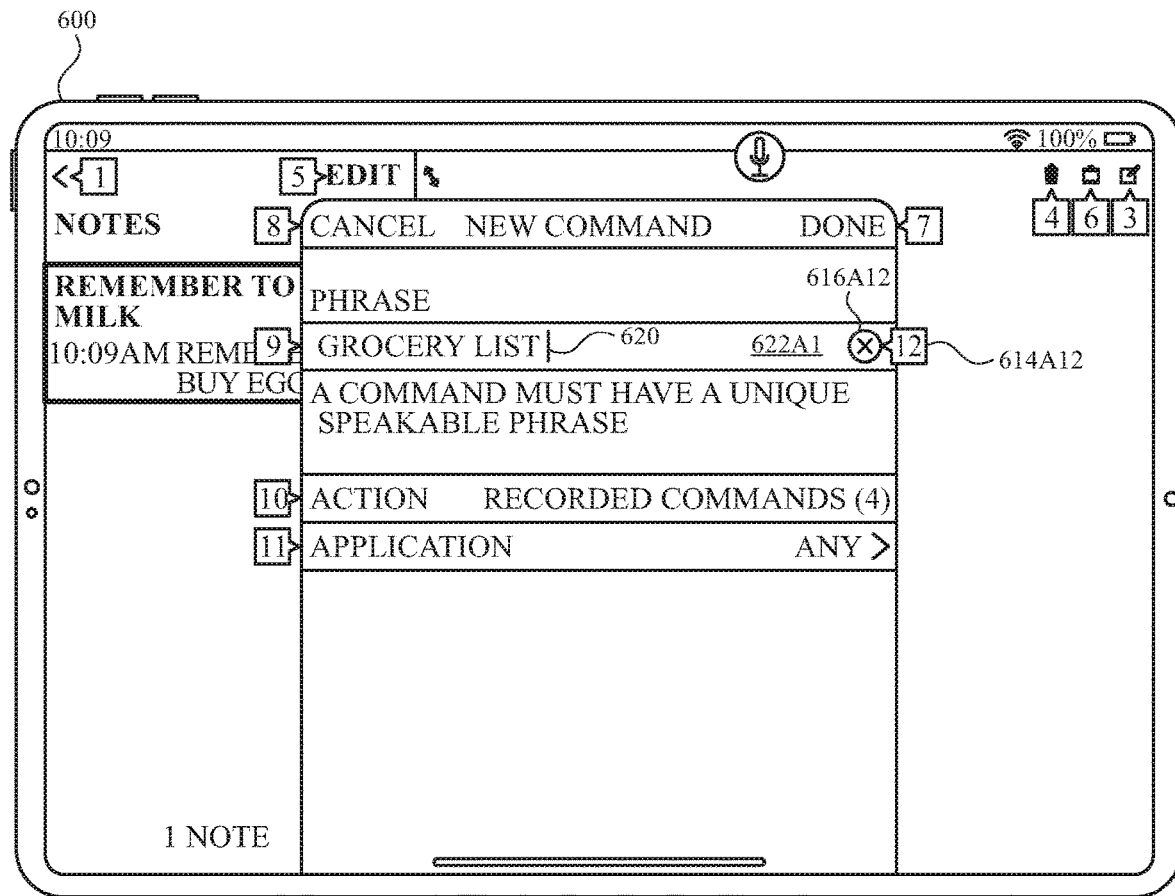
Figure 6O:
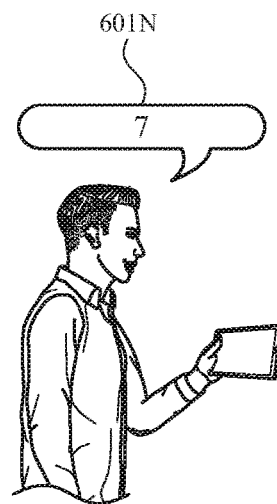

In FIG. 6N, device 600 detects, via microphone 602B, voice input 601M ("GROCERY LIST"), which is processed by device 600 as a dictation of the uttered phrase and a request to perform a text-entry operation, and, in response, displays the user interface in FIG. 6O.

In FIG. 6O, device 600 displays entered text ("GROCERY LIST") in selectable region 622A1. Text insertion marker 620 has moved to a position at the end of the newly-entered text. Device 600 also displays clear affordance 616A12 with affordance cue 614A12, now that text is entered in selectable region 622A1.

Figure 6P:
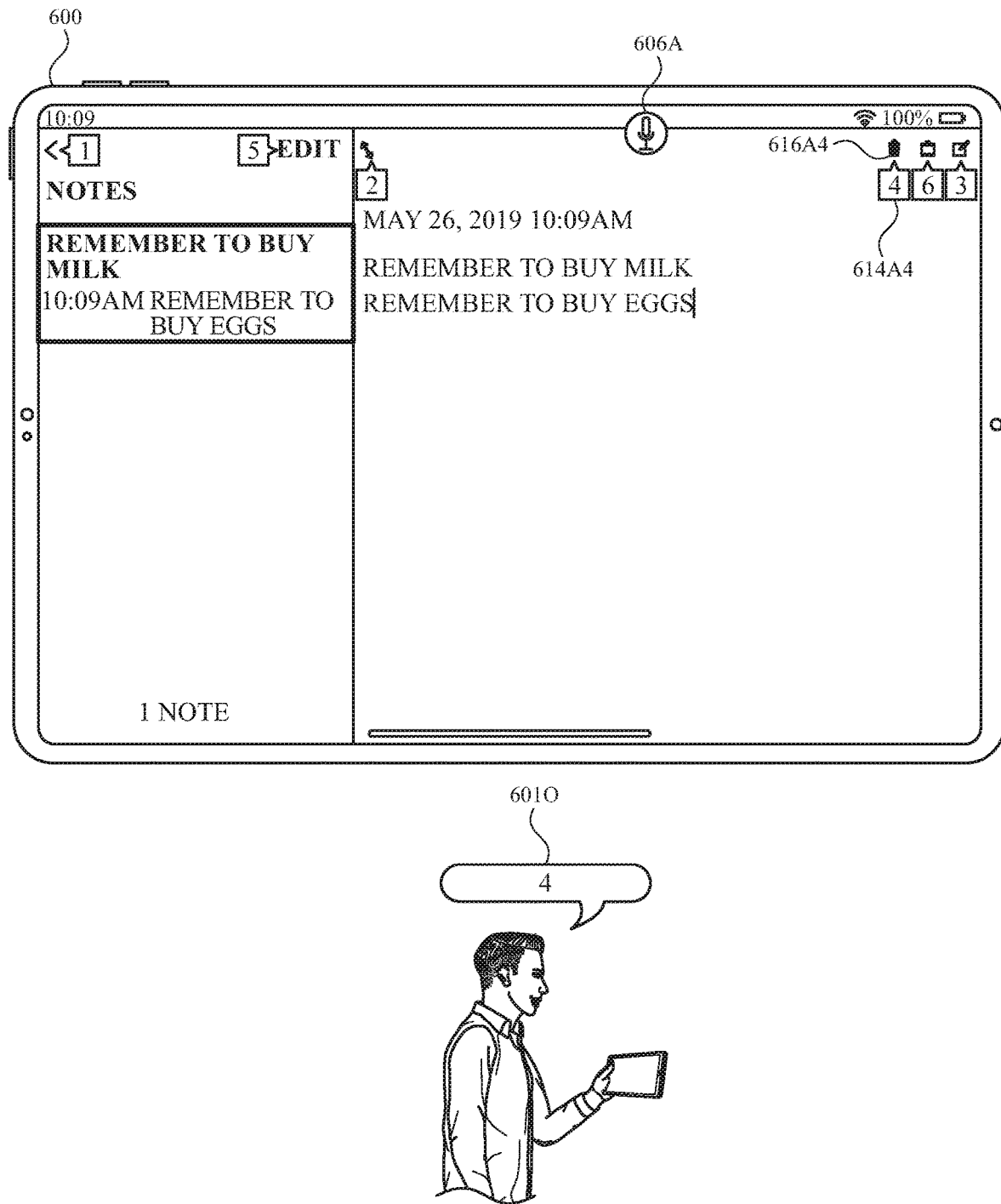

In FIG. 6O, device 600 detects, via microphone 602B, voice input 601N ("7"), which is processed by device 600 as a request to perform an operation afforded by affordance 616A7, the done affordance, that corresponds to affordance cue 614A7, and, in response, dismisses new recording command interface 622, associates the phrase "GROCERY LIST" with set of recorded operations, and displays the user interface in FIG. 6P.

In FIG. 6P, device 600 displays the same user interface as seen in FIG. 6M, except that voice control icon 606 is now shown with state 606A, since operations corresponding to voice inputs are no longer being recorded for later performance.

Figure 6Q:
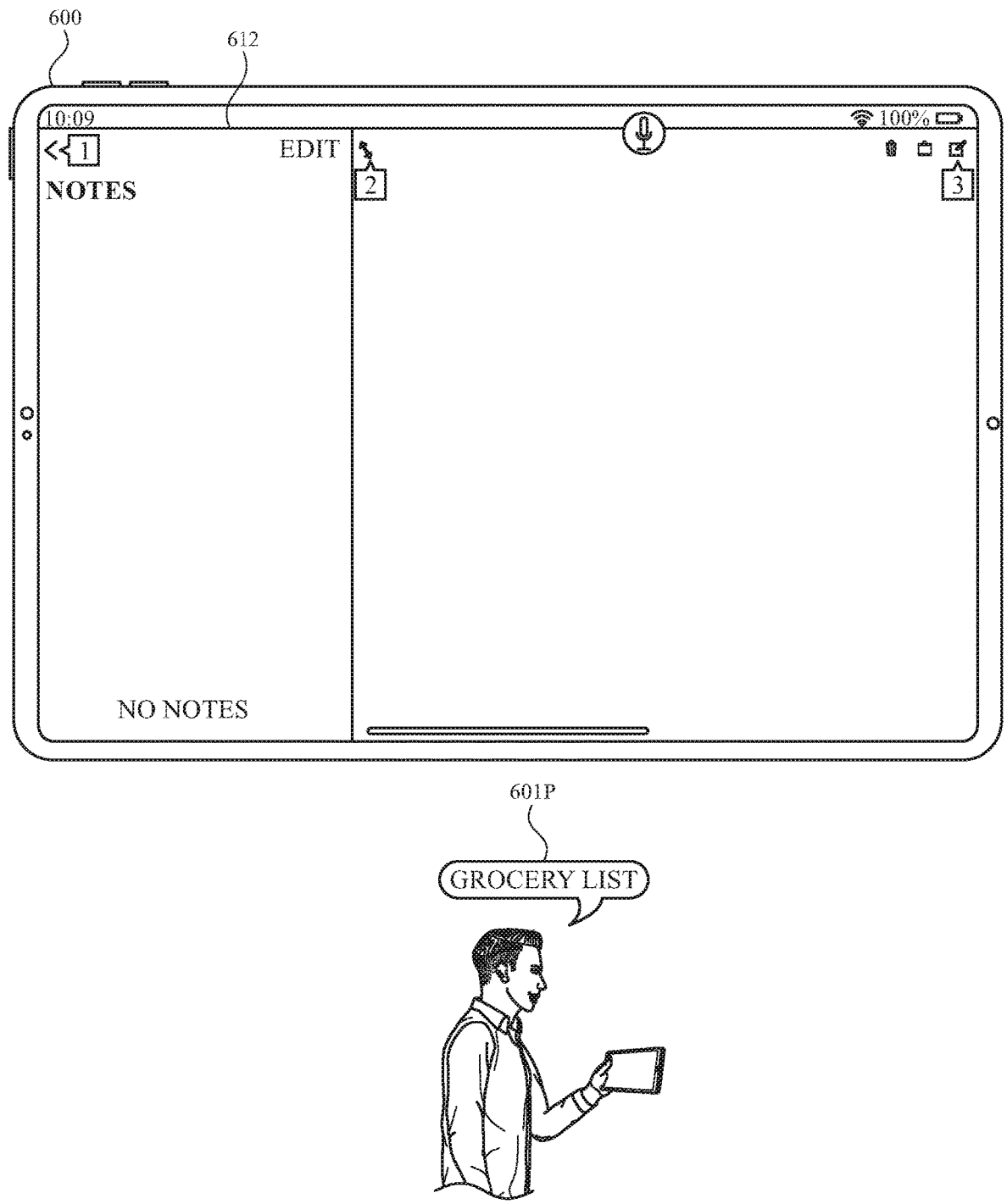
Figure 6R:
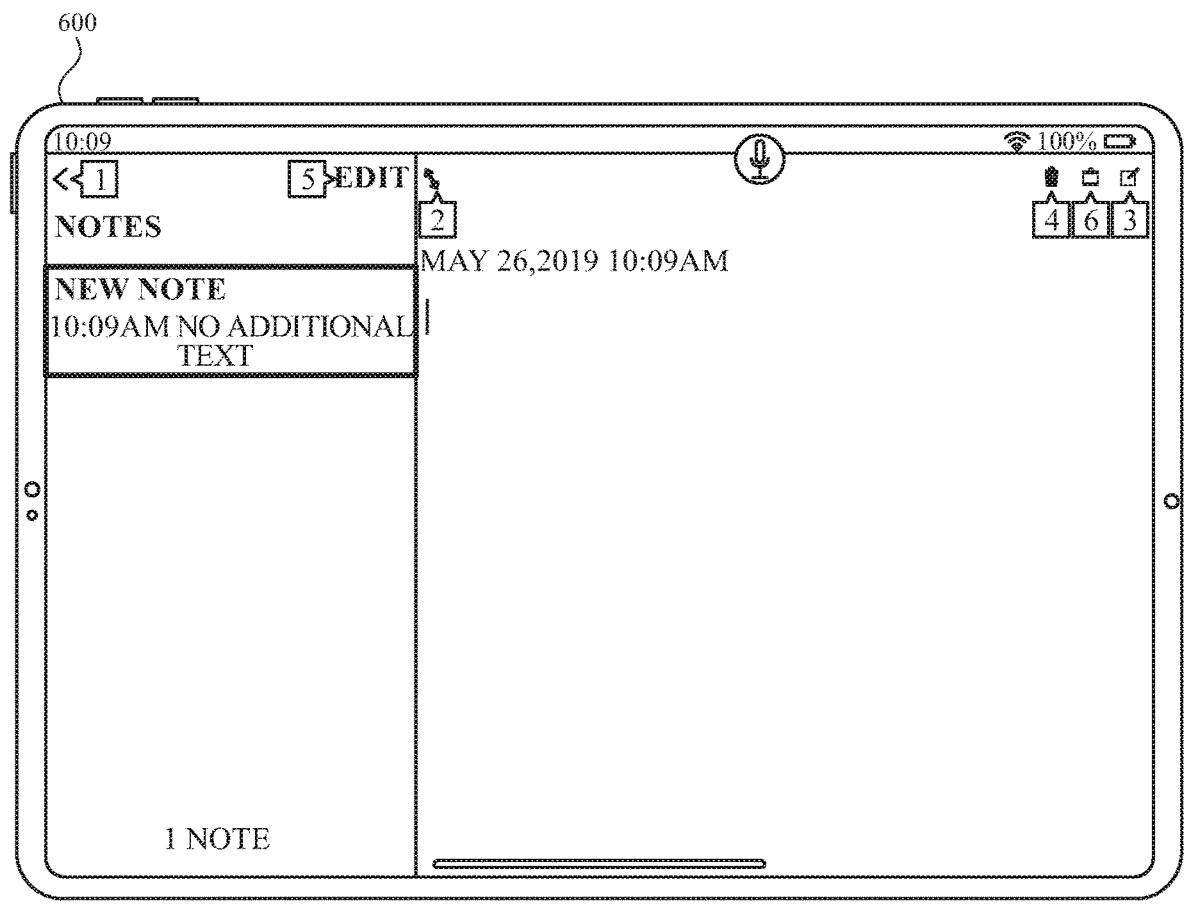
Figure 6R:
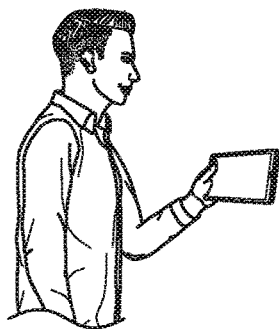
Figure 6S:
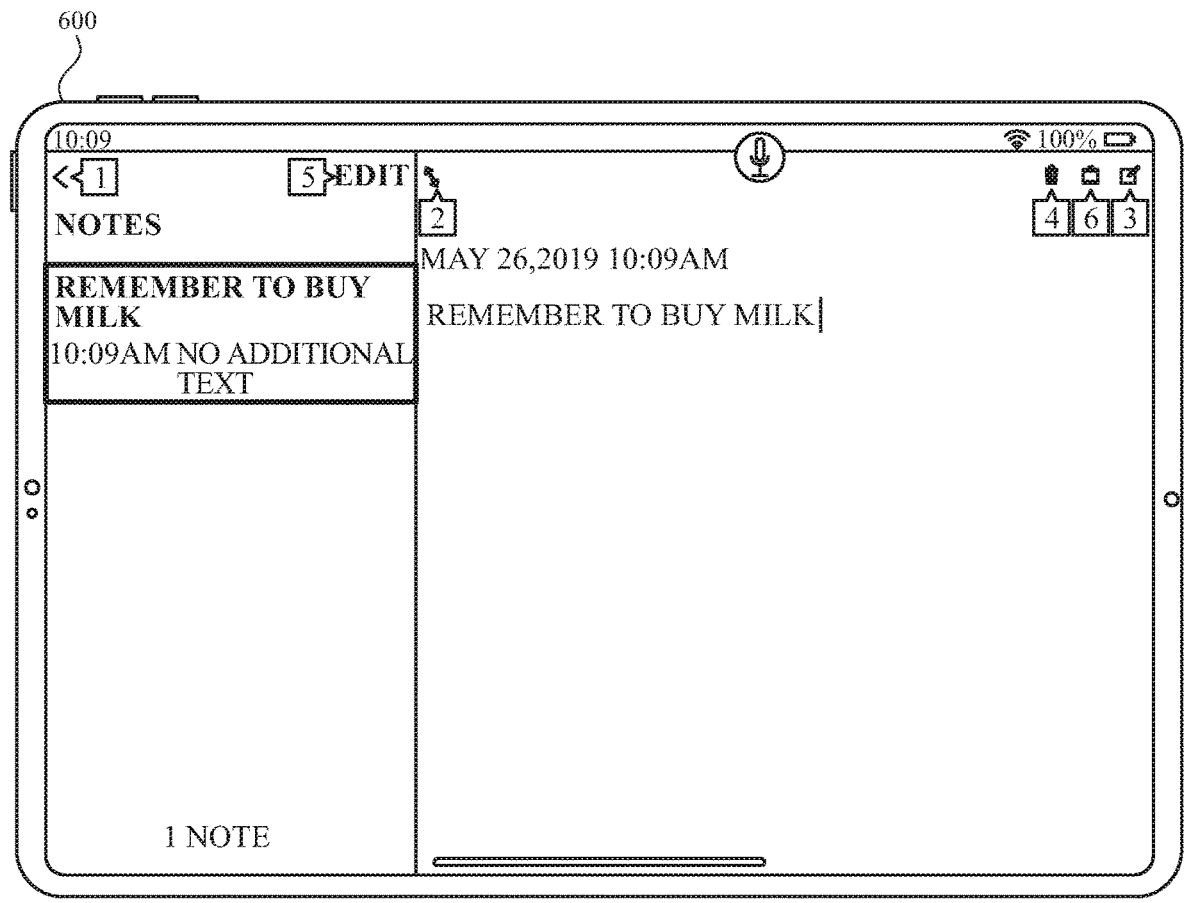
Figure 6S:
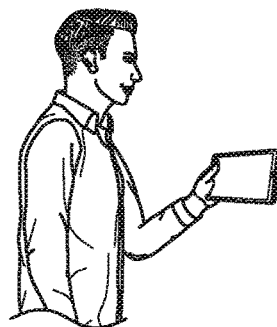
Figure 6T:
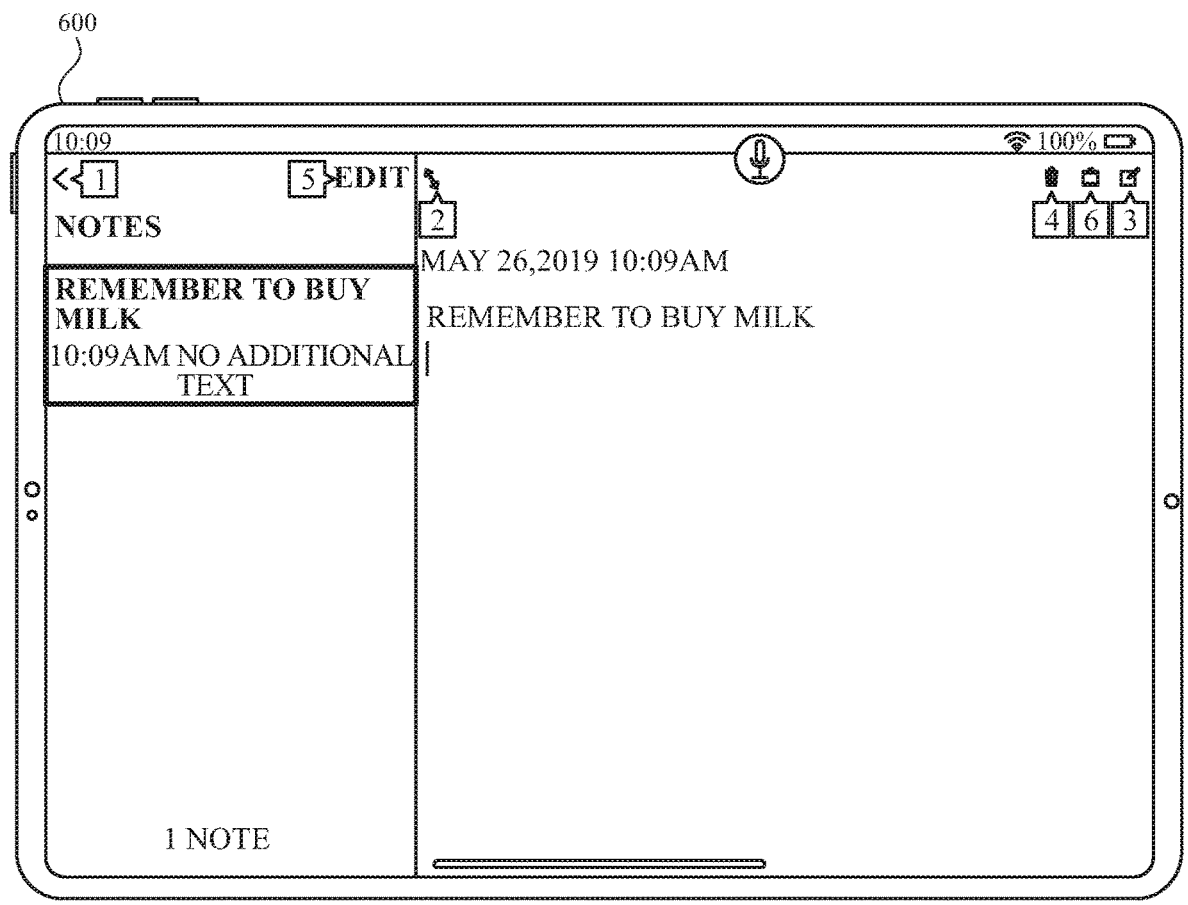
Figure 6T:
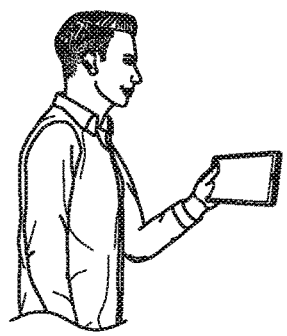
Figure 6U:
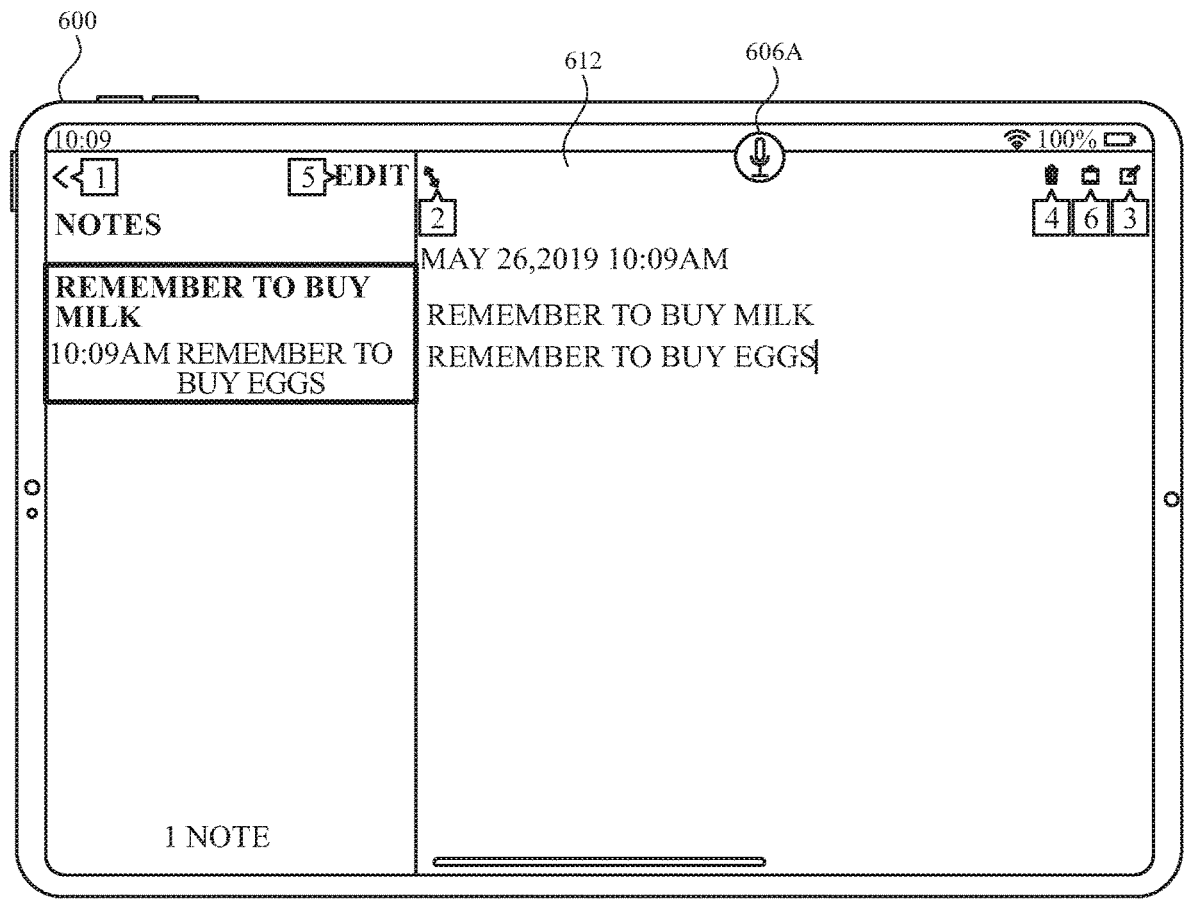
Figure 6U:
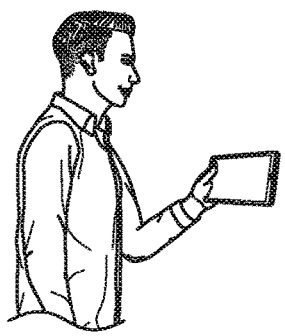

In FIG. 6P, device 600 detects, via microphone 602B, voice input 601N ("4"), which is processed by device 600 as a request to perform an operation afforded by affordance 616A4, a delete affordance, that corresponds to affordance cue 614A4, and, in response, displays the user interface in FIG. 6Q.

In FIG. 6Q, device 600 displays notes user interface 612 in the same state as shown in FIG. 6H, after the note shown in FIG. 6P has been deleted. Because no note is selected and active, certain note-specific affordances are now inactive and affordance cues are not displayed for those inactive affordances.

In FIG. 6Q, device 600 detects voice command 601P ("GROCERY LIST"), which is processed by device 600 as a request to perform the command macro recorded and stored in the process shown in FIGS. 6H-6M, and, in response, displays the user interfaces of FIGS. 6R-6U.

In FIGS. 6R-6U, device 600 performs, in order, the series of recorded operations of the command macro recorded and stored in the process shown in FIGS. 6H-6M. Device 600 does so automatically, without detecting further inputs, including voice inputs from user 601. At the completion of performance of the recorded commands, in FIG. 6U, device 600 displays user interface 612 with the same state as that of FIG. 6M, except that voice control icon 606 is shown with visual state 606A, rather than visual state 606B.

FIGS. 6V-6Z show a touch input-based process for viewing and modifying the command macro recorded and stored in the process shown in FIGS. 6H-6M (the "GROCERY LIST" command macro, along with any other stored command macros. In some embodiments, voice commands can be used to perform a similar process for viewing and modifying the "GROCERY LIST" command macro.

Figure 6V:
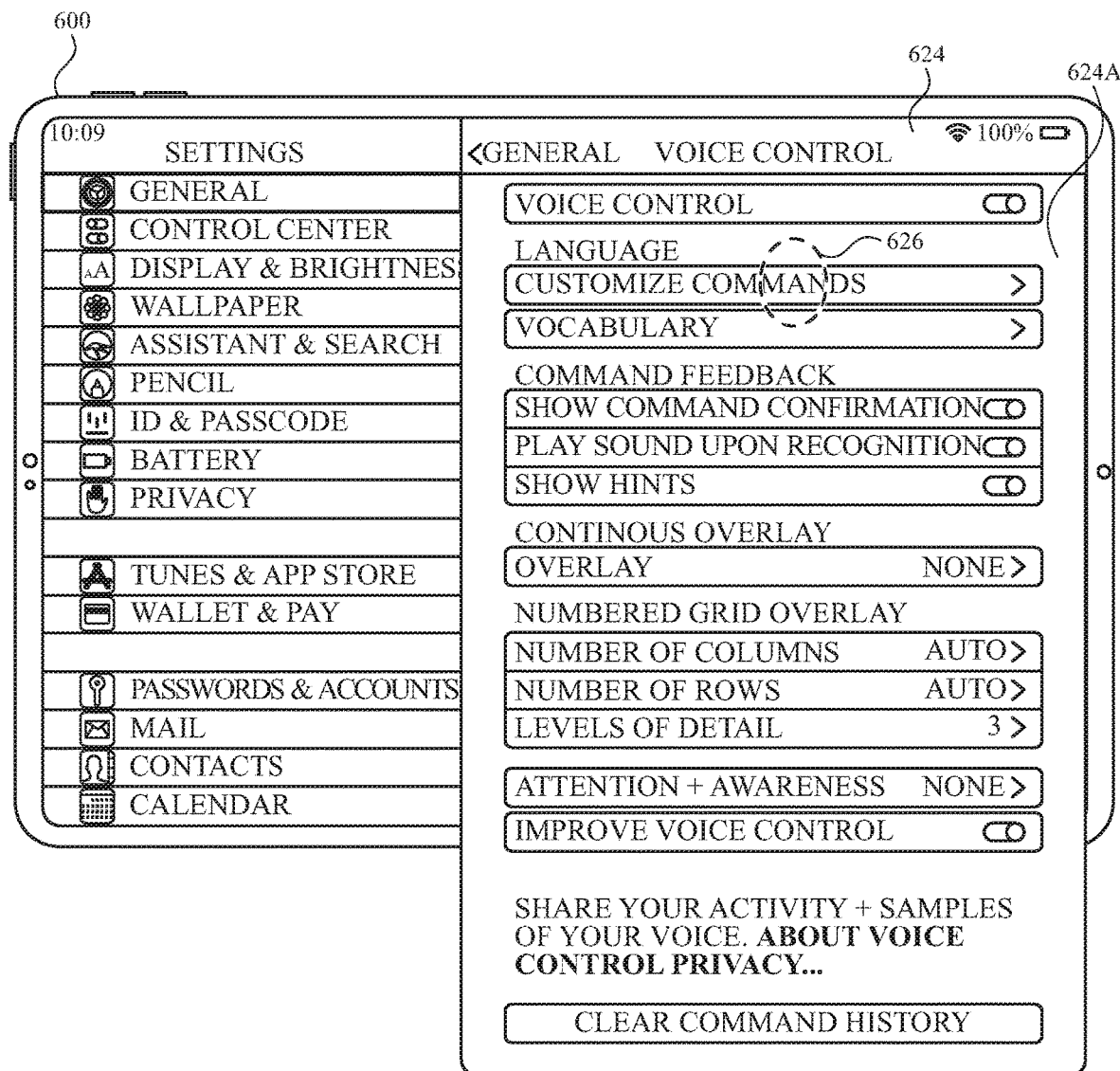

In FIG. 6V, device 600 displays voice control settings interface 624 that includes a plurality of options for configuring one or more features of voice control operations on device 600, some of which are discussed in more detail, below, with respect to various embodiments of the present disclosure. Interface 624 includes a selectable region 624A corresponding to voice command customization options, including option(s) affecting stored command macros (e.g., the "GROCERY LIST" command macro).

Figure 6W:
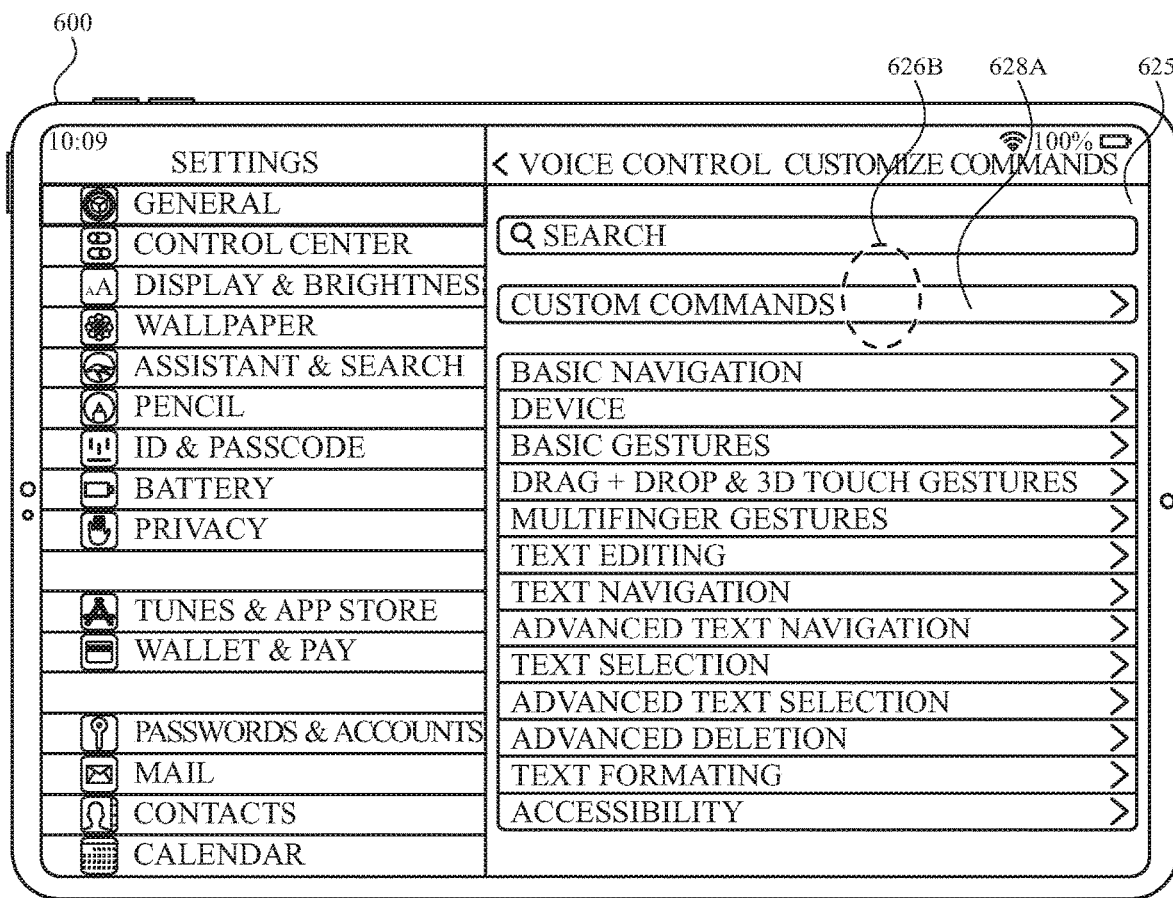

In FIG. 6V, device 600 detects, via touch-sensitive display 602A, a touch input 626A (e.g., a tap gesture) and, in response, displays the user interface of FIG. 6W.

In FIG. 6W, device 600 displays customize commands interface 628 that includes a plurality of options for configuring voice commands that can be processed at device 600, including stored command macros. Interface 628 includes selectable region 628A corresponding to stored command macros (e.g., the "GROCERY LIST" command macro).

Figure 6X:
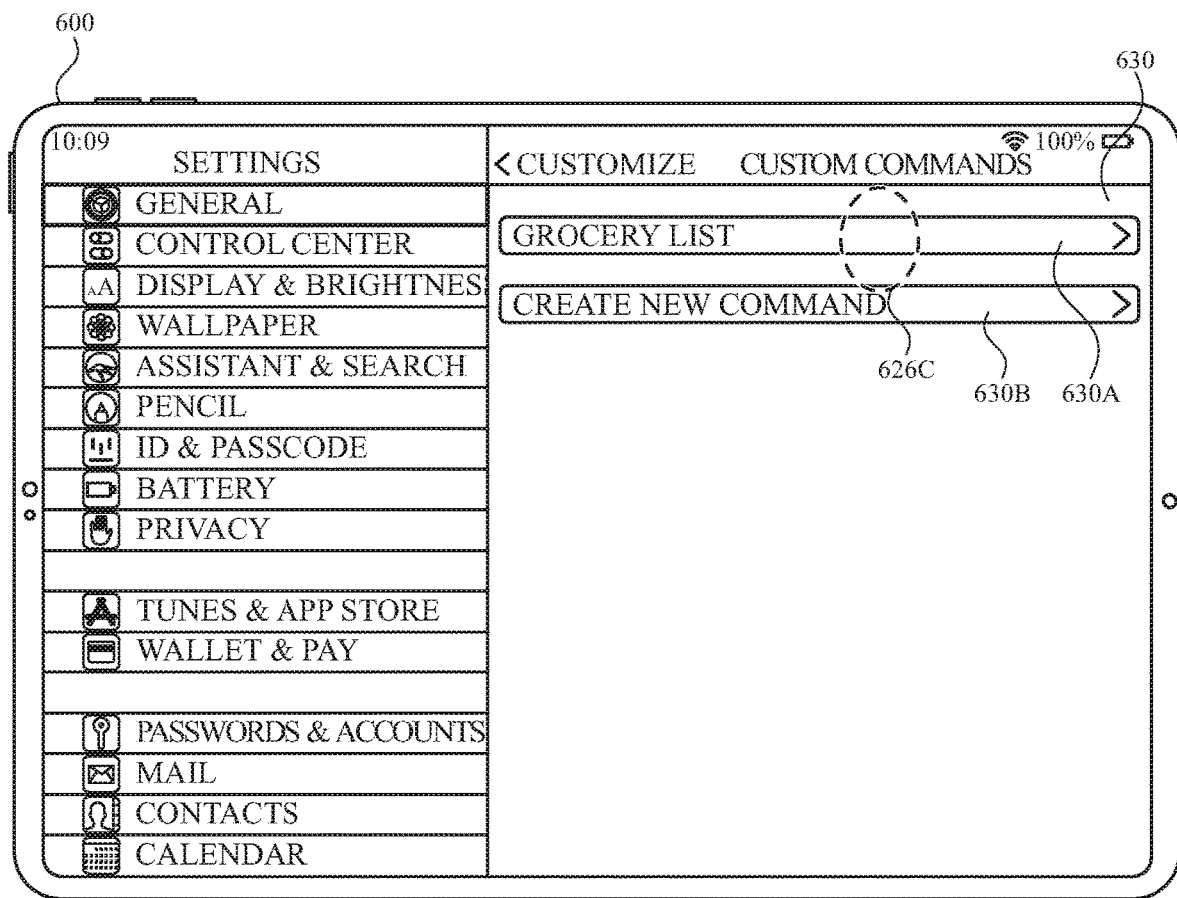

In FIG. 6W, device 600 detects, via touch-sensitive display 602A, a touch input 626B (e.g., a tap gesture) and, in response, displays the user interface of FIG. 6X.

In FIG. 6X, device 600 displays custom commands interface 630 that includes a plurality of options relating to stored command macros. Interface 630 includes a selectable region 630A that, when selected, provides information and options relating the "GROCERY LIST" command macro. Interface 630 also includes a selectable region 630B that, when selected, initiates a process for creating a new command macro (e.g., creating using touch and/or voice inputs).

Figure 6Y:
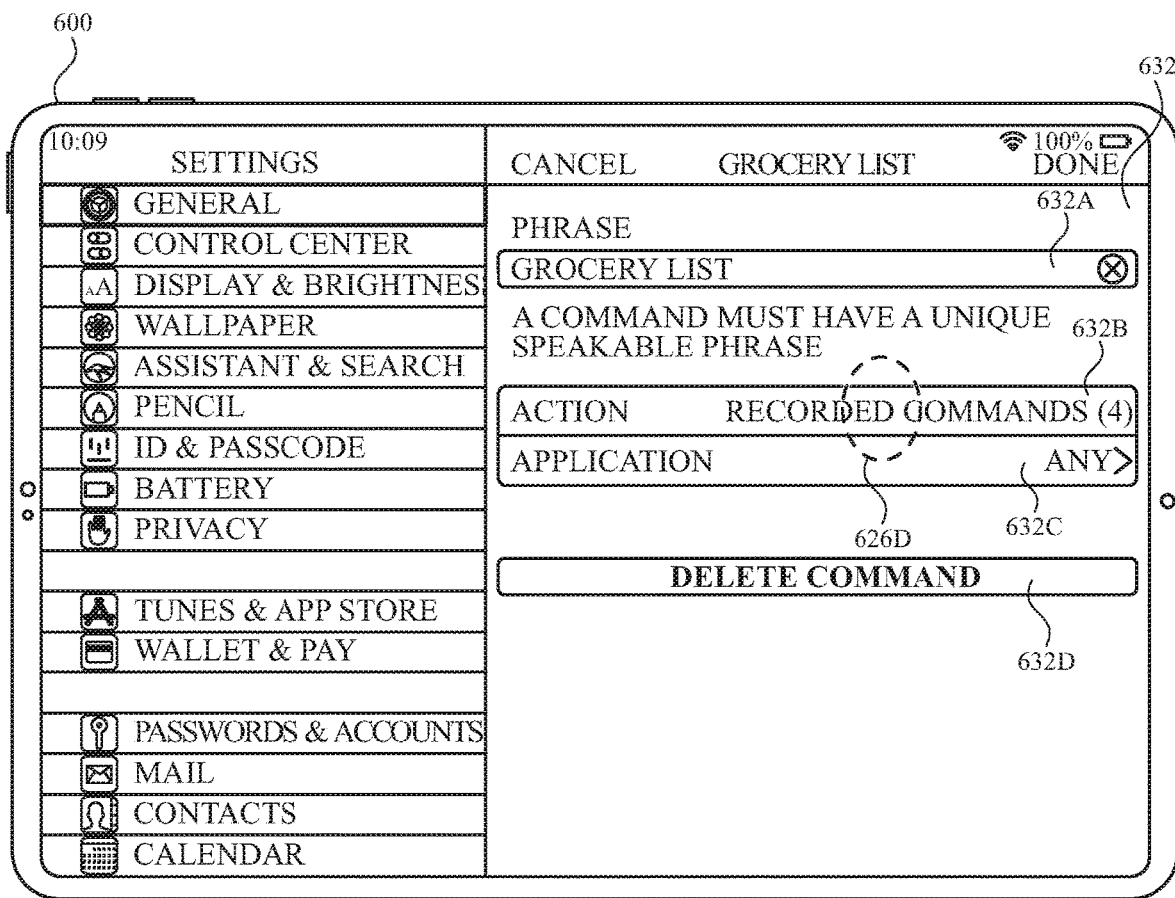

In FIG. 6X, device 600 detects, via touch-sensitive display 602A, a touch input 626C (e.g., a tap gesture) and, in response, displays the user interface of FIG. 6Y.

In FIG. 6Y, device 600 displays command macro interface 630, specific to the "GROCERY LIST" command macro, that includes a plurality of options relating to the "GROCERY LIST" command macro. Interface 630 includes a selectable region 632A that provides an option to modify the voice input trigger phrase for causing performance of the command macro. Interface 630 also includes a selectable region 632B that provides further information about the operations (e.g., recorded commands, recorded actions) that are associated with the "GROCERY LIST" command macro and also provides options for modifying those operations. Interface 630 also includes a selectable region 632C that provides options for identifying which applications that the "GROCERY LIST" command macro can be used in. As shown in FIG. 6Y, selectable region 632C indicates that the command macro is available in any application. Interface 630 also includes a selectable region 632D that, when selected, causes deletion of the "GROCERY LIST" command macro such that uttering the phrase will no longer cause performance of the associated recorded commands.

In FIG. 6Y, device 600 detects, via touch-sensitive display 602A, a touch input 626D (e.g., a tap gesture) and, in response, displays the user interface of FIG. 6Z.

In FIG. 6Z, device 600 displays action interface 634, specific to the "GROCERY LIST" command macro, that includes information about the operations (e.g., recorded commands, recorded actions) that are associated with the "GROCERY LIST" command macro and options for modifying those operations. Interface 634 includes a plurality of delete options 634A1-634A4 that correspond, respectively, to recorded operation affordances 634B1-634B4. Selection of a delete affordance removes the corresponding recorded operation from the "GROCERY LIST" command macro. In some embodiments, recorded operation affordances 634B can be used to adjust (e.g., via touch-and-drag gestures) the order in which recorded operations are performed. Interface 634 also includes a plurality of selectable regions 634C1-634C4 that correspond to options for adding additional commands to the command macro. Selectable region 634C1, when selected, initiates a process for adding a text insertion command into the command macro. Selectable region 634C2, when selected, initiates a process for adding a data (e.g., formatted data) insertion command into the command macro. Selectable region 634C3, when selected, initiates a process for using one or more automated workflow processes (e.g., workflow processes involving a digital assistant) to add one or more commands to the command macro. Selectable region 634C4, when selected, initiates a process for adding operations that correspond to touch gestures (e.g., swipe gestures, tap gestures, double-tap gestures), or combinations of touch gestures, into the command macro. In some embodiments, interface 634 includes additional selectable regions for adding other commands such as image insertion commands.

FIGS. 7A-7B is a flow diagram illustrating a method 700 voice-based control of electronic devices in accordance with some embodiments. Method 700 is performed at a device (e.g., 100, 300, 500, 600) with a display device (e.g., 602A). Some operations in method 700 are, optionally, combined, the orders of some operations are, optionally, changed, and some operations are, optionally, omitted.

As described below, method 700 provides an intuitive way for voice-based control of electronic devices. The method reduces the cognitive burden on a user for enlarging user interface elements, thereby creating a more efficient human-machine interface. For battery-operated computing devices, enabling a user to utilize user interface elements faster and more efficiently conserves power and increases the time between battery charges.

While the electronic device is in a first mode (e.g., an operation recording mode), the electronic device (e.g., 600) (e.g., a personal computer, a laptop computer, a smartphone, a tablet computer) detects (702) a first set of one or more inputs including detecting, in a respective order and via the microphone (e.g., 602B), a plurality of utterances (e.g., 601H-601L) corresponding to a plurality of operations (e.g., operations performed in FIGS. 6K-6M), including: a first utterance (704) (e.g., 601H) corresponding to a request to perform a first operation; and a second utterance (706) (e.g., 601I) corresponding to a request to perform a second operation, detected after the first utterance.

In response to detecting the plurality of utterances, the electronic device associates (708) the plurality of operations with a first stored operation set (e.g., a command macro, an ordered set of stored operations) (e.g., associating operations corresponding to commands 601H, 601I, 601J, and 601K). In some embodiments, the first set of one or more inputs includes an input that associates the first stored operation set with an uttered phrase (e.g., a trigger phrase that, when detected, causes the electronic device to perform the operations associated with the first stored operation set) (e.g., the "GROCERY LIST" command macro of FIG. 6O). In some embodiments, associating the plurality of operations with a first stored operation set reduces the number of inputs needed to perform the stored operation set. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

After detecting the plurality of utterances, the electronic device detects (710) a second set of one or more inputs (e.g., 601P) corresponding to a request to perform the operations associated with the first stored operation set (e.g., detecting, via the microphone, a trigger phase associated with/assigned to the first stored operation set).

In response to (712) detecting the second set of one or more inputs, in accordance with a determination that a set of performance criteria are met, the electronic device performs (714) the plurality of operations associated with the first stored operation set, in the respective order (e.g., operations shown in FIGS. 6R-6U). In some embodiments, the set of performance criteria includes a criterion that is met when the electronic device is in a second mode (e.g., a mode that is not an operation recording mode; a mode in which stored operations can be executed).

In response to (712) detecting the second set of one or more inputs, in accordance with a determination that a set of performance criteria are not met, the electronic device forgoes (716) performing the plurality of operations associated with the first stored operation set. In some embodiments, the set of performance criteria includes a criterion that is met when the electronic device is in a second mode (e.g., a mode that is not an operation recording mode; a mode in which stored operations can be executed) (e.g., the mode of FIG. 12F).

In some embodiments, in response to detecting the plurality of utterances while in the first mode, the electronic device performs the plurality of operations (e.g., operations shown in FIGS. 6R-6U) in the respective order (e.g., performing each operation of the plurality of operations as the respective utterance is detected). In some embodiments, while recording a voice command macro, the electronic device performs the operations of each received voice command. In some embodiments, while recording a voice command macro, the electronic device does not perform the operations of each received voice command (e.g., the commands are stored for later performance, but not performed while recording). In some embodiments, performing the operations in response to detecting the plurality of utterances reduces the number of inputs needed to perform the operations. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of performance criteria includes a criterion that is met when a first application (e.g., the application of notes user interface 618) (e.g., a particular application, a designated application) is active. In some embodiments, the set of performance criteria is not met when a second application is active (e.g., an application that has not been designated as an application that can used with the first stored operation set). In some embodiments, the first stored operation set is only available for performance with a designated set of applications.

In some embodiments, the electronic device displays (718), via the display device, a graphical indication (e.g., 606) (e.g., an icon, a dynamic icon; an icon with an appearance that indicates whether the electronic device is currently recording voice commands for later execution). In some embodiments, in accordance with (720) a determination that the electronic device is in the first mode, a first visual property (e.g., a background color, a foreground color, a predominate color) of the graphical indication is in a first visual state (e.g., 606B) (e.g., red). In some embodiments, in accordance with (722) a determination that the electronic device is not in the first mode, the first visual property of the graphical indication is in a second visual state (e.g., 606A) (e.g., green), different from the first visual state. In some embodiments, conditionally displaying the graphical indication of the current voice-control state of the electronic device provides improved visual feedback as to the availability of voice-control. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of one or more inputs includes an input (e.g., 601M) that associates the first stored operation set with an uttered phrase (e.g., a trigger phrase; a voice command phrase). In some embodiments, as a part of detecting the second set of one or more inputs, the electronic device detects, via the microphone, the uttered phrase. In some embodiments, the process of creating the first stored operation set includes assigning a voice command trigger phrase that is later used to execute the first stored operation set.

In some embodiments, after associating the plurality of operations with a first stored operation set, the electronic device displays a first user interface (e.g., 634) (e.g., an interface for customizing/editing the first stored operation set) associated with the first stored operation set. In some embodiments, while displaying the first user interface, the electronic device detects a third set of one or more inputs. In some embodiments, in response to detecting the third set of one or more inputs, the electronic device, in accordance with the third set of one or more inputs including a request to disassociate (e.g., an input selecting 634A1) the first operation of the plurality of operations from the first stored operation set, modifies the first stored operation set to no longer include the first operation (e.g., such that later execution of the first stored operation set does not include performing the first operation). In some embodiments, the electronic device, in accordance with the third set of one or more inputs including a request to associate (e.g., an input selecting 634C1) a third operation with the first stored operation set, modifies the first stored operation set to include the third operation (e.g., such that later execution of the first stored operation set includes performing the third operation).

In some embodiments, the third operation includes performing a set of operations associated with a second stored operation set (e.g., after selecting 634C3). In some embodiments, a voice command macro can include executing another voice command macro. In some embodiments, the second stored operation set includes one or more operations performed by a voice-based digital assistant application of the electronic device. In some embodiments, adding a set of operations associated with a second stored operation set reduce the number of inputs needed to perform both the first and second sets of stored operations. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device includes a touch-sensitive surface (e.g., 602A) (e.g., the display device is a touch-sensitive display). In some embodiments, the third operation includes causing the electronic device to set of operations that would be performed in response to detecting a first set of touch inputs via the touch-sensitive surface (e.g., after selecting 634C3). In some embodiments, the first stored operation set can include operations that simulate a set of touch input responses (e.g., swipe up, double tap).

Note that details of the processes described above with respect to method 700 (e.g., FIGS. 7A-7B) are also applicable in an analogous manner to the methods described below/above. For example, methods 900, 1100, 1300, and 1500 optionally include one or more of the characteristics of the various methods described above with reference to method 700. For brevity, these details are not repeated below.

FIGS. 8A-8D illustrate exemplary user interfaces for voice-based control of electronic devices, in accordance with some embodiments. In particular, FIGS. 8A-8D illustrate an exemplary electronic device, voice-based control scheme, and computerized method for providing visual cues of potential voice control commands. The user interfaces in these figures are used to illustrate the processes described below, including the processes in FIGS. 9A-9B.

Figure 8A:
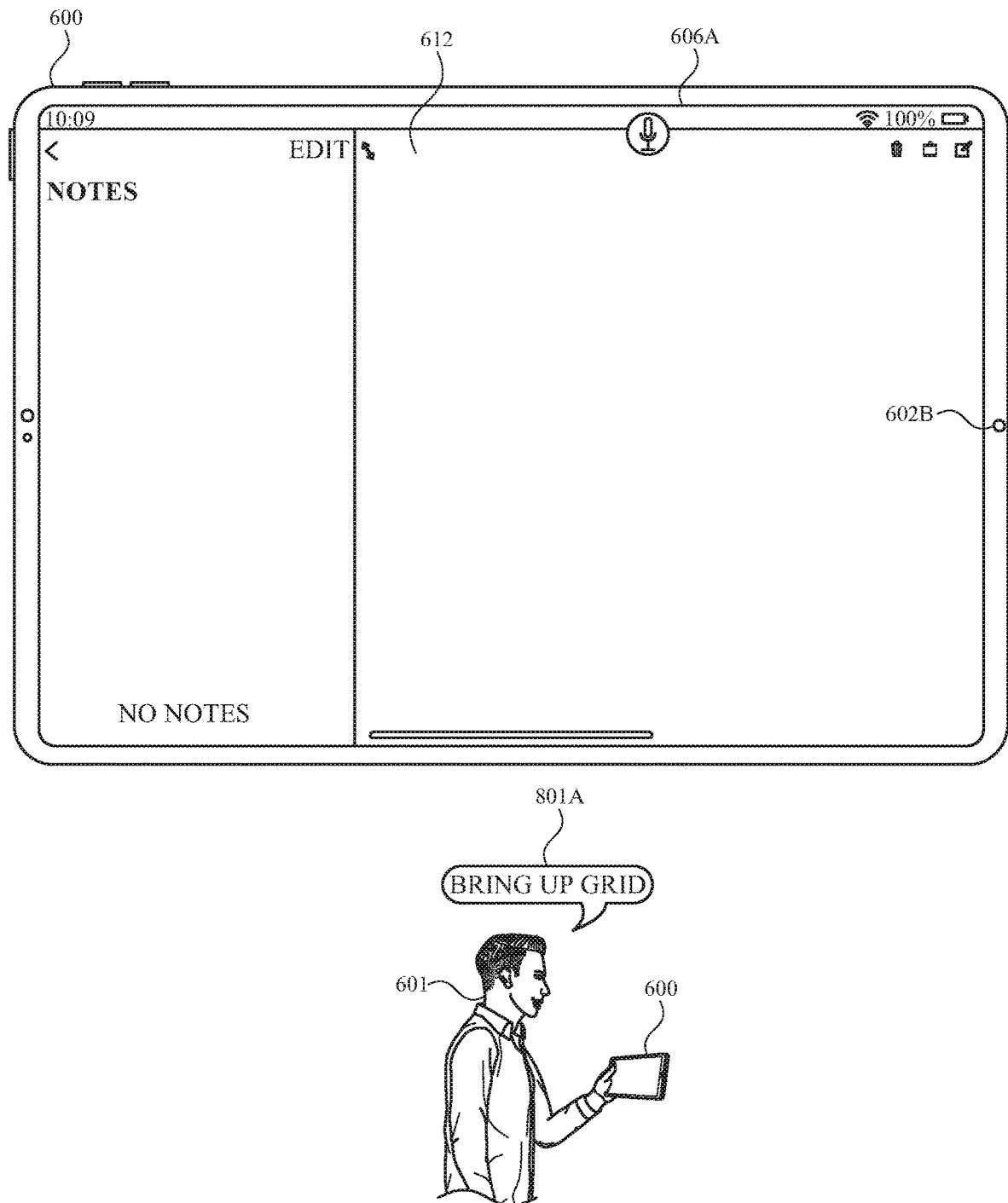
FIGS. 8A-8D illustrate exemplary user interfaces for voice-based control of electronic devices.
Figure 9A:
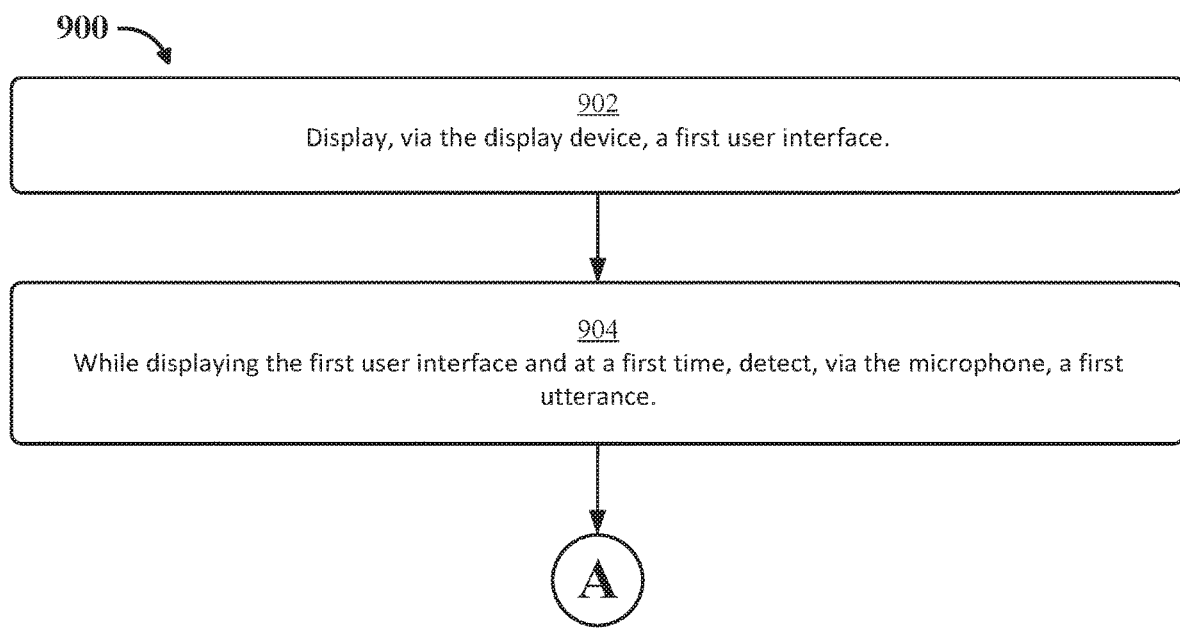
FIGS. 9A-9B is a flow diagram illustrating a method for voice-based control of electronic devices in accordance with some embodiments.
Figure 9B:
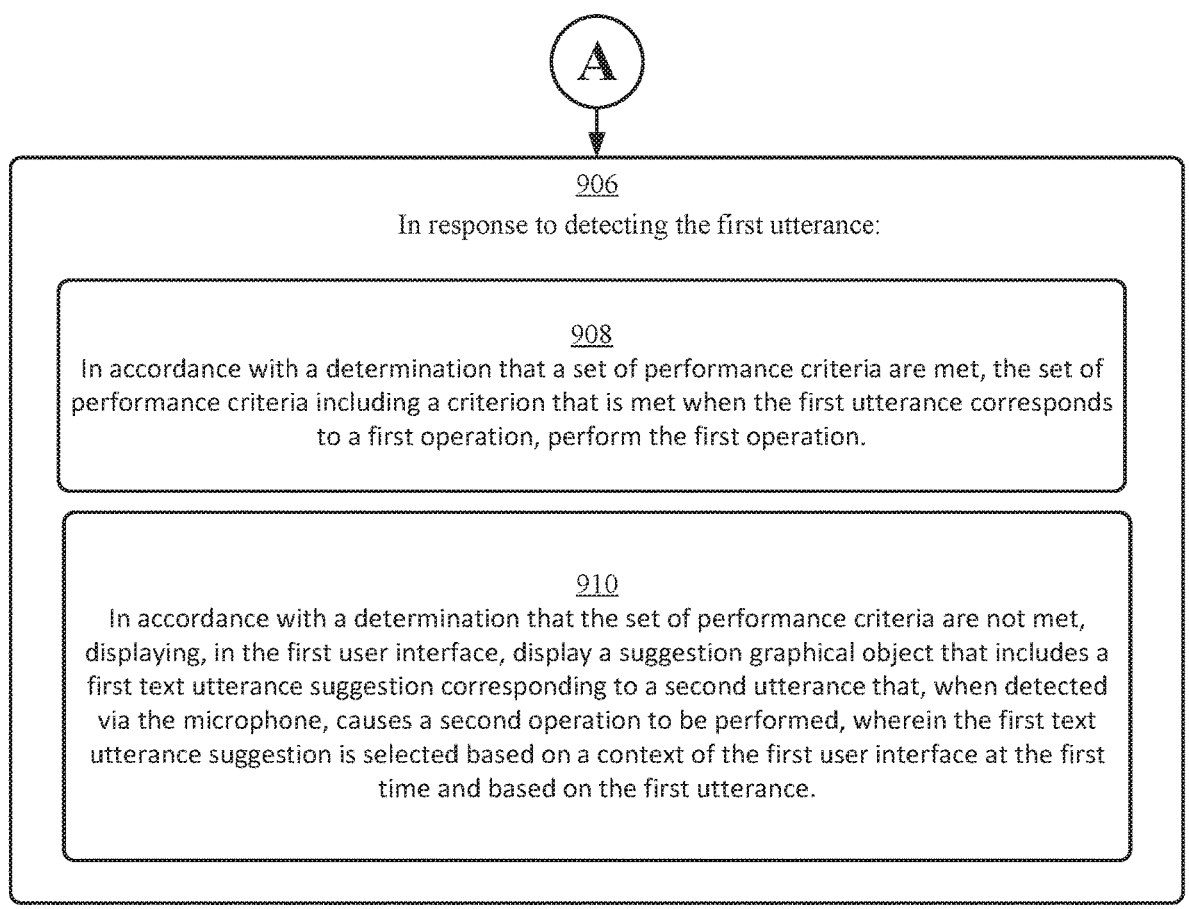

In FIG. 8A, a user 601 is interacting with a device 600. Device 600 displays notes user interface 612 and voice control icon 606 with visual state 606A, showing that voice inputs are currently being accepted and processed.

In FIG. 8A device 600 detects, via microphone 602B, voice input 801A ("BRING UP GRID"). Voice input 801A does not correspond to a valid voice command for device 600, and, in response, device 600 displays the user interface of FIG. 8B. In some embodiments, voice commands are limited to specific phrases and/or syntax, to reduce the processing inadvertent commands (e.g., false positives). Reducing the occurrence of false positives can reduce errors, user frustration, and save battery power.

Figure 8B:
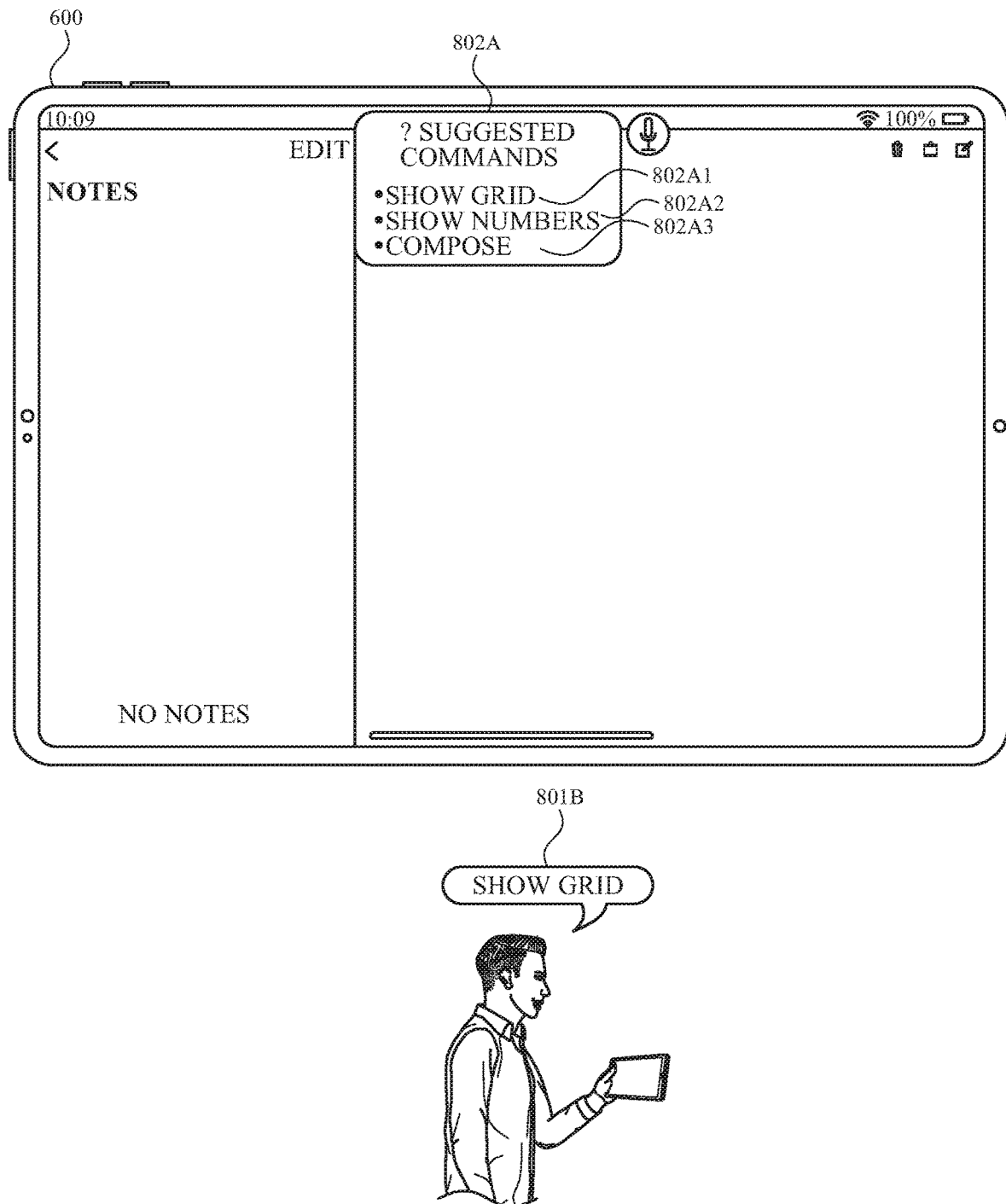

In FIG. 8B, device 600 displays, in response to invalid voice input 801A, a suggestion interface 802A. In some embodiments, interface 802A is displayed via an animation of the interface dropping down from the top of edge of display 602A (e.g., interface 802A is a drop-down banner). Interface 802A includes visual cues (e.g., suggestions) 802A1-802A3, each of which corresponds to a valid voice command that is available (e.g., available for the current user interface state). In some embodiments, visual cues displayed in interface 802A are selected based on the current context of the device, including, but not limited to factors such as application user interface that is currently displayed, the current state of the interface (e.g., what content is selected, what content is displayed), the context of the device (e.g., the time of day, connection status to other devices, recently received inputs), and a history and/or frequency of use of voice commands associated with device 600 or interface 802A. In some embodiments, less frequently used voice commands are suggested in order to aid users with identifying potential new functionality. In some embodiments, the processed voice input 801A is compared to potential valid commands to identify suitable visual cues. In some embodiments, the visual cues are organized (e.g., ranked) accordingly to similar logic. In FIG. 8B, visual cue 802A1 is displayed at the top of interface 802A because the voice input ("BRING UP GRID") is deemed to be highly related to the valid command ("SHOW GRID"). Visual cue 802A2 is displayed next because now visual aids (e.g., grids, numbers) are displayed in the current device context. Finally, visual cue 802A3 is displayed because notes user interface 612 of FIG. 8A does not include any selected existing notes. While FIG. 8B depicts interface 802A having three visual cues, more or less visual cues can be included.

In FIG. 8B, user 601 provides a second voice input, based on the suggested visual cue 802A1. Device 600 detects, via microphone 602B, voice input 801B ("SHOW GRID"), which is a valid voice command, and, in response, displays the grid shown in FIG. 8C.

Figure 8C:
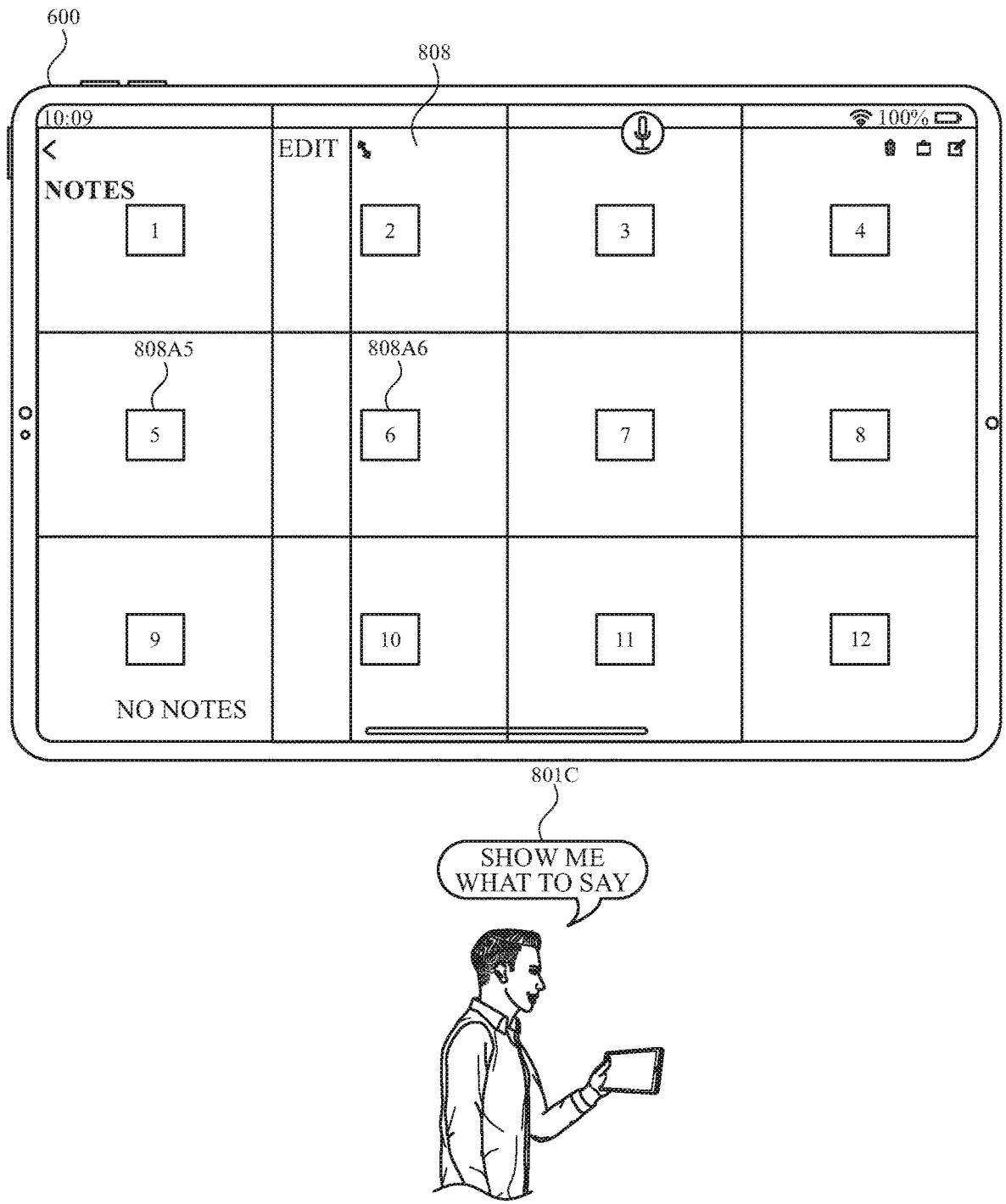

In FIG. 8C, device 600 displays a grid 808 that includes cell cues 808A, including specific cues 808A5 and 808A6, that each correspond to a cell of grid 808. Cell cues 808A provide visual cues of voice commands that can be processed by device 600 using grid 808. Device 600 also ceases to display suggestion interface 802A after receiving the valid voice command. In some embodiments, interface 802A is maintained even if a valid voice command is received. In some embodiments, interface 802A is maintained if an invalid, rather than valid, voice command is received.

Figure 8D:
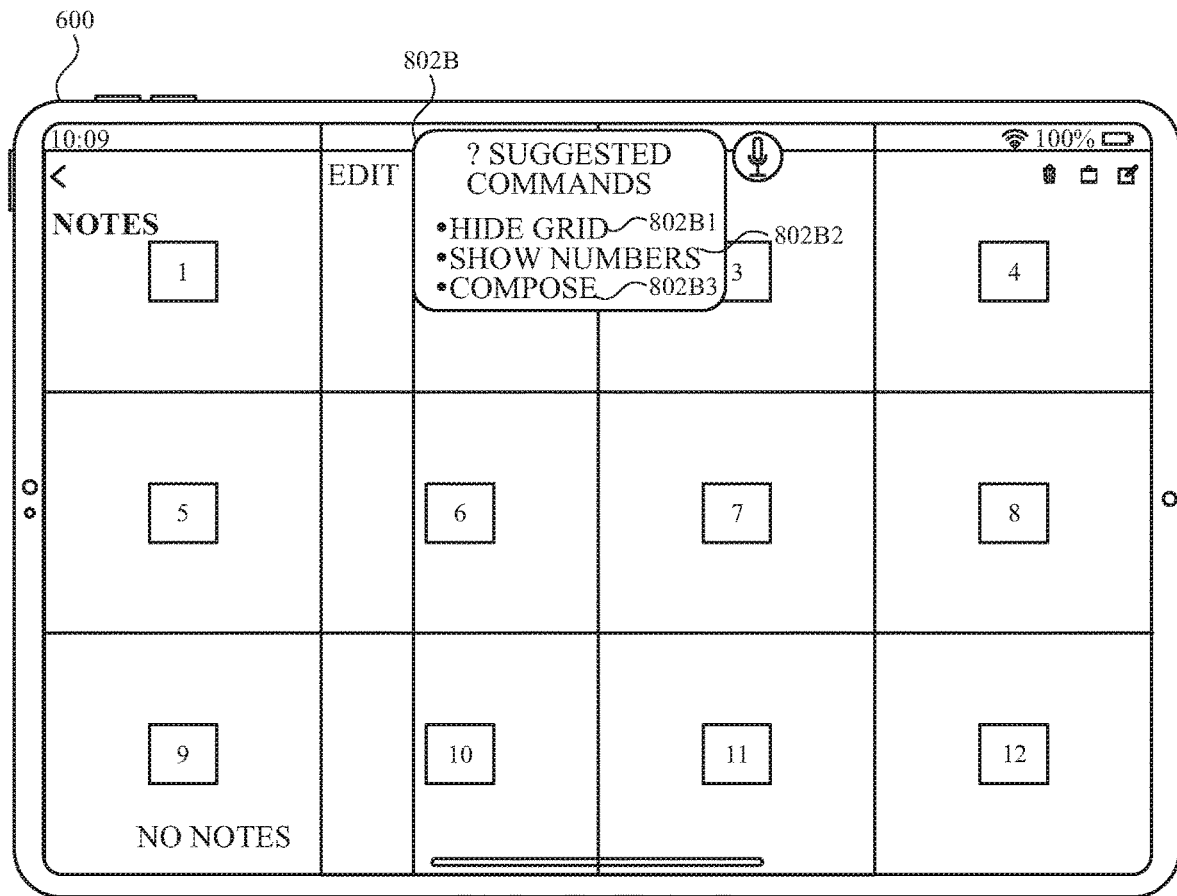
Figure 8D:
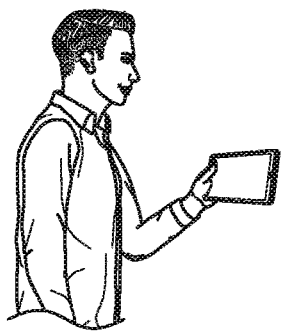

In FIG. 8C, device 600 detects, via microphone 602B, voice input 801C ("SHOW ME WHAT TO SAY"), which is a valid, explicit request to display a user suggestion interface, and, in response, displays the user interface of FIG. 8D.

In FIG. 8D, device 600 displays suggestion interface 802B that includes visual cues (e.g., suggestions) 802B1-802B3, each of which corresponds to a valid voice command that is available while device 600 is in the context shown in FIG. 8D. Visual cue 802B1 is displayed at the top of the interface 802B. In some embodiments, visual cue 802B1 is displayed at the top because the most recently received voice command (other than "SHOW ME WHAT TO SAY") was "SHOW GRID". In some embodiments, visual cue 802B1 is displayed at the top because the current device context includes a displayed grid. Visual cues 802B2 and 802B3 match the second and third visual cues of suggestion interface 802A because they remain the second and third most relevant suggestions, respectively.

FIGS. 9A-9B is a flow diagram illustrating a method 900 for voice-control of electronic devices in accordance with some embodiments. Method 900 is performed at a device (e.g., 100, 300, 500, 600) with a display device (e.g., 602A). Some operations in method 900 are, optionally, combined, the orders of some operations are, optionally, changed, and some operations are, optionally, omitted.

As described below, method 900 provides an intuitive way for voice-control of electronic devices. The method reduces the cognitive burden on a user for enlarging user interface elements, thereby creating a more efficient human-machine interface. For battery-operated computing devices, enabling a user to utilize user interface elements faster and more efficiently conserves power and increases the time between battery charges.

The electronic device displays (902), via the display device, a first user interface (e.g., 612). While displaying the first user interface and at a first time, the electronic device detects (904), via the microphone, a first utterance (e.g., 801A or 801B) (e.g., a spoken phrase, speech, a vocal input).

In response to (906) detecting the first utterance, in accordance with a determination that a set of performance criteria are met, the set of performance criteria including a criterion that is met when the first utterance corresponds to a first operation (e.g., operation of FIG. 8C) (e.g., an operation that can be performed; the utterance corresponds to an actionable command), the electronic device performs (908) the first operation.

In response to (906) detecting the first utterance, in accordance with a determination that the set of performance criteria are not met, the electronic device displays (910), in the first user interface, displaying a suggestion graphical object (e.g., 802A) (e.g., a tool tip) that includes a first text utterance suggestion (e.g., 802A1) (e.g., text indicating a voice command phrase ("e.g., "delete all") that can be received and processed) corresponding to a second utterance that, when detected via the microphone, causes a second operation (e.g., deleting all suggested content) to be performed, where the first text utterance suggestion is selected based on a context (e.g., content of displayed on the first user interface, a selection state of content displayed on the first user interface, an application that is associated with the first user interface) of the first user interface at the first time and based on the first utterance (e.g., based on the content of the first utterance as determined via a natural language processing function (e.g., performed at the electronic device or performed at an external device (e.g., an NLP server)). In some embodiments, after receiving an invalid voice command, the electronic device displays one or more suggested voice command phrases that are selected based on the current context/state of the user interface and the invalid voice command itself (e.g., based on a relationship between the invalid voice command and one or more valid voice commands). In some embodiments, displaying a suggestion graphical object that includes a first text utterance suggestion provides improved visual feedback as to what voice-control commands can be issued. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first text utterance suggestion (e.g., 802A1) is further based on frequency of use of one or more utterances of a set of utterances that satisfy the set of performance criteria (e.g., a set of utterances that correspond to valid operations). In some embodiments, suggested voice command phrases are selected based on a log or a history of the frequency of use of valid voice command phrases. In some embodiments, less frequently used phrases are favored (e.g., the selection logic favors less frequently used favors so as to guide the users to new commands that can be used.

In some embodiments, the suggestion graphical object is displayed along (e.g., adjacent to) an upper edge of the display (e.g., FIG. 8B). In some embodiments, the suggested voice command phrases are displayed as a drop-down banner at the upper edge of the user interface.

In some embodiments, the suggestion graphical object includes a second text utterance suggestion (e.g., 802A2) (e.g., "delete note") corresponding to a third utterance that, when detected via the microphone, causes a third operation to be performed, where the second text utterance suggestion is selected based on the context of the first user interface at the first time and based on the utterance. In some embodiments, an order of display (e.g., order of arrangement in the suggestion graphical object) of the first text utterance suggestion and the second text utterance suggestion is based on based on the context of the first user interface at the first time and based on the utterance. In some embodiments, the same logic or algorithm used to select the text utterance suggestions is used to order multiple suggestions that are displayed. In some embodiments, displaying multiple text utterance suggestions that are ranked reduces the number of inputs needed to obtain a desired suggestion. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of performing the first operation, the electronic device displays a second suggestion graphical object (e.g., 802B) that includes a third text utterance suggestion that is based on the context of the first user interface at the first time. In some embodiments, the first utterance is a voice command to display suggested voice command(s) that are based on the current user interface context.

Note that details of the processes described above with respect to method 900 (e.g., FIGS. 9A-9B) are also applicable in an analogous manner to the methods described below/above. For example, methods 700, 1100, 1300, and 1500 optionally include one or more of the characteristics of the various methods described above with reference to method 900. For brevity, these details are not repeated below.

FIGS. 10A-10H illustrate exemplary user interfaces for voice-based control of electronic devices, in accordance with some embodiments. In particular, FIGS. 10A-10H illustrate an exemplary electronic device, voice-based control scheme, and computerized method for providing visual cues of potential voice control commands across multiple different user interfaces. The user interfaces in these figures are used to illustrate the processes described below, including the processes in FIGS. 11A-11D.

Figure 10A:
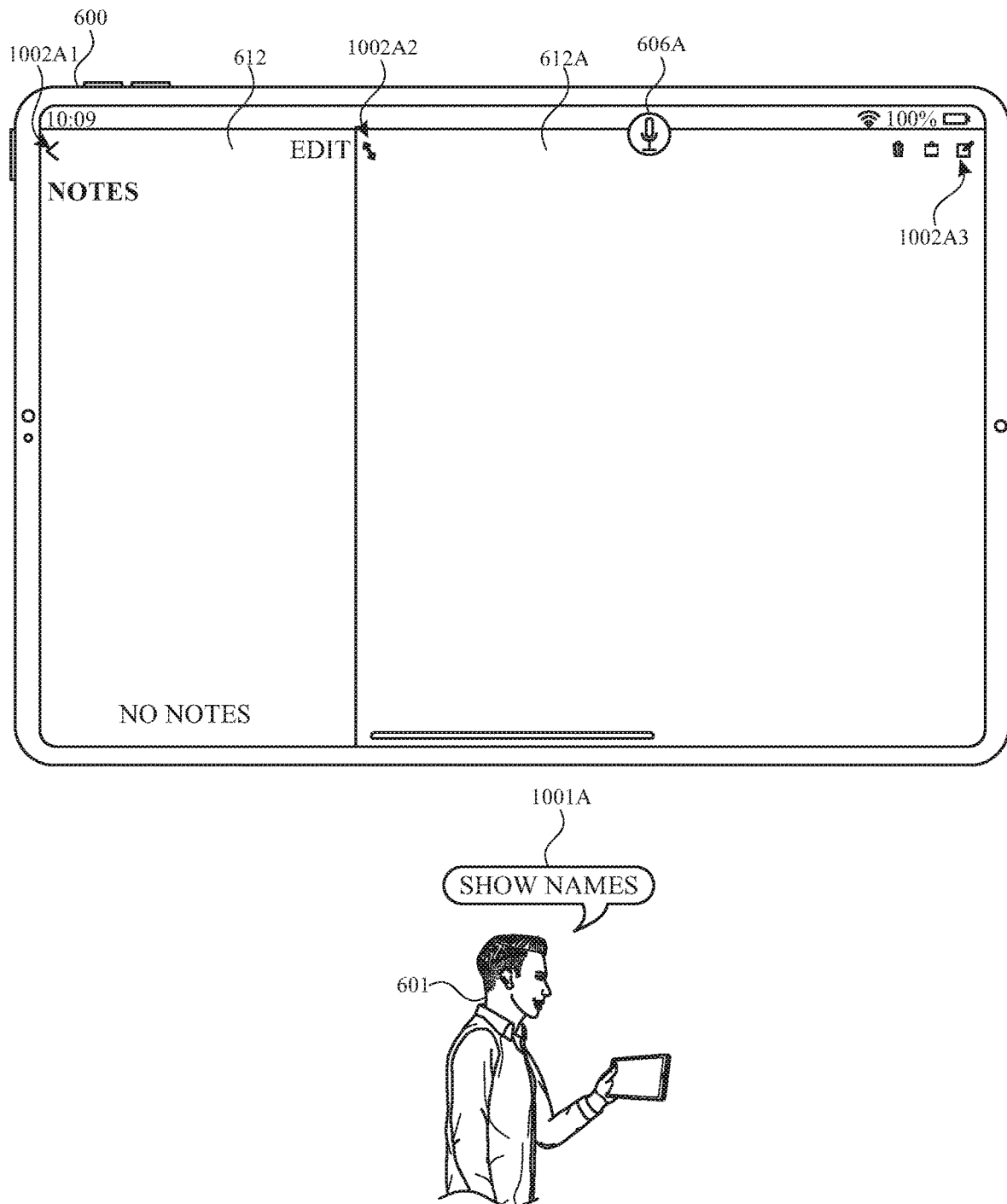
FIGS. 10A-10H illustrate exemplary user interfaces for voice-based control of electronic devices.

In FIG. 10A, a user 601 is interacting with a device 600. Device 600 displays notes user interface 612 and voice control icon 606 with visual state 606A, showing that voice inputs are currently being accepted and processed. Interface 612 includes active affordances 1002A1-1002A3. Affordance 1002A1 (e.g., a back affordance), when selected, causes display of a previous user interface. Affordance 1002A2 (e.g., an expand affordance), when selected, causes expansion of composition area 612A. Affordance 1002A3 (e.g., a compose affordance), when selected, creates a new note. None of affordances 1002A1-1002A3 are displayed with names displayed.

Figure 10B:
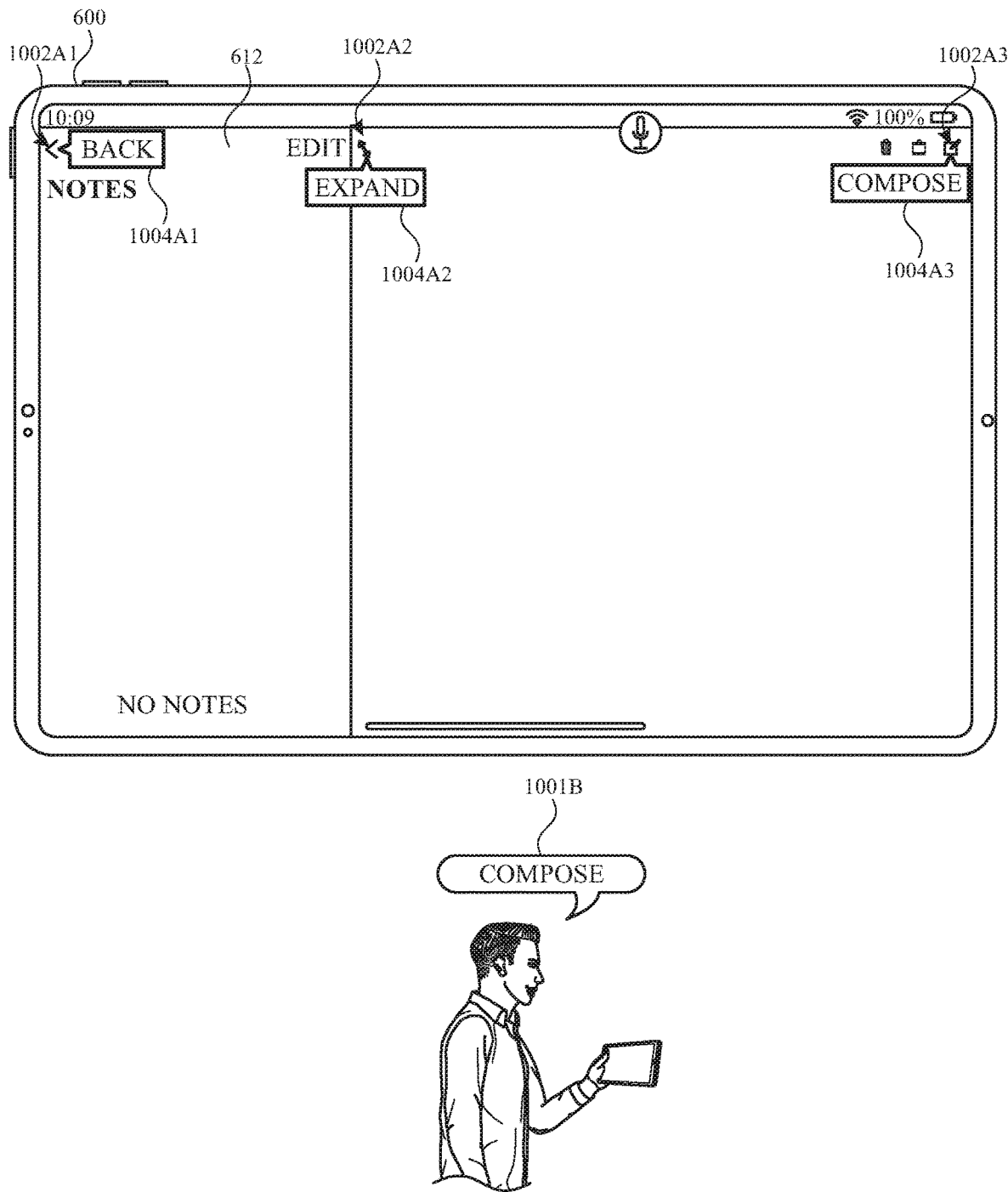

In FIG. 10A, device 600 detects, via microphone 602B, voice input 1001A ("SHOW NAMES"), and, in response, displays the user interface of FIG. 10B.

In FIG. 10B, device 600 displays notes user interface 612 with name visual cues 1004A, including specific affordance cues 1004A1 ("BACK"), 1004A2 ("EXPAND"), and 1004A3 ("COMPOSE"). Each name visual cue corresponds to an affordance (1002A1-1002A3, respectively) displayed in user interface 612, and provides a visual indication of an affordance that will be affected by a voice input referencing the name of the name visual cue (e.g., affordance 1002A1 if affordance cue 1004A1 is referenced), as discussed in more detail, below. In some embodiments, including the present embodiment, an affordance cue is not displayed for affordances that are not in an active (e.g., selectable state).

Figure 10C:
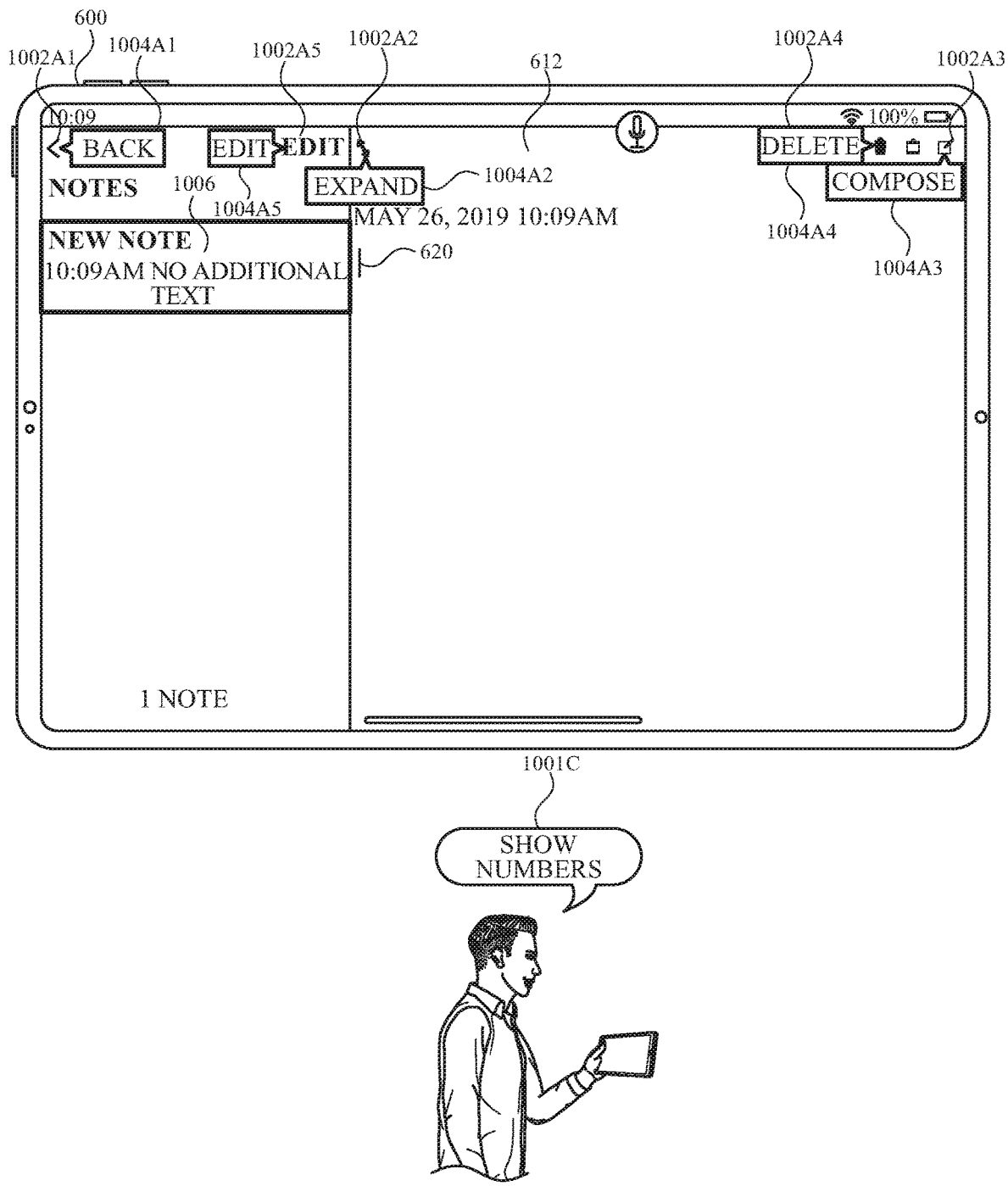

In FIG. 10B, device 600 detects, via microphone 602B, voice input 1001B ("COMPOSE"), which is processed by device 600 as a request to perform an operation afforded by affordance 1002A3, a compose affordance, that corresponds to affordance cue 1004A3, and, in response, displays the user interface in FIG. 10C.

In FIG. 10C, device 600 displays, in response to performing the operation afforded by compose affordance 1002A3, notes user interface 612 with a new note (e.g., as indicated by display of note indication 1006) started and a text insertion marker 620 in composition area 612A of interface 612. Device 600 also displays name visual cues 1004A4 ("DELETE") and 1004A5 ("EDIT") corresponding to affordances 1002A4 and 1002A5, respectively, which are now selectable affordances (e.g., affordances that are only selectable when a respective note is being created/edited).

Figure 10D:
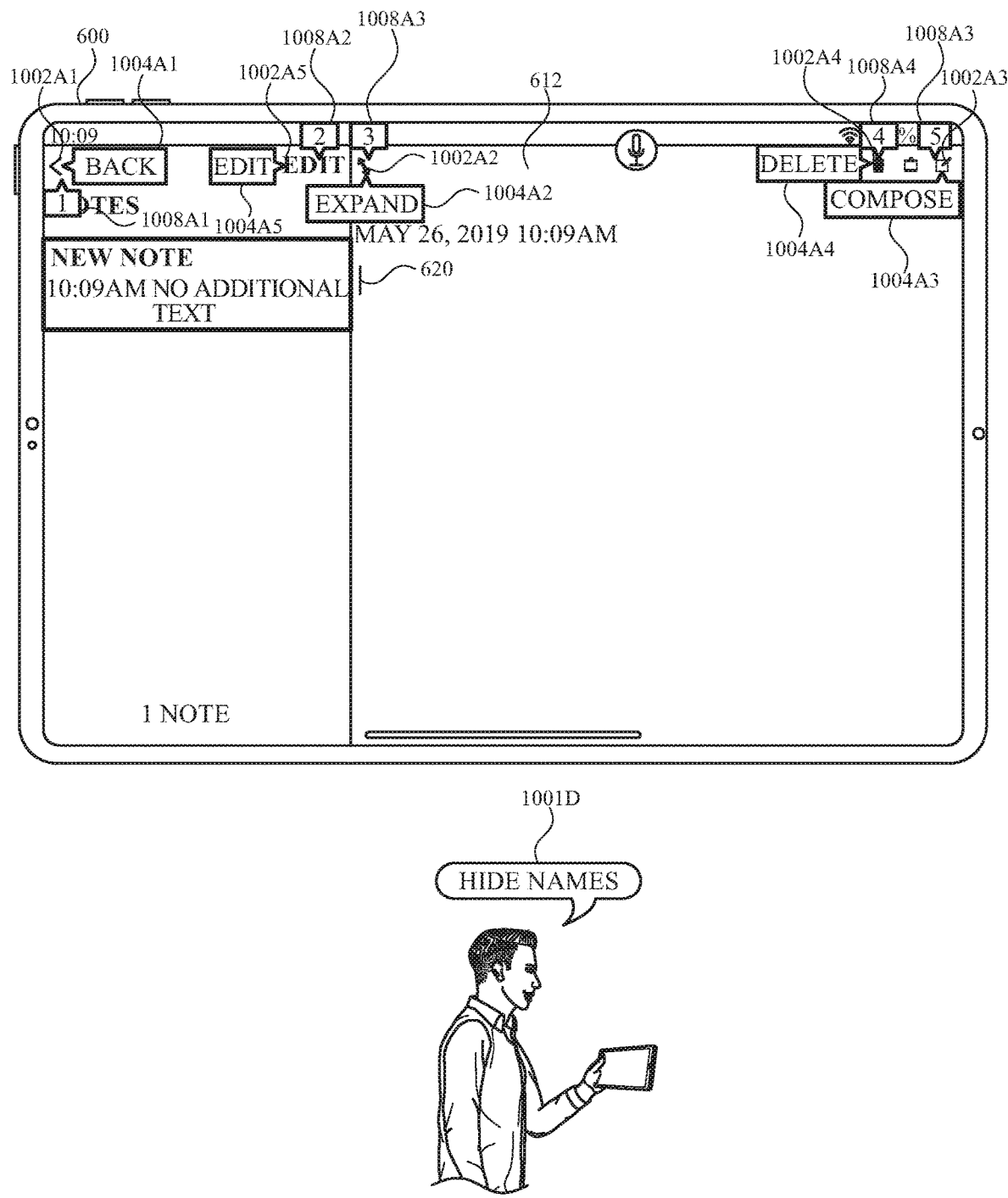

In FIG. 10C, device 600 detects, via microphone 602B, voice input 1001C ("SHOW NUMBERS"), and, in response, displays the user interface of FIG. 10D.

In FIG. 10D, device 600 displays the user interface of FIG. 10C, with the addition of number visual cues 1008A, including specific visual cues 1008A1-1008A5 that correspond, respectively, to affordances 1002A1, 1002A5, 1002A2, 1002A4, and 1002A5, because the number visual cues are numbered, from left to right and were displayed after additional affordances (e.g., 1002A4 and 1002A5) became active. Number visual cues 1008A provides a visual indication of an affordance that will be affected by a voice input referencing the number of the affordance cue (e.g., affordance 1002A1 if affordance cue 1008A1 is referenced). Because each active affordance corresponds to both a name visual cue and a number visual cue, voice commands using either the name cue or the number can be used to select a respective affordance.

Figure 10E:
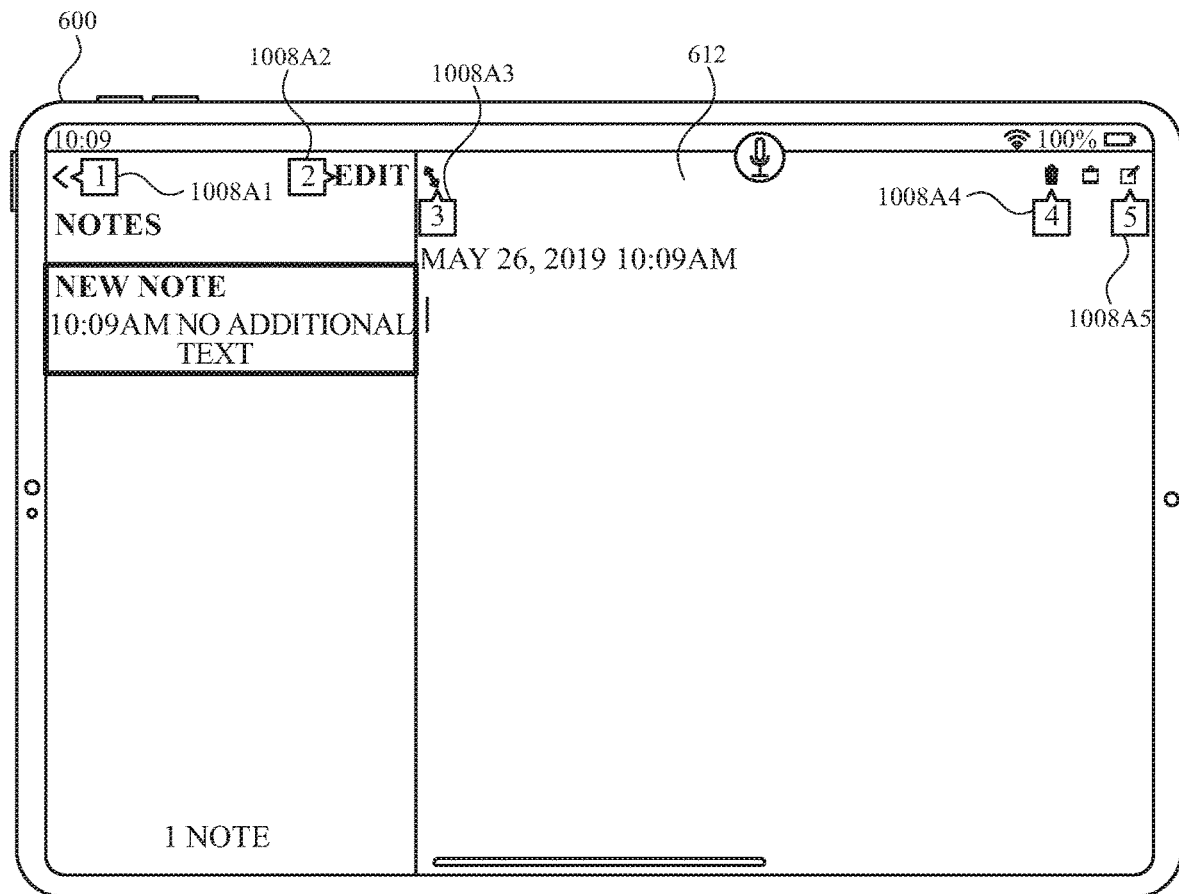
Figure 10E:
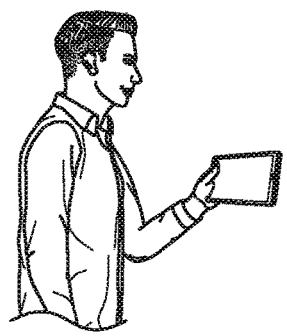

In FIG. 10D, device 600 detects, via microphone 602B, voice input 1001C ("HIDE NUMBERS"), and, in response, displays the user interface of FIG. 10E.

In FIG. 10E, device displays notes user interface 612 with number visual cues 1008A1-1008A5 but without any name visual cues 1004A.

Figure 10F:
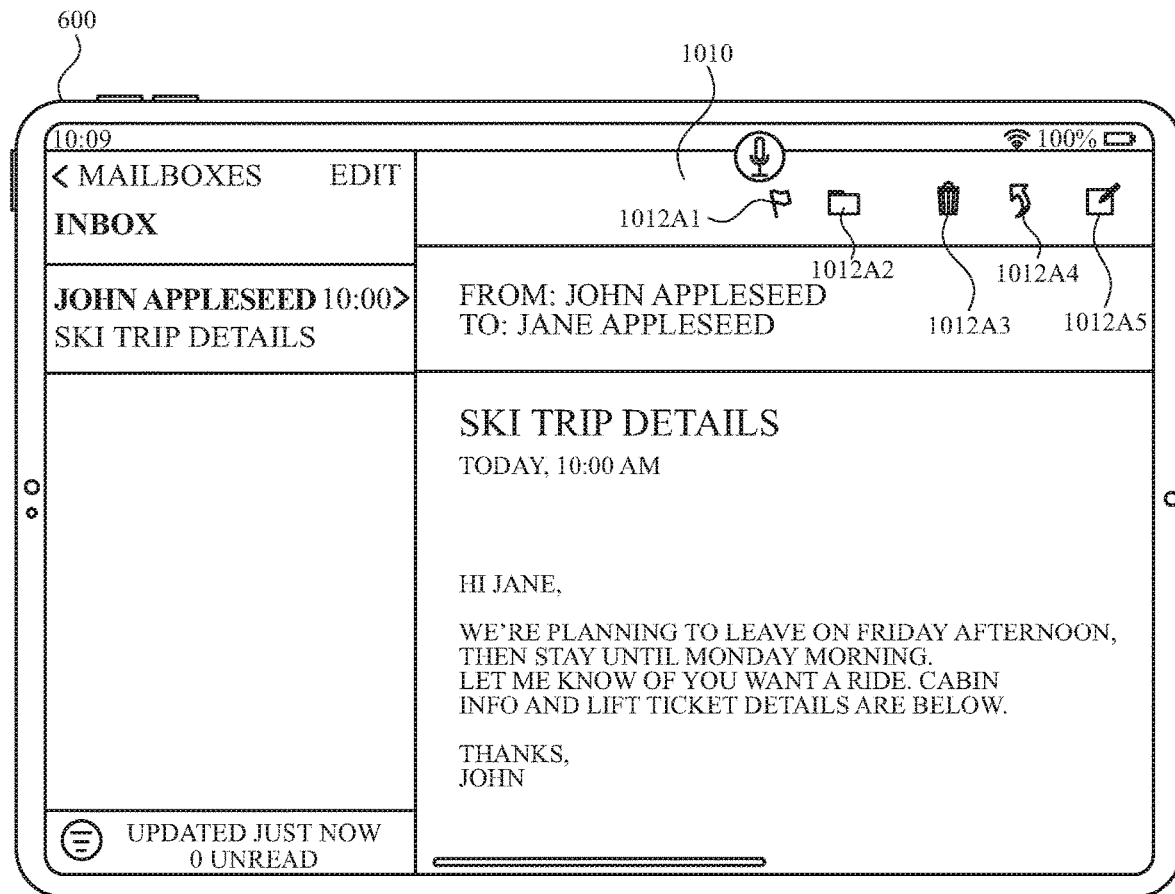
Figure 10F:
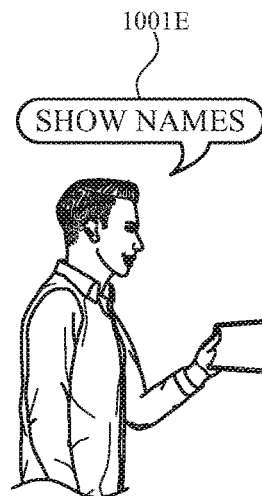
Figure 10G:
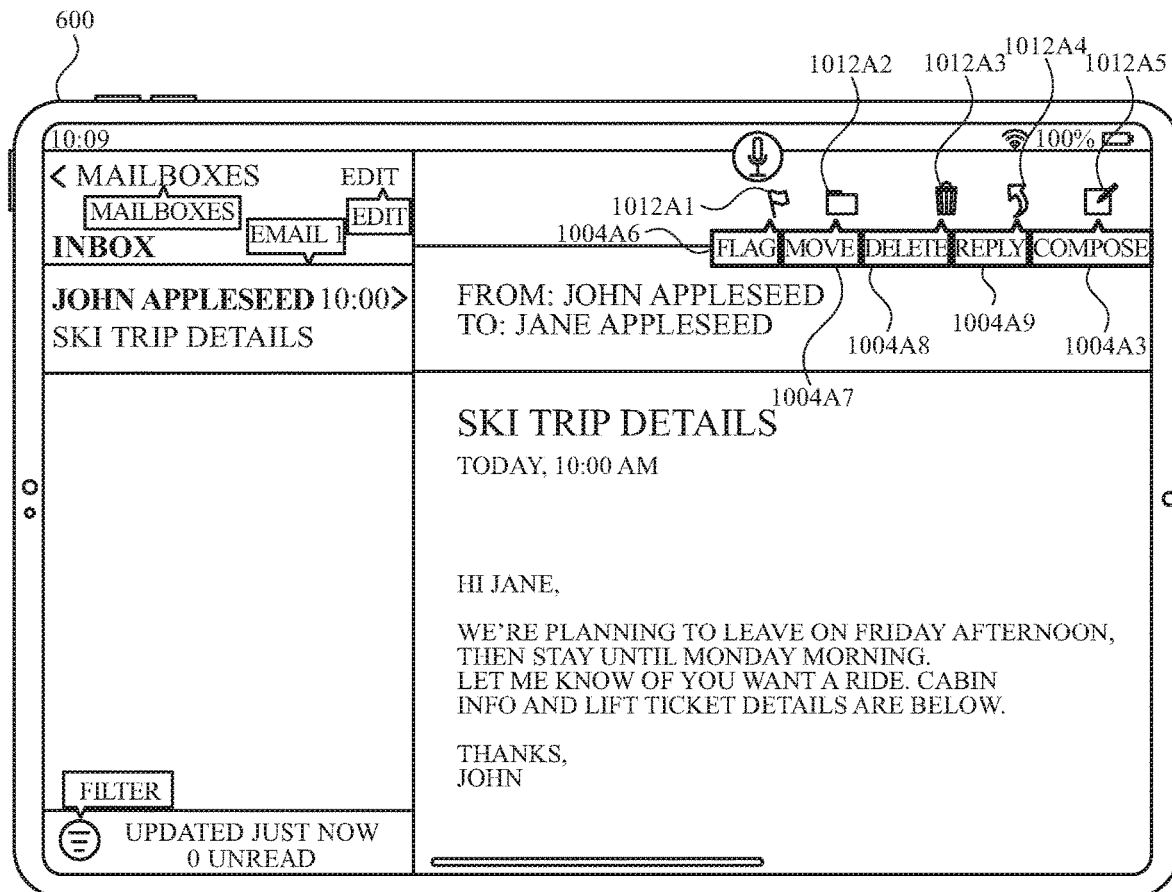
Figure 10G:
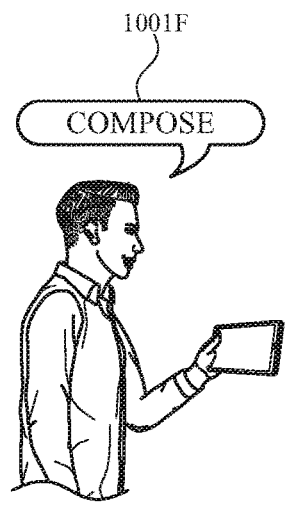
Figure 10H:
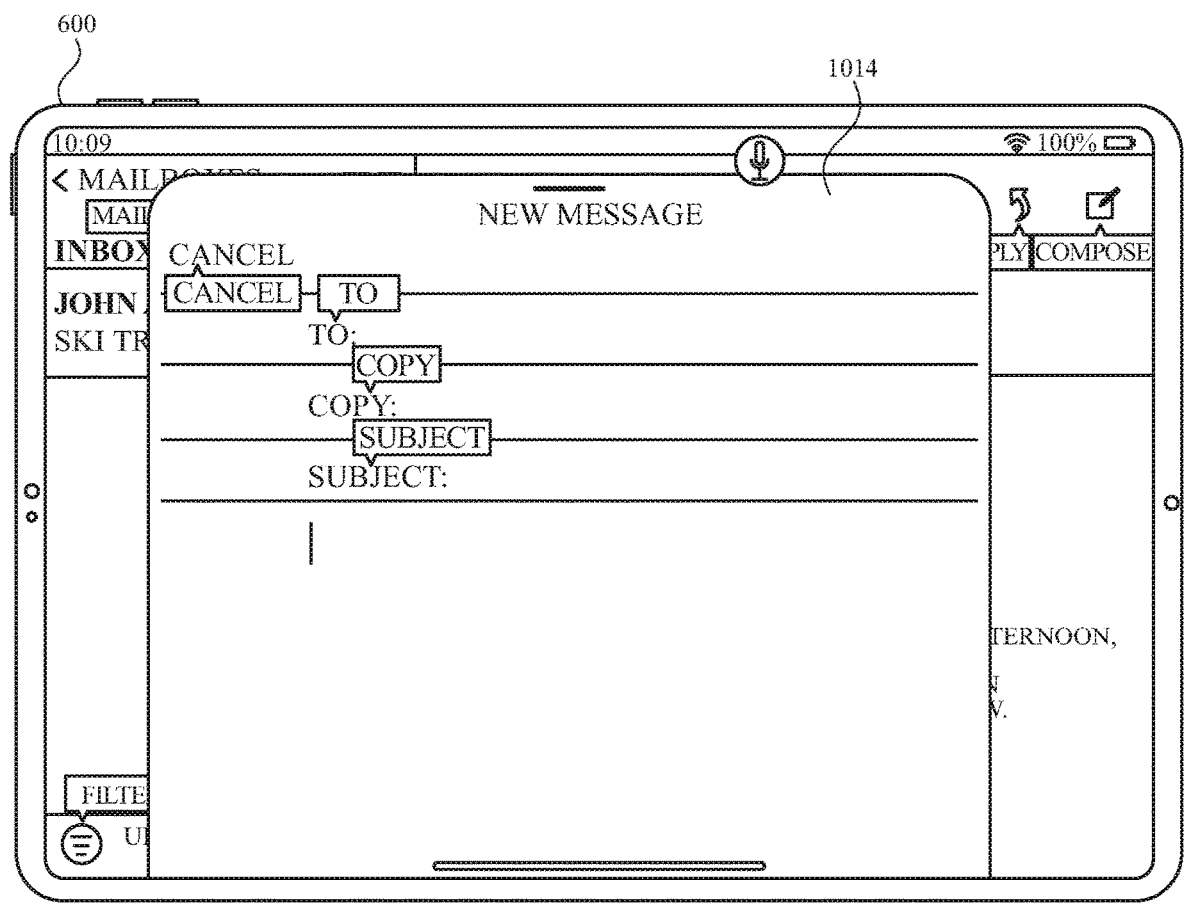
Figure 10H:
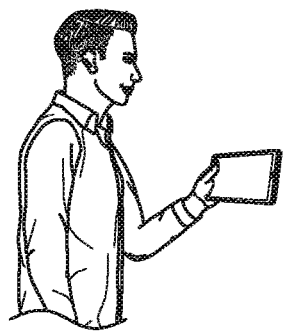
Figure 11A:
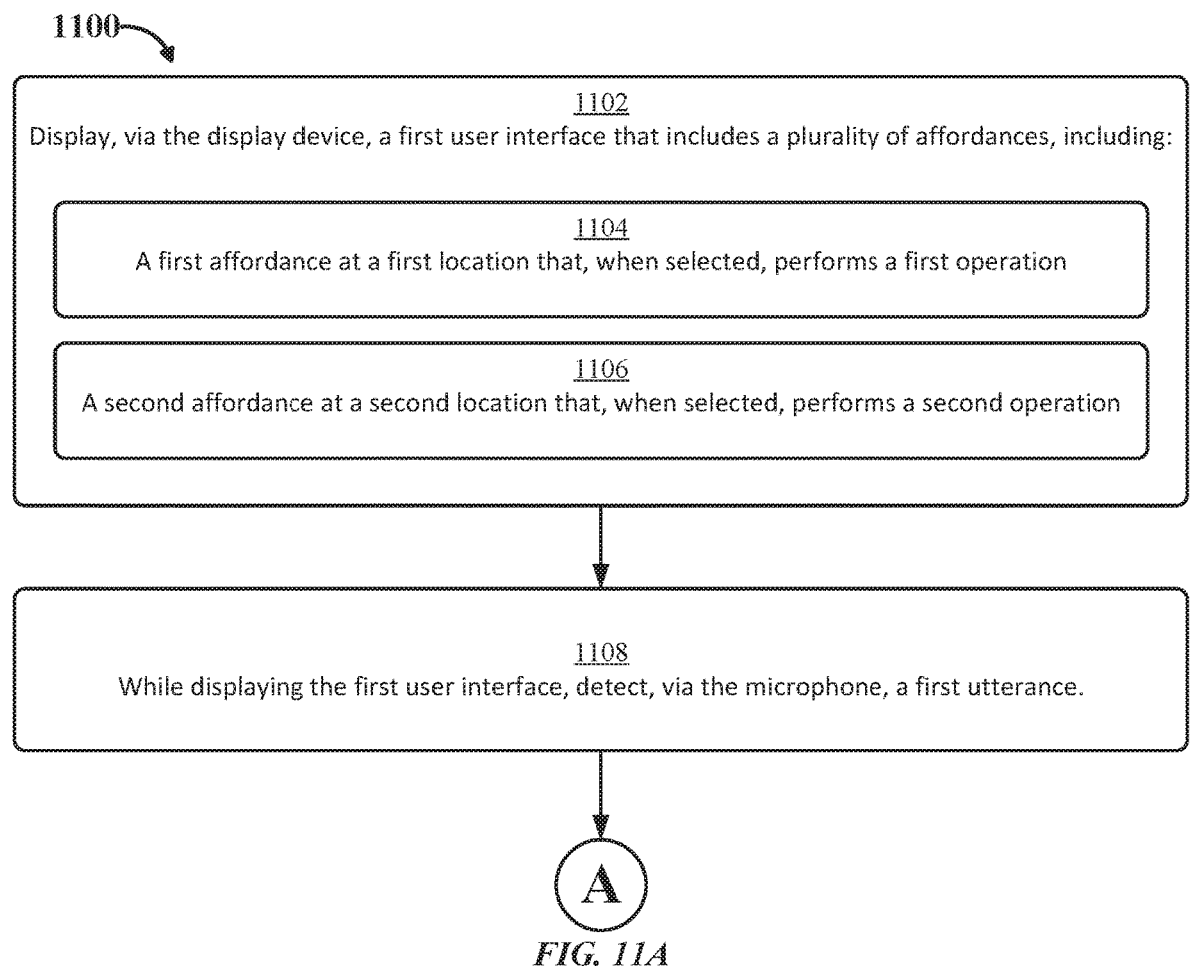
FIGS. 11A-11D is a flow diagram illustrating a method for voice-based control of electronic devices in accordance with some embodiments.
Figure 11B:
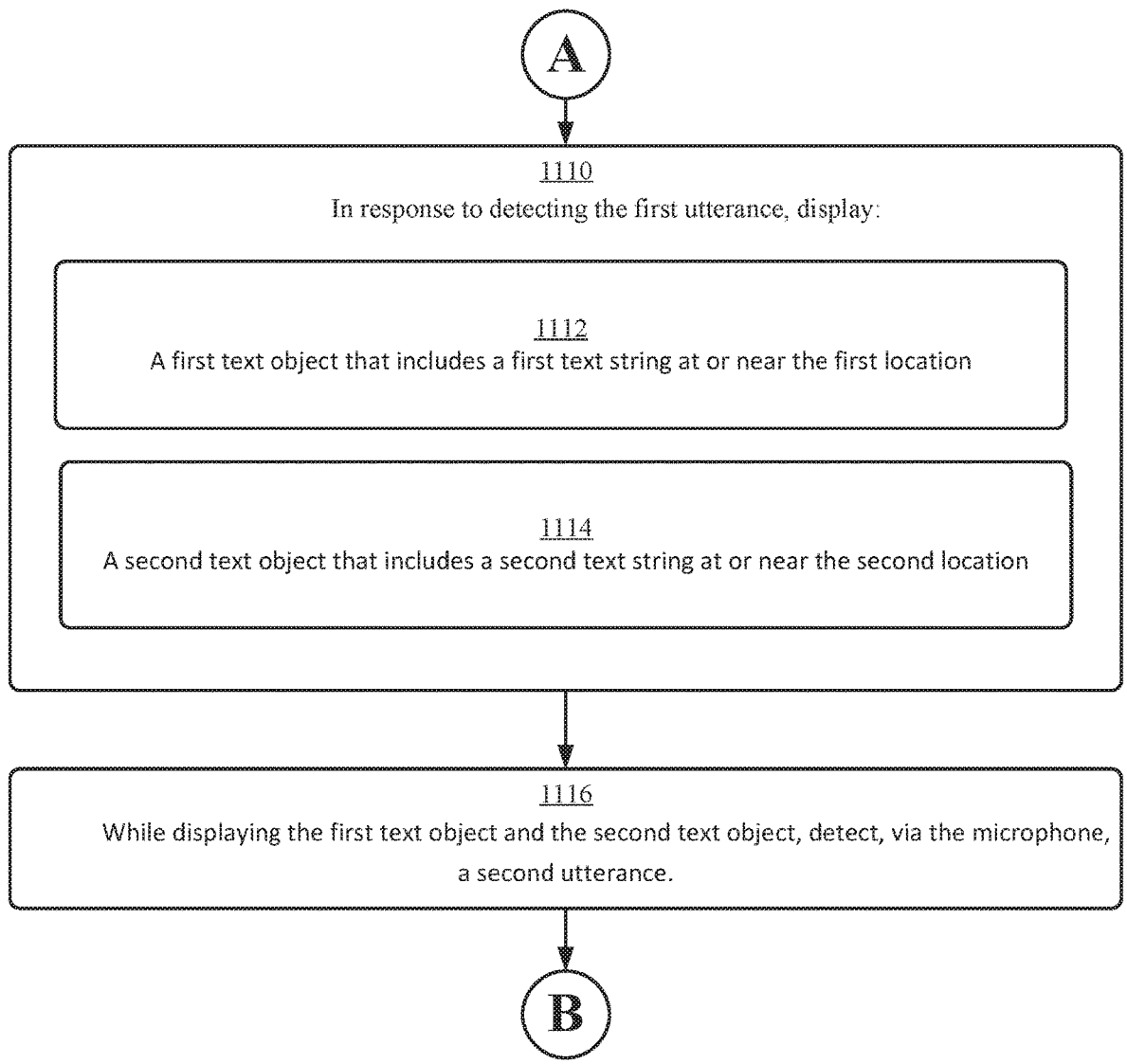
Figure 11C:
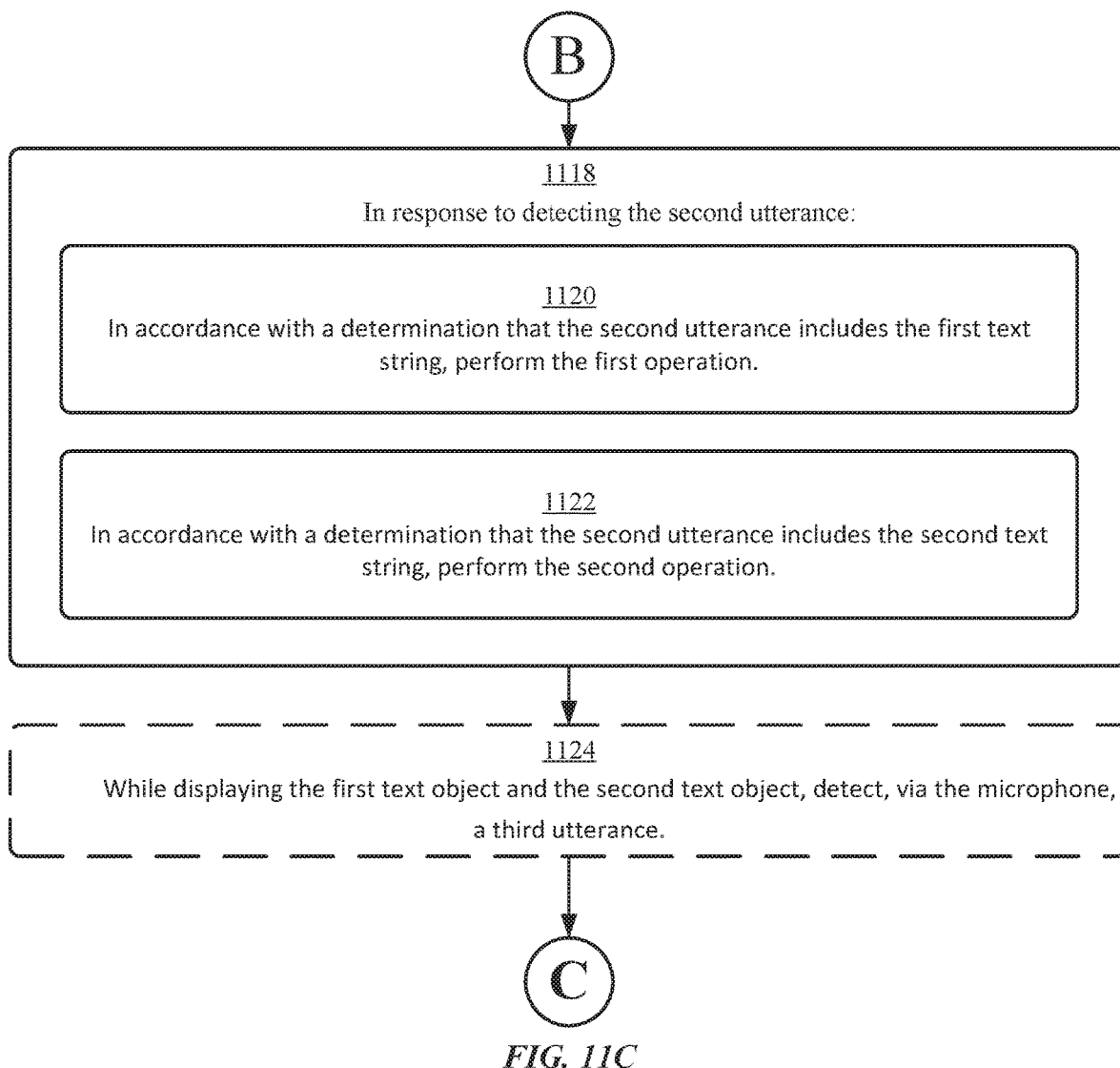
Figure 11D:
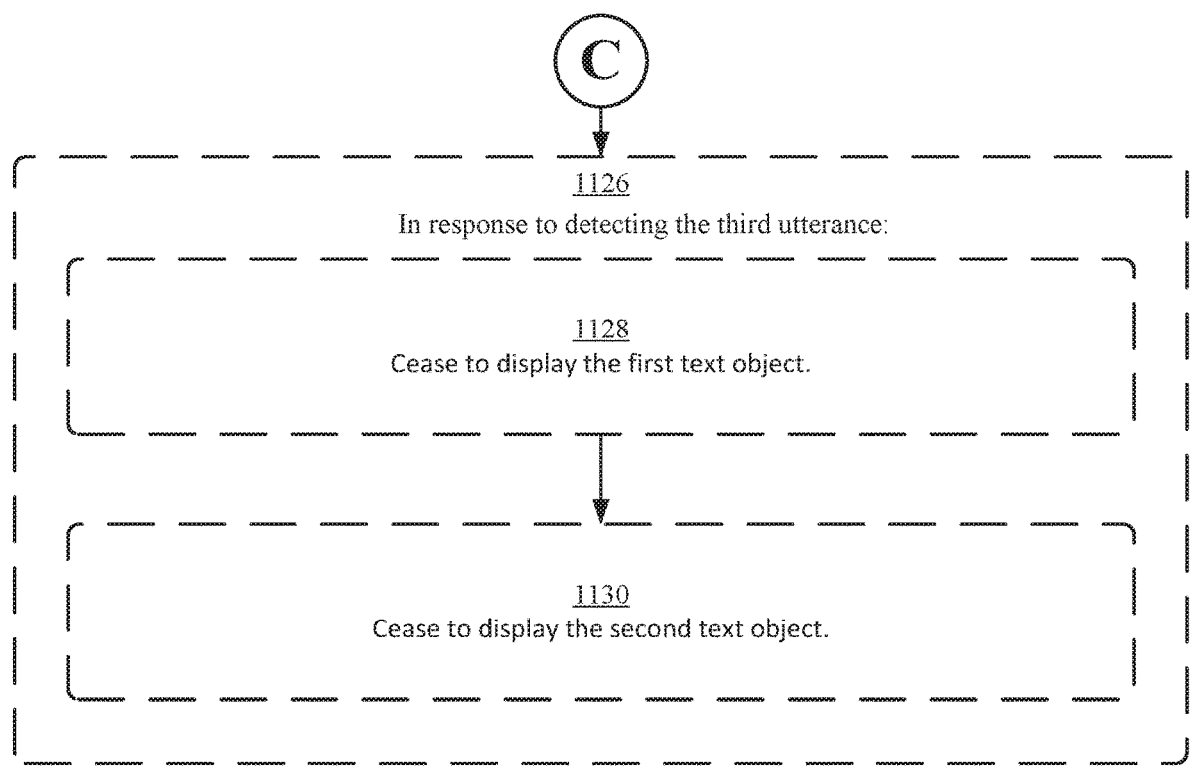

FIGS. 10F-10H show a process for using name visual cues in a mail application. In FIG. 10F, device 600 displays mail user interface 1010 that includes affordances 1012A, including specific affordances 1012A1 (a flagging affordance), 1012A2 (a move affordance), 1012A3 (a delete affordance), 1012A4 (a forwarding affordance), and 1012A5 (a compose new email affordance).

In FIG. 10F, device 600 detects, via microphone 602B, voice input 1001A ("SHOW NAMES"), and, in response, displays the user interface of FIG. 10G.

In FIG. 10G, device 600 displays the email user interface of FIG. 10F, with the addition of name visual cues 1004A, including specific visual cues 1004A6 ("FLAG"), corresponding to affordance 1012A1, 1004A7 ("MOVE"), corresponding to affordance 1012A2, 1004A4 ("DELETE"), corresponding to affordance 1012A3, and 1004A3 ("COMPOSE"), corresponding to affordance 1012A5. Note that name visual cue affordances 1004A4 ("DELETE") and 1004A3 ("COMPOSE") were also displayed FIG. 10B-10D in conjunction with notes user interface 618. In some embodiments, the same name visual cue is used for affordances that have a same type of function (e.g., a compose function), including when the functions are not identical (e.g., a function for composing a note and a function for composing an email) and when the affordances are displayed in user interfaces of different applications.

In FIG. 10G, device 600 detects, via microphone 602B, voice input 1001F ("COMPOSE"), which is processed by device 600 as a request to perform an operation afforded by affordance 10012A5, a compose email affordance, that corresponds to name visual cue 1004A3, and, in response, displays the user interface in FIG. 10H.

In FIG. 10H, in response to voice input 1001F, device 600 displays a new email user interface 1014.

FIGS. 11A-11D is a flow diagram illustrating a method 110 for voice-based control of electronic devices in accordance with some embodiments. Method 1100 is performed at a device (e.g., 100, 300, 500, 600) with a display device (e.g., 602A). Some operations in method 1100 are, optionally, combined, the orders of some operations are, optionally, changed, and some operations are, optionally, omitted.

As described below, method 1100 provides an intuitive way for voice-based control of electronic devices. The method reduces the cognitive burden on a user for enlarging user interface elements, thereby creating a more efficient human-machine interface. For battery-operated computing devices, enabling a user to utilize user interface elements faster and more efficiently conserves power and increases the time between battery charges.

The electronic device displays (1102), via the display device, a first user interface (1104) (e.g., 612) (e.g., an interface of an application (e.g., a mail application)) that includes a plurality of affordances (e.g., 1002A), including: a first affordance (e.g., 1002A3) at a first location (e.g., an area of the first user interface that encompasses (e.g., and is larger than) the first affordance) that, when selected, performs a first operation; and a second affordance (1106) (E.g., 1002A2) at a second location (e.g., an area of the first user interface that encompasses (e.g., and is larger than) the second affordance; an area that does not overlap the first location or encompass the first affordance) that, when selected, performs a second operation.

While displaying the first user interface, the electronic device detects (1108), via the microphone, a first utterance (e.g., 1001A) ("show names").

In response to detecting the first utterance, the electronic device displays (1110): a first text object (e.g., 1004A3) (1112) (e.g., a graphical object that includes displayed text) that includes a first text string (e.g., "delete") at or near the first location (e.g., adjacent to the first location); and a second text object (1114) (e.g., 1004A2) (e.g., "back") that includes a second text string at or near the second location (e.g., adjacent to the second location). In some embodiments, displaying a text object that provides a cue as to function of an affordance and a voice-control command to perform an operation associated with the affordance provides improved visual feedback as to what operation will be performed and how to perform the operation with voice-commands. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the first text object and the second text object, the electronic device detects (1116), via the microphone (e.g., 602B), a second utterance (e.g., 1001B).

In response to (1118) detecting the second utterance, in accordance with a determination that the second utterance includes (e.g., consisting of) the first text string (e.g., based on the content of the second utterance as determined via a natural language processing function (e.g., performed at the electronic device or performed at an external device (e.g., an NLP server)), the electronic device performs (1120) the first operation.

In response to (1118) detecting the second utterance, in accordance with a determination that the second utterance includes (e.g., consisting of) the second text string, the electronic device performs (1122) the second operation.

In some embodiments, the first affordance does not include the first text string (e.g., does not include a graphical text string matching the first text string; does not include any text string).

In some embodiments, while displaying the first text object and the second text object, the electronic device detects (1124), via the microphone, a third utterance (e.g., 1001D). In some embodiments, in response to (1126) detecting the third utterance, the electronic device ceases (1128) to display the first text object. In some embodiments, in response to (1126) detecting the third utterance, the electronic device ceases (1130) to display the second text object.

In some embodiments, while displaying the first text object and the second text object, the electronic device detects, via the microphone, a fourth utterance (e.g., 1001C) ("show numbers"). In some embodiments, in response to detecting the fourth utterance, the electronic device displays: a first number (e.g., 1008A1) (e.g., "1") at or near the first location; and a second number (e.g., 1008A2) (e.g., "2") at or near the second location. In some embodiments, while displaying the first number and the second number, the electronic device detects, via the microphone, a fifth utterance. In some embodiments, in accordance with a determination that the fifth utterance (e.g., 601H) includes (e.g., consisting of) the first number (e.g., based on the content of the fifth utterance as determined via a natural language processing function (e.g., performed at the electronic device or performed at an external device (e.g., an NLP server)), the electronic device performs the first operation. In some embodiments, in accordance with a determination that the fifth utterance includes (e.g., consisting of) the second number, the electronic device performs the second operation.

In some embodiments, the electronic device displays, via the display device, a second user interface (e.g., 1010) (e.g., an interface of a second application (e.g., a messaging application) that is different than the application of the first user interface; a user interface that is different from the first user interface) that includes a plurality of affordances (e.g., 1012A), including: a third affordance (e.g., 1012A5) at a third location (e.g., an area of the first user interface that encompasses (e.g., and is larger than) the first affordance) that, when selected, performs the first operation (e.g., the same operation as the first affordance of the first user interface); and a third text object (e.g., 1004A3) that includes the first text string (e.g., the same text string that is included in the first text object (e.g., "delete")) at or near the third location. In some embodiments, while displaying the third text object, the electronic device detects, via the microphone, a sixth utterance (e.g., 1001F). In some embodiments, in response to detecting the sixth utterance and in accordance with a determination that the sixth utterance includes (e.g., consisting of) the first text string (e.g., based on the content of the second utterance as determined via a natural language processing function (e.g., performed at the electronic device or performed at an external device (e.g., an NLP server)), the electronic device performs the first operation. In some embodiments, displaying a text object that provides a cue as to voice commands that can be used and which is persistent between different user interfaces provides additional options (e.g., voice control options) without cluttering the UI. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIGS. 11A-11D) are also applicable in an analogous manner to the methods described below/above. For example, methods 700, 900, 1300, and 1500 optionally includes one or more of the characteristics of the various methods described above with reference to method 1100. For brevity, these details are not repeated below.

FIGS. 12A-12J illustrate exemplary user interfaces for voice-based control of electronic devices, in accordance with some embodiments. In particular, FIGS. 12A-12J illustrate an exemplary electronic device, voice-based control scheme, and computerized method for providing attention-aware processing of voice commands. The user interfaces in these figures are used to illustrate the processes described below, including the processes in FIGS. 13A-13B.

Figure 12A:
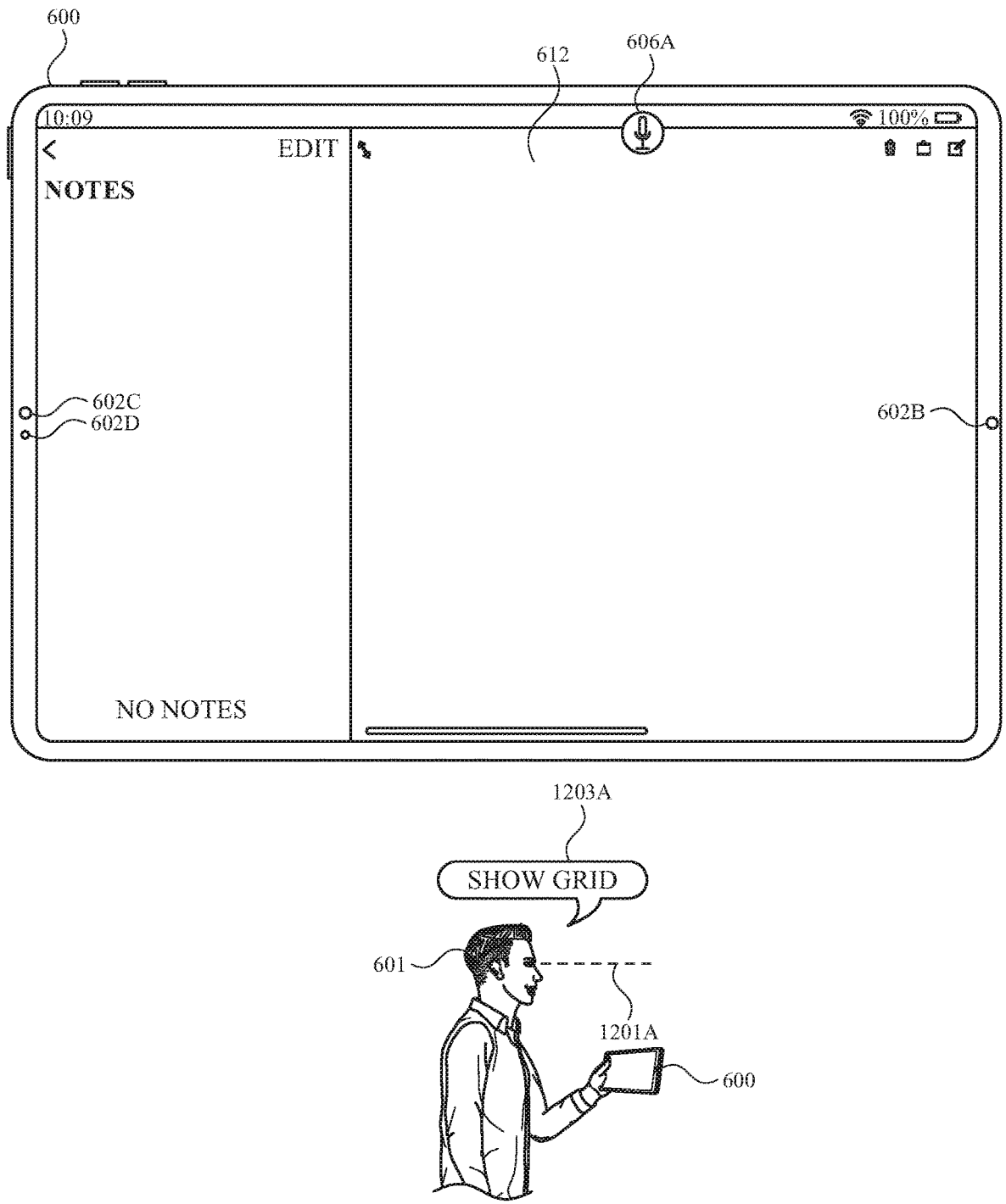
FIGS. 12A-12H illustrate exemplary user interfaces for voice-based control of electronic devices.
Figure 13A:
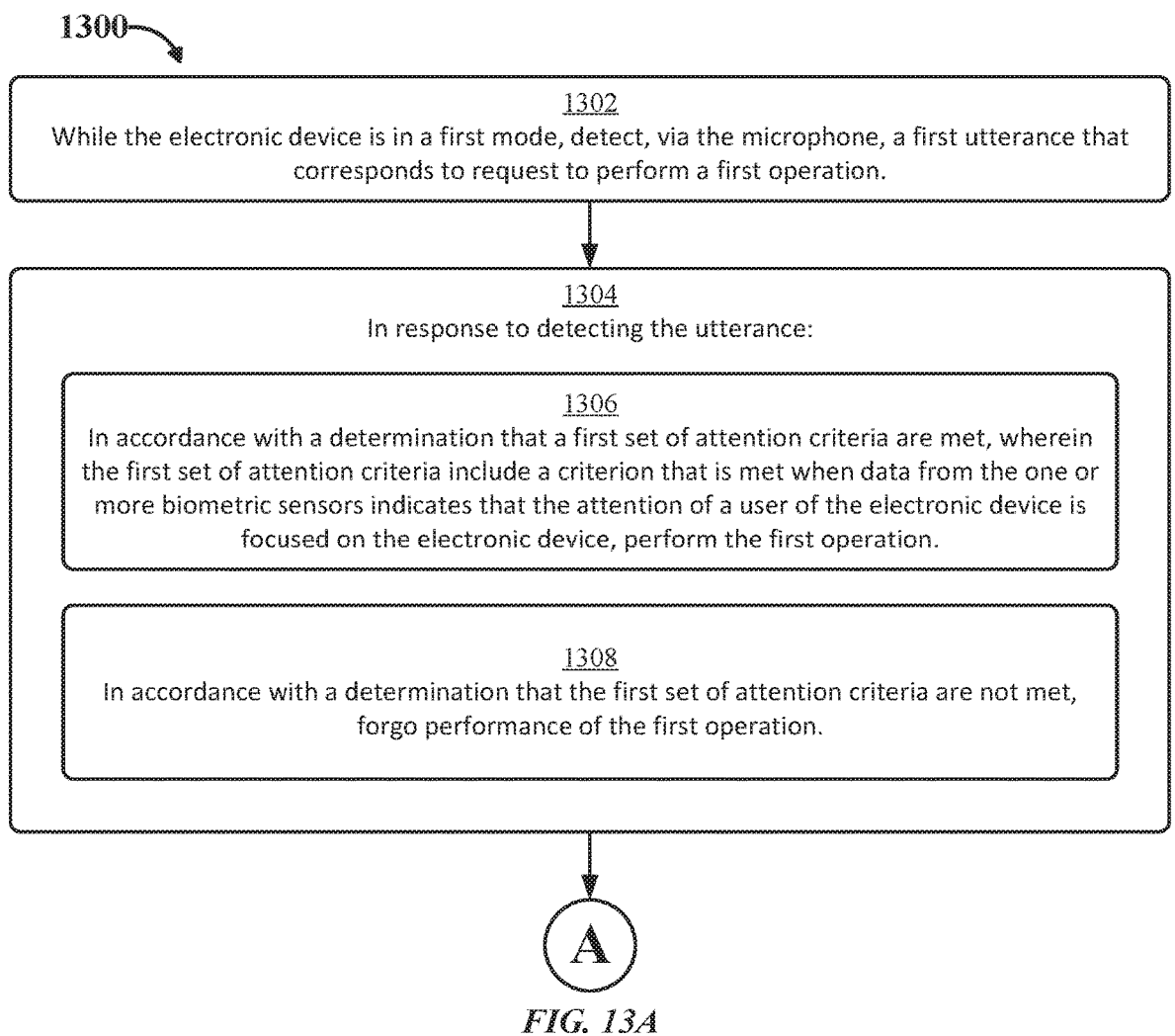
FIGS. 13A-13B is a flow diagram illustrating a method for voice-based control of electronic devices in accordance with some embodiments.
Figure 13B:
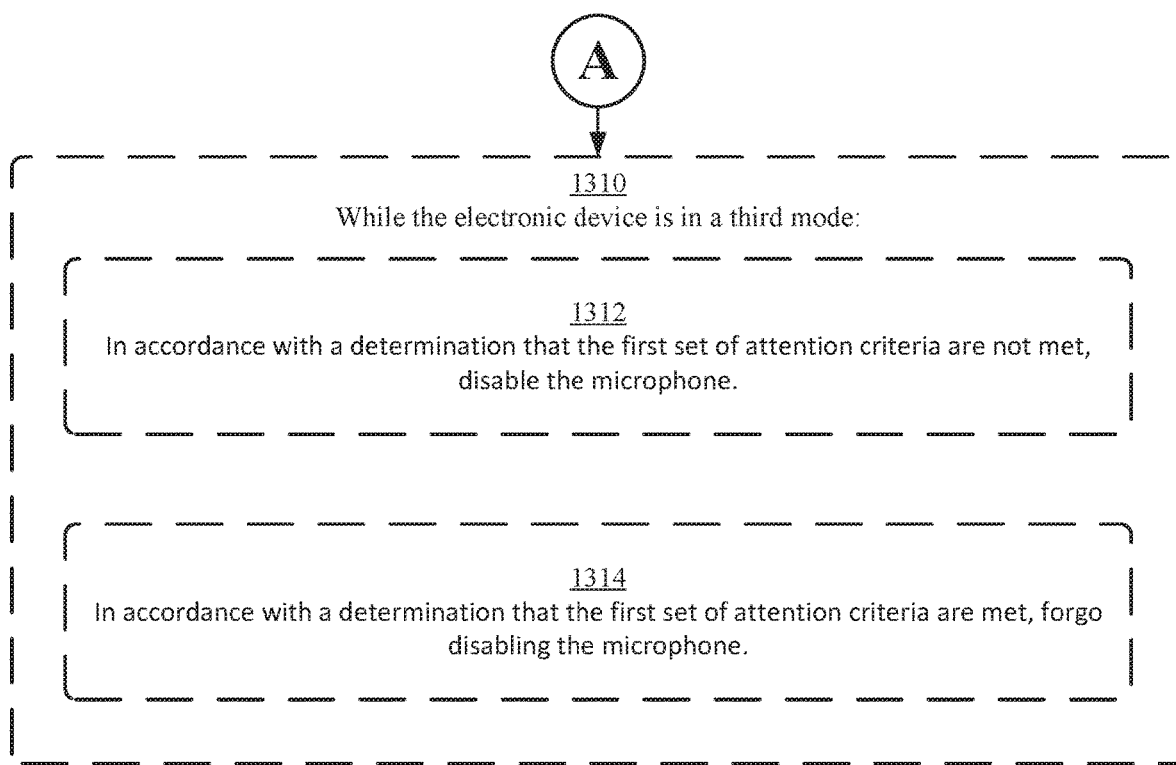

In FIG. 12A, a user 601 is interacting with a device 600. Device 600 displays notes user interface 612 and voice control icon 606 with visual state 606A, showing that voice inputs are currently being accepted and processed. User 601's gaze is diverted away from device 600, as indicated by gaze indication 1201A. In FIG. 12A, an attention awareness feature that requires detection of awareness to perform certain voice control functions is disabled, and thus, voice control icon 606 is displayed with a first visual state 606A, indicating that device 600 is capable of receiving voice commands, even though the user's gaze (an indicator of attention) is not directed at device 600. In some embodiments, device 600 does not, when the awareness requirement is disabled, determine (e.g., using camera 602C and/or depth camera 602D) whether the user's attention is directed at the electronic device. In some embodiments, device 600 does track the user's awareness (e.g., gaze), even when the awareness requirement is disabled.

In FIG. 12A device 600 detects, via microphone 602B, voice input 1203A ("SHOW GRID") and, in response, displays the grid shown in FIG. 6B.

Figure 12B:
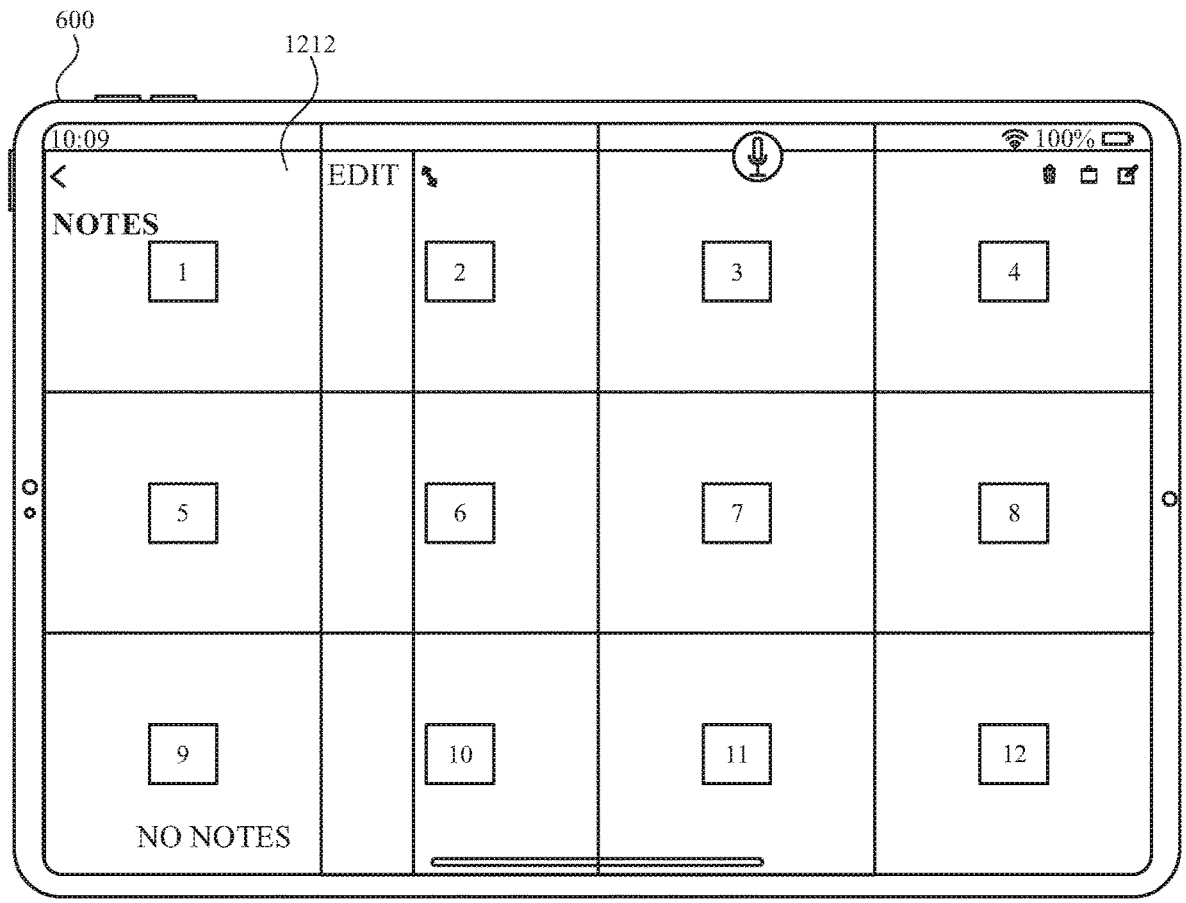
Figure 12B:
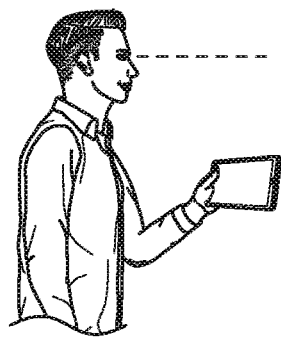

In FIG. 12B, device 600 displays, in response to input 1203A, notes user interface 612 with grid 1202 overlaid on the user interface.

Figure 12C:
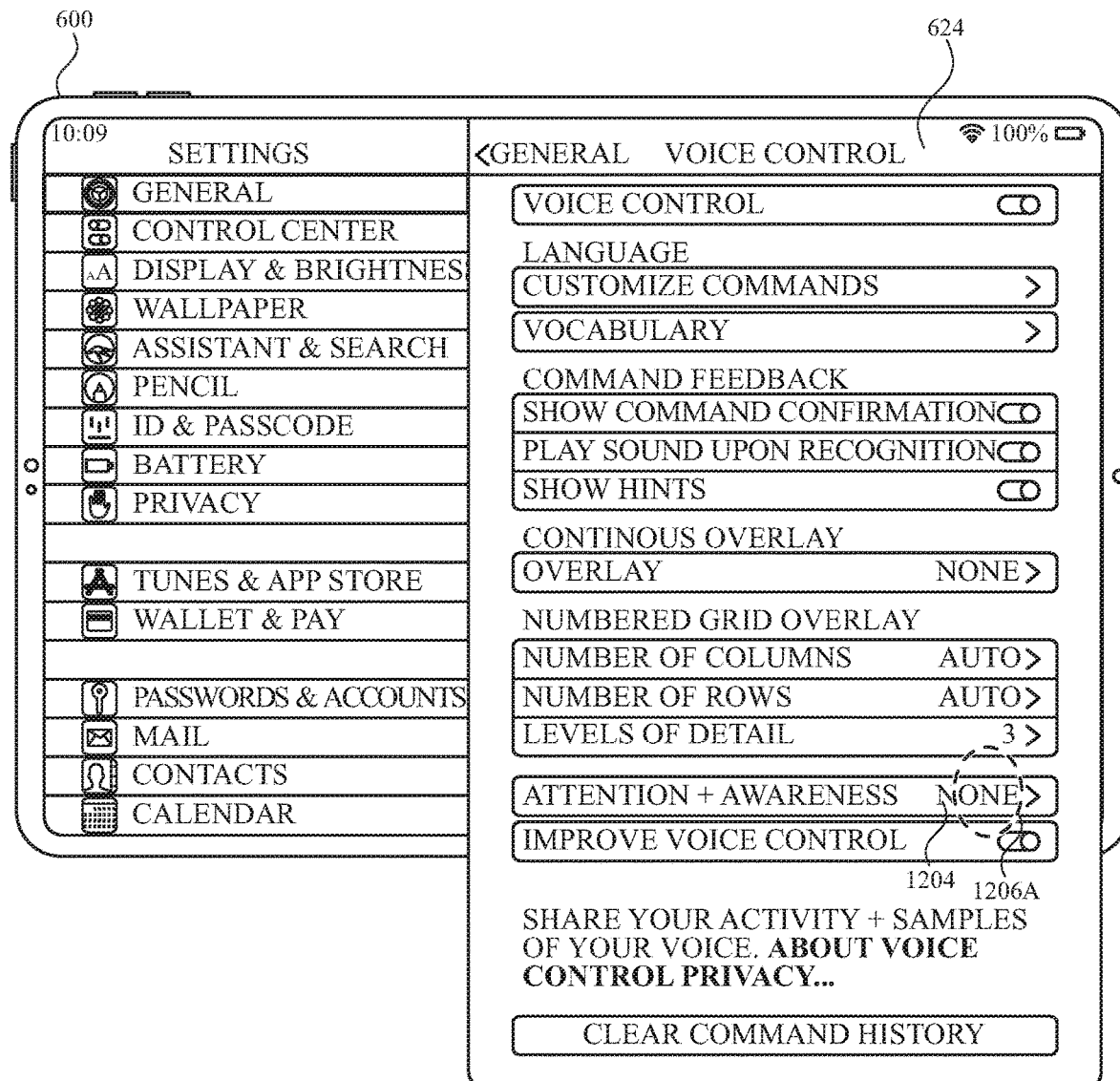

FIGS. 12C-12H show a process for enabling an attention awareness requirement and processing of voice commands while the requirement is enabled. In FIG. 12C, device 600 displays voice control settings interface 624, as described with respect to FIG. 6V. Interface 624 includes selectable region 1204 corresponding to attention and awareness options. As shown in FIG. 12C, region 1204 indicate that the attention and awareness feature is set to "none," indicating that no voice commands require attention awareness.

Figure 12D:
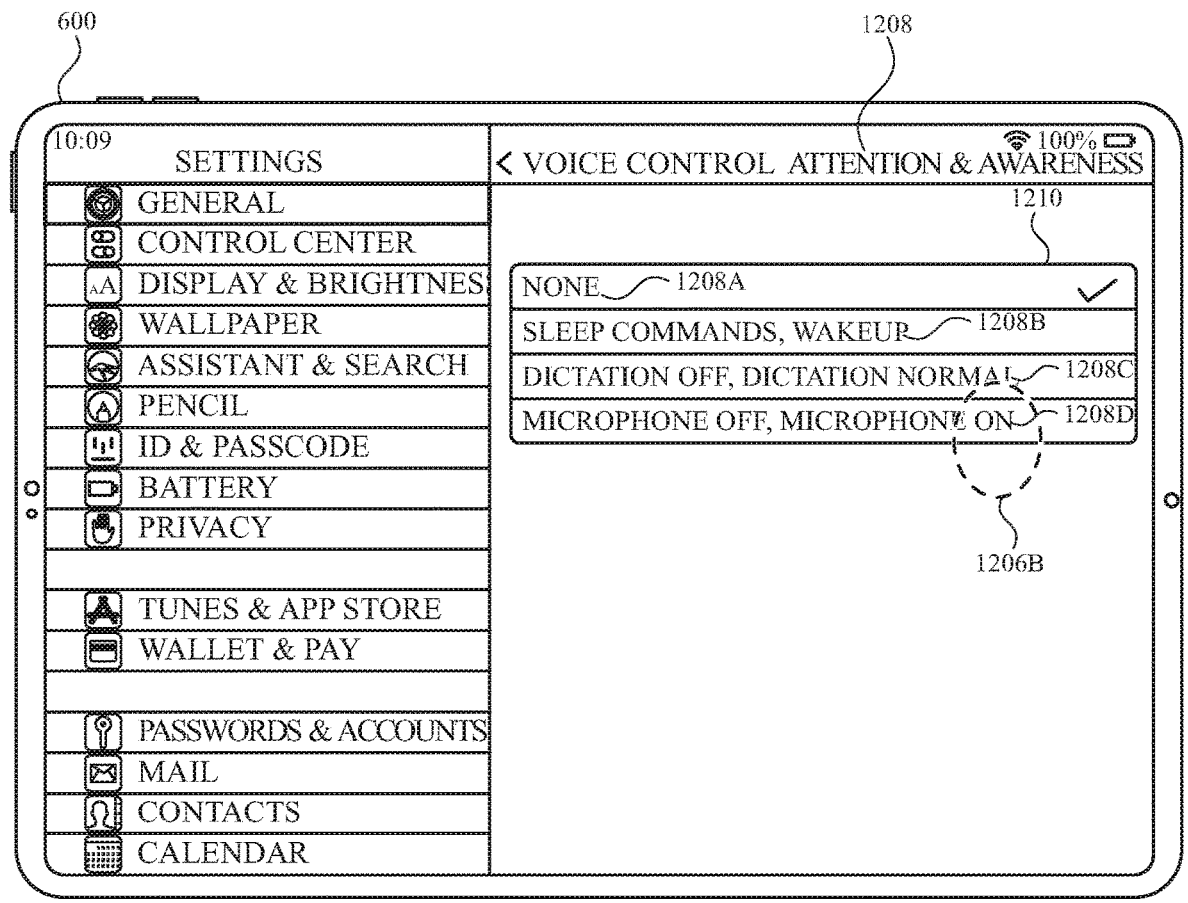

In FIG. 12C, device 600 detects, via touch-sensitive display 602A, a touch input 1206A (e.g., a tap gesture) and, in response, displays the user interface of FIG. 12D.

In FIG. 12D, device 600 displays attention and awareness interface 1208 that includes selectable regions 1208A-1208D and a checked indicator 1210, which indicates that attention and awareness are set to "none" (e.g., the option corresponding to selectable region 1208A is selected). Selectable region 1208B ("SLEEP COMMANDS, WAKEUP"), when selected, sets device 600 to state in which a wakeup command (e.g., a command to re-activate voice control after the function has been put to sleep; a command to wake up the device, after the device has been put to sleep) is only processed when attention is detected, whereas sleep commands (e.g., commands that put the voice command, or the device, to sleep) function even if attention is not detected. Selectable region 1208C ("DICTATION OFF, DICTATION ON"), when selected, sets device 600 to state in which a dictation inputs (e.g., voice-to-text) is only processed when attention is detected. Selectable region 1208D ("MICROPHONE OFF, MICROPHONE ON"), when selected, sets device 600 to state in which microphone(s) (e.g., 602B) are only on when attention is detected and are off (e.g., powered off) when attention is not detected. In some embodiments, the microphone(s) remain on, but received voice commands are ignored. In some embodiments, other combinations of attention-requiring and non-attention-requiring functions can be configured.

Figure 12E:
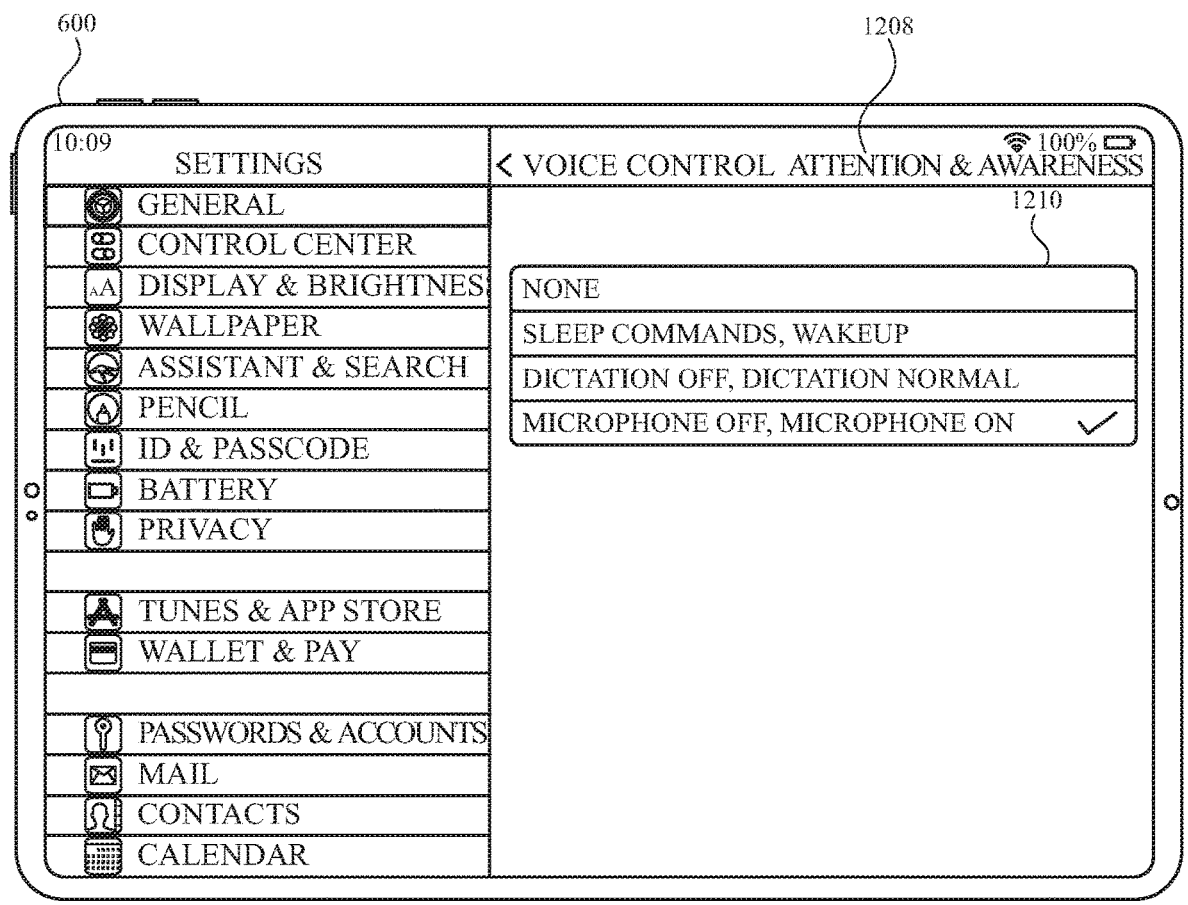

In FIG. 12D, device 600 detects, via touch-sensitive display 602A, a touch input 1206B (e.g., a tap gesture) on selectable region 1208D ("MICROPHONE OFF, MICROPHONE ON") and, in response, displays the user interface of FIG. 12E.

In FIG. 12E, device 600 displays user interface 1208 with checked indicator 1210 indicating that selectable region 1208D ("MICROPHONE OFF, MICROPHONE ON") is selected and device 600 is set to a state in which microphone(s) (e.g., 602B) are only on when attention is detected and are off (e.g., powered off) when attention is not detected.

Figure 12F:
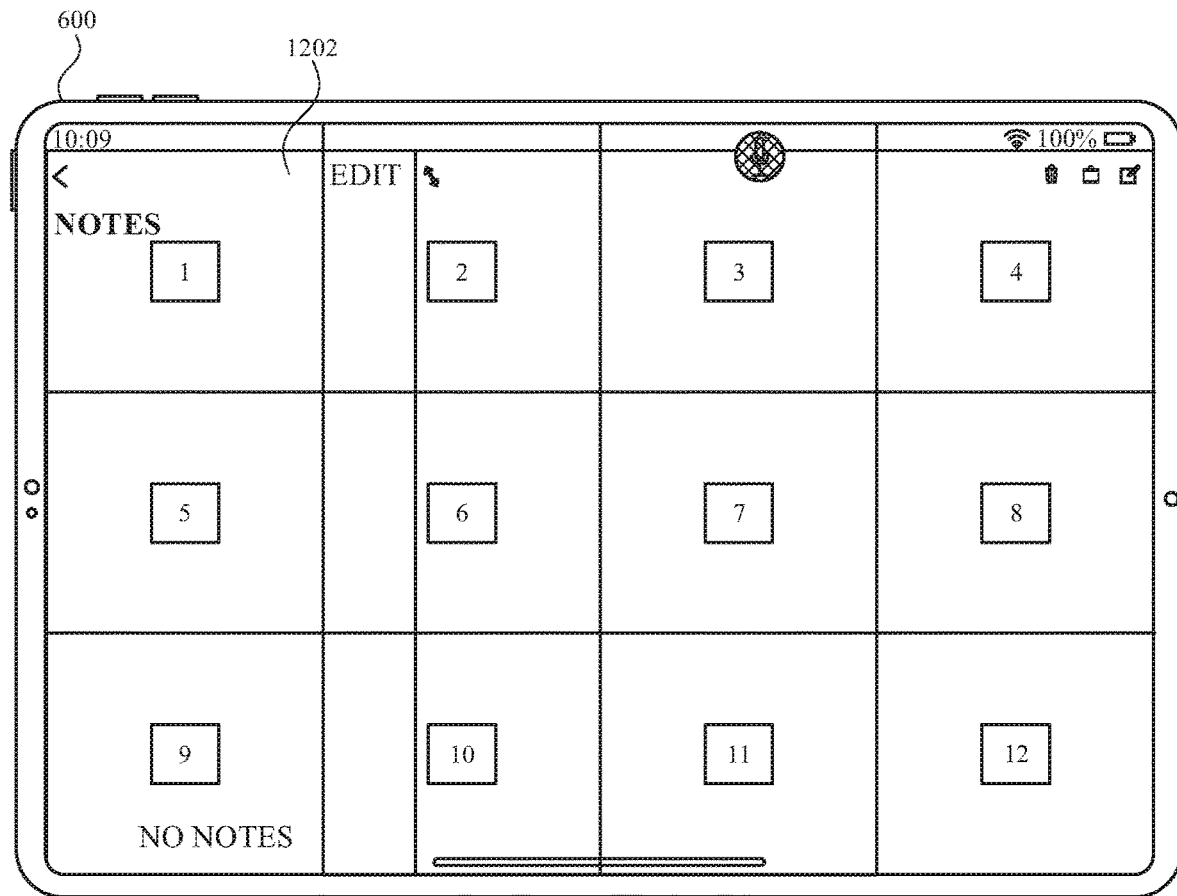
Figure 12F:
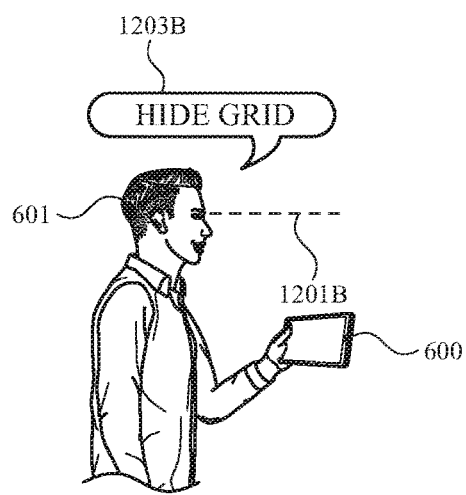

FIG. 12F shows device 600 re-displaying the user interface of FIG. 12B, after attention and awareness interface 1208 has been dismissed. User 601 continues to not gaze at device 600, as indicated by gaze indication 1201B. Because device 600 does not detect (e.g., with camera 602C or depth camera 602D) the user's attention, voice control icon 606 is displayed in a third state 606C (e.g., greyed out, darkened) to indicate that microphone 602B is off and that, consequently, voice inputs will not be received and process.

In FIG. 12F user 601 utters the command "HIDE GRID," but, because microphone 602B is off, device 600 does not respond by ceasing to display grid 1202.

Figure 12G:
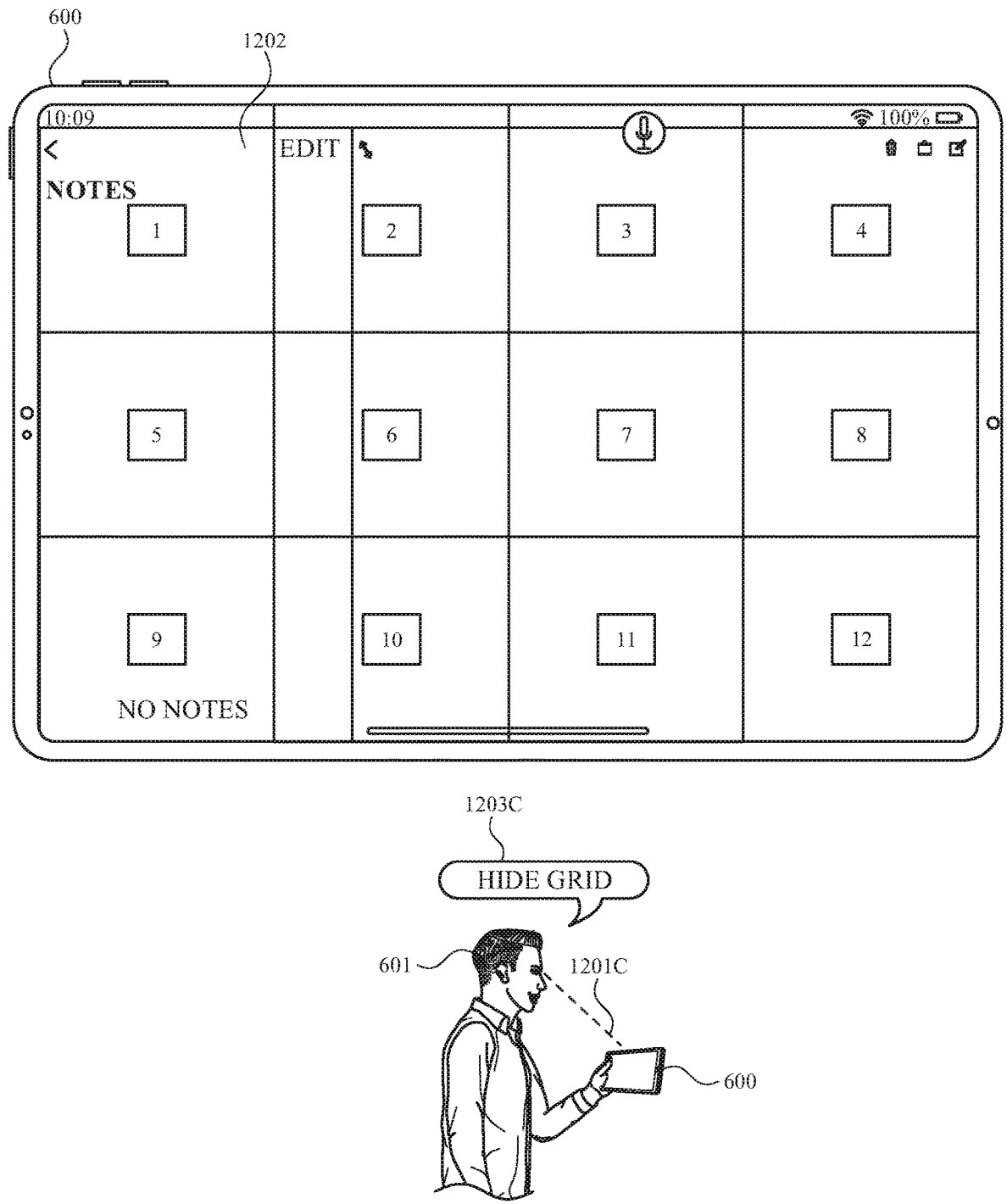

FIG. 12G shows device 600 after user 601 directs their gaze to device 600. Device 600 detects, via camera 602C and/or depth camera 602D, that the user's attention is focused on device 600. In response, device 600 displays voice control icon 606 in first state 606A, indicating that microphone 602B is active and that device 600 is capable of receiving voice commands.

Figure 12H:
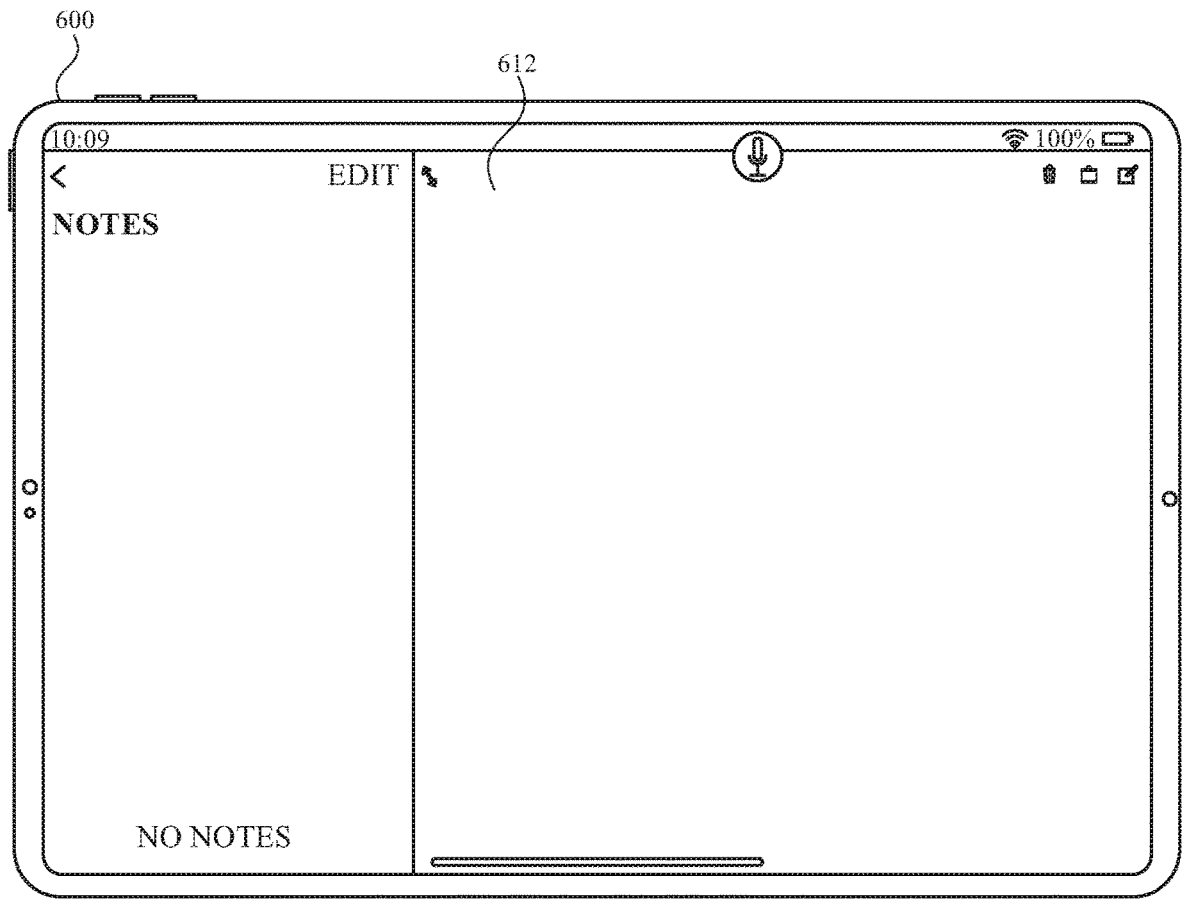
Figure 12H:
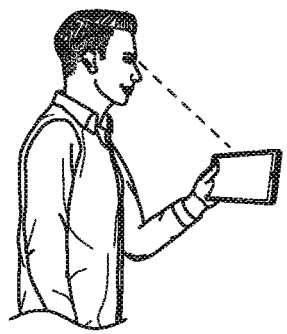

In FIG. 12G device 600 detects, via microphone 602B, voice input 1203C ("HIDE GRID") and, in response, displays ceases to display the grid, as shown in FIG. 12H.

In FIG. 12H, device 600 displays notes user interface 612, without a grid, after ceasing to display grid 1202.

FIGS. 13A-13B is a flow diagram illustrating a method 1300 for voice-control of electronic devices in accordance with some embodiments. Method 1300 is performed at a device (e.g., 100, 300, 500, 600) with a display device (e.g., 602A). Some operations in method 1300 are, optionally, combined, the orders of some operations are, optionally, changed, and some operations are, optionally, omitted.

As described below, method 1300 provides an intuitive way for voice-control of electronic devices. The method reduces the cognitive burden on a user for enlarging user interface elements, thereby creating a more efficient human-machine interface. For battery-operated computing devices, enabling a user to utilize user interface elements faster and more efficiently conserves power and increases the time between battery charges.

While the electronic device is in a first mode (e.g., as per FIG. 12G) (e.g., a mode in which voice commands are enabled; a first attention-aware voice command mode) the electronic device detects (1302), via the microphone (e.g., 602B), a first utterance (e.g., 1203C) (e.g., a spoken phrase, speech, a vocal input) that corresponds to request to perform a first operation (e.g., a first function, a function that can also be performed in response to a non-vocal input (e.g., an input via a keyboard, touch-surface, or pointer device (e.g., mouse)).

In response to (1304) detecting the utterance, in accordance with a determination that a first set of attention criteria are met (as per FIG. 12G), where the first set of attention criteria include a criterion that is met when data from the one or more biometric sensors indicates that the attention of a user of the electronic device is focused on the electronic device (e.g., the sensors detect that the user's gaze is directed at the device; the sensors detect that the user's face is turned towards the electronic device), the electronic device performs (1306) the first operation. In some embodiments, performing a voice-control operation only when attention criteria are met reduces the frequency of erroneous inputs. Reducing the frequency of erroneous inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting the utterance, in accordance with a determination that the first set of attention criteria are not met (e.g., as per FIG. 12F), the electronic device forgoes (1308) performance of the first operation.

In some embodiments, while the electronic device is in the first mode, the electronic device displays a graphical indication (e.g., 606) (e.g., an icon, a dynamic icon; an icon with an appearance that indicates whether the electronic device detects that a user's attention is focused on the electronic device). In some embodiments, in accordance with a determination that the first set of attention criteria are met, a first visual property (e.g., a background color, a foreground color, a predominate color) of the graphical indication is in a first visual state (e.g., 606A) (e.g., green). In some embodiments, in accordance with a determination that the first set of attention criteria are not met, the first visual property of the graphical indication is in a second visual state (e.g., 606C) (e.g., black, grey), different from the first visual state. In some embodiments, displaying an indication of whether voice-control is currently available provides improved visual feedback as to the state of the device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently In some embodiments, while the electronic device is in the first mode, the electronic device detects, via the microphone, a second utterance that corresponds to a request to perform a second operation. In some embodiments, in response to detecting the second utterance, in accordance with a determination that the second operation is an operation of a first type (e.g., an operation that does not require attention), the electronic device performs the second operation (e.g., performing the operation irrespective of whether the first set of attention criteria are met). In some embodiments, in response to detecting the second utterance, in accordance with a determination that the second operation is an operation of a second type (e.g., dictation commands per FIG. 12D) and that the first set of attention criteria are met, the electronic device performs the second operation. In some embodiments, in accordance with a determination that the operation is an operation of the second type (e.g., an operation that does require attention) and that the first set of attention criteria are not met, the electronic device forgoes performing the second operation. In some embodiments, the operation of the first type (e.g., sleep and wake operations) include operations selected from the group consisting of: an operation that transitions the electronic device to a second mode in which voice commands, other than a command to transition out of the second mode (e.g., a sleep mode), are not processed, an operation that includes disabling (e.g., switching off) the microphone, and an operation that transitions the electronic device from the second mode to the first mode (e.g., a wake command). In some embodiments, a text entry operation (e.g., a dictation operation) is an operation of the second type. In some embodiments, a non-text entry operation (e.g., operations other than dictation) is an operation of the first type. In some embodiments, all operations are operations of the second type (e.g., while in the second mode, any operation that can be requested via a voice command requires detecting attention).

In some embodiments, while the electronic device (1310) is in a third mode (e.g., as per FIGS. 12F and 12G) (e.g., wherein microphone operation requires detecting attention), in accordance with a determination that the first set of attention criteria are not met, the electronic device disables (1312) the microphone (e.g., powering down the microphone). In some embodiments, while the electronic device (1310) is in a third mode (e.g., wherein microphone operation requires detecting attention), in accordance with a determination that the first set of attention criteria are met, the electronic device forgoes (1314) disabling the microphone (e.g., maintaining the microphone in a power on state).

Note that details of the processes described above with respect to method 1300 (e.g., FIGS. 13A-13B) are also applicable in an analogous manner to the methods described below/above. For example, methods 700, 900, 1100, and 1500 optionally includes one or more of the characteristics of the various methods described above with reference to method 1300. For brevity, these details are not repeated below.

Figure 14A:
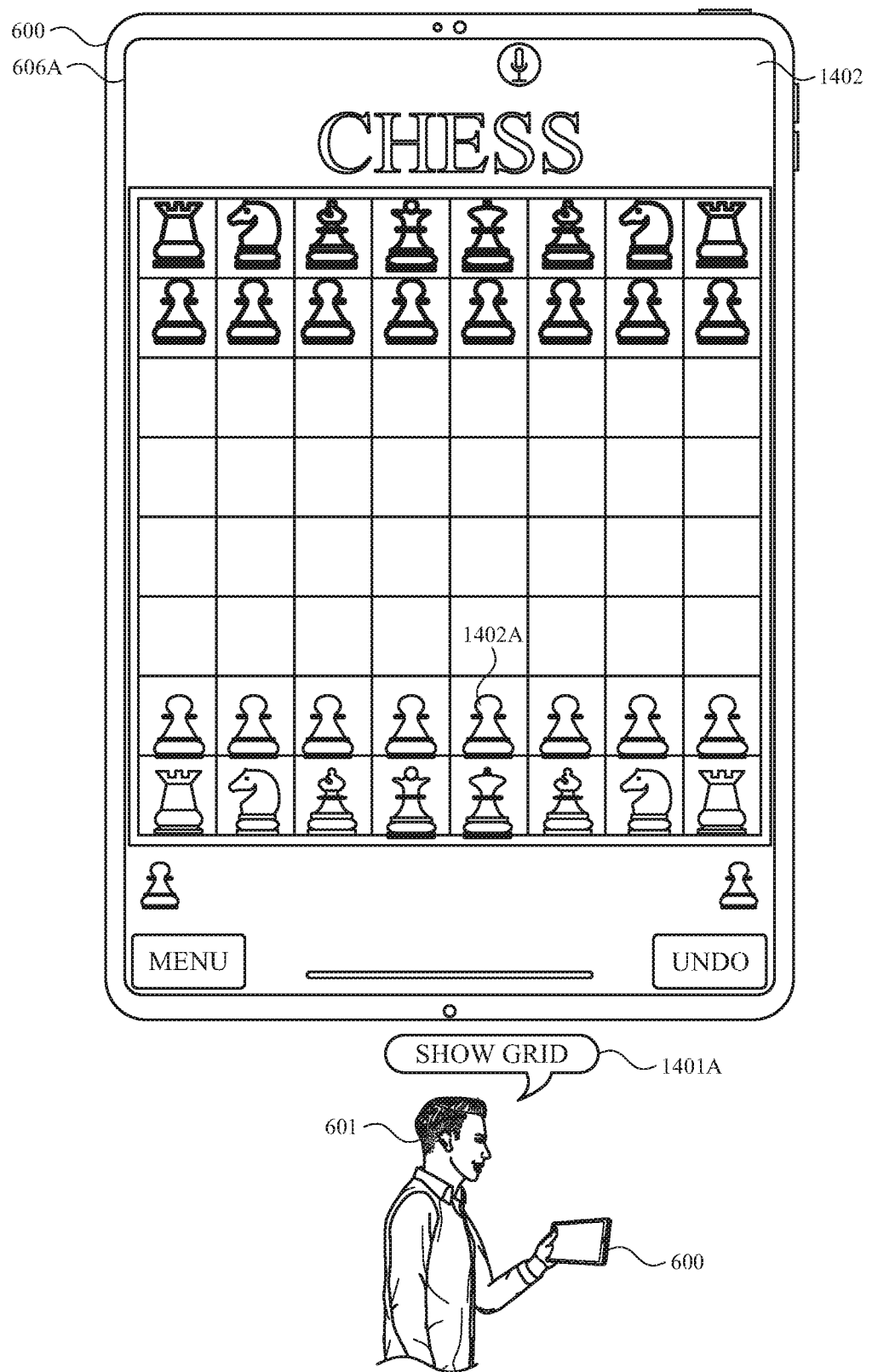
FIGS. 14A-14F illustrate exemplary user interfaces for voice-based control of electronic devices.

FIGS. 14A-114F illustrate exemplary user interfaces for voice-based control of electronic devices, in accordance with some embodiments. In particular, FIGS. 14A-14F illustrate an exemplary electronic device, voice-based control scheme, and computerized method adjusting and interacting with a visual grid using voice commands. The user interfaces in these figures are used to illustrate the processes described below, including the processes in FIGS. 15A-15D.

In FIG. 14A, a user 601 is interacting with a device 600, which is in a portrait orientation. Device 600 displays chess user interface 1402 with the voice control icon in state 606A indicating that device 600 is capable of receiving voice commands. Chess user interface 1402 includes multiple chess pieces 1402A, including pawn 1402A1, which user 601 wishes to move forward. Pieces 1402A can be moved using touch gestures (e.g., drag gestures) on touch-sensitive display 602A. In some embodiments, the application generating chess user interface 1402 does not provide the operating system of device 600 with sufficient information to display visual cues (e.g., number or name cues) correctly for all of the chess pieces.

Figure 14B:
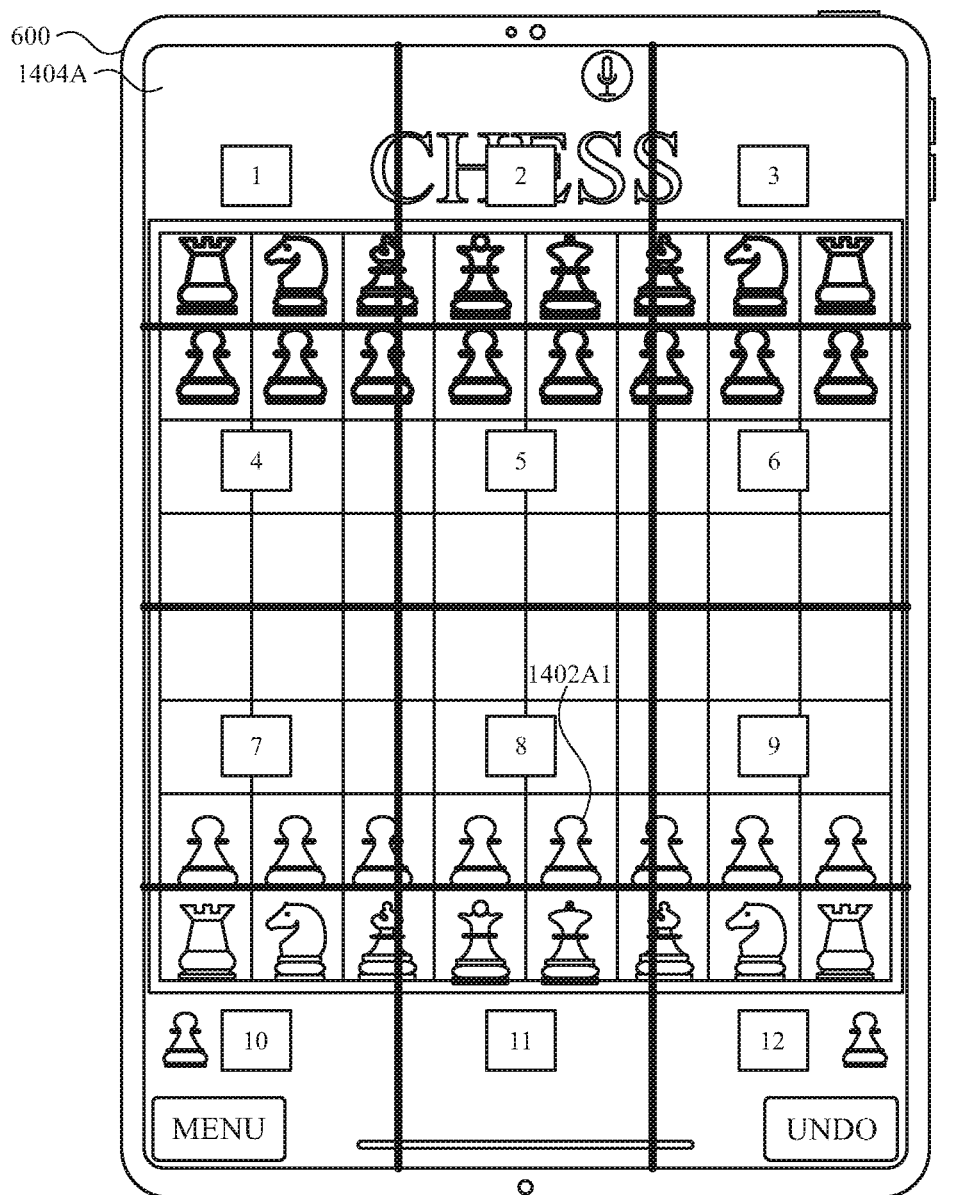

In FIG. 14A, device 600 detects, via microphone 602B, voice input 1401A ("SHOW GRID") and, in response, displays the grid shown in FIG. 14B.

In FIG. 14B, device 600 displays chess user interface 1402 with grid 1404A overlaid on the interface. Grid 1404A includes 12 numbered cell cues. In FIG. 14B, grid 1404 is displayed with an automatic (e.g., system-determined) number of columns (3) and rows (4), based on the portrait orientation of device 600. Pawn 1402A1 occupies a grid cell with multiple other pieces, making it difficult for user 601 to accurately identify pawn 1402A1 to device 600, using a voice command based on the cell visual cues.

Figure 14C:
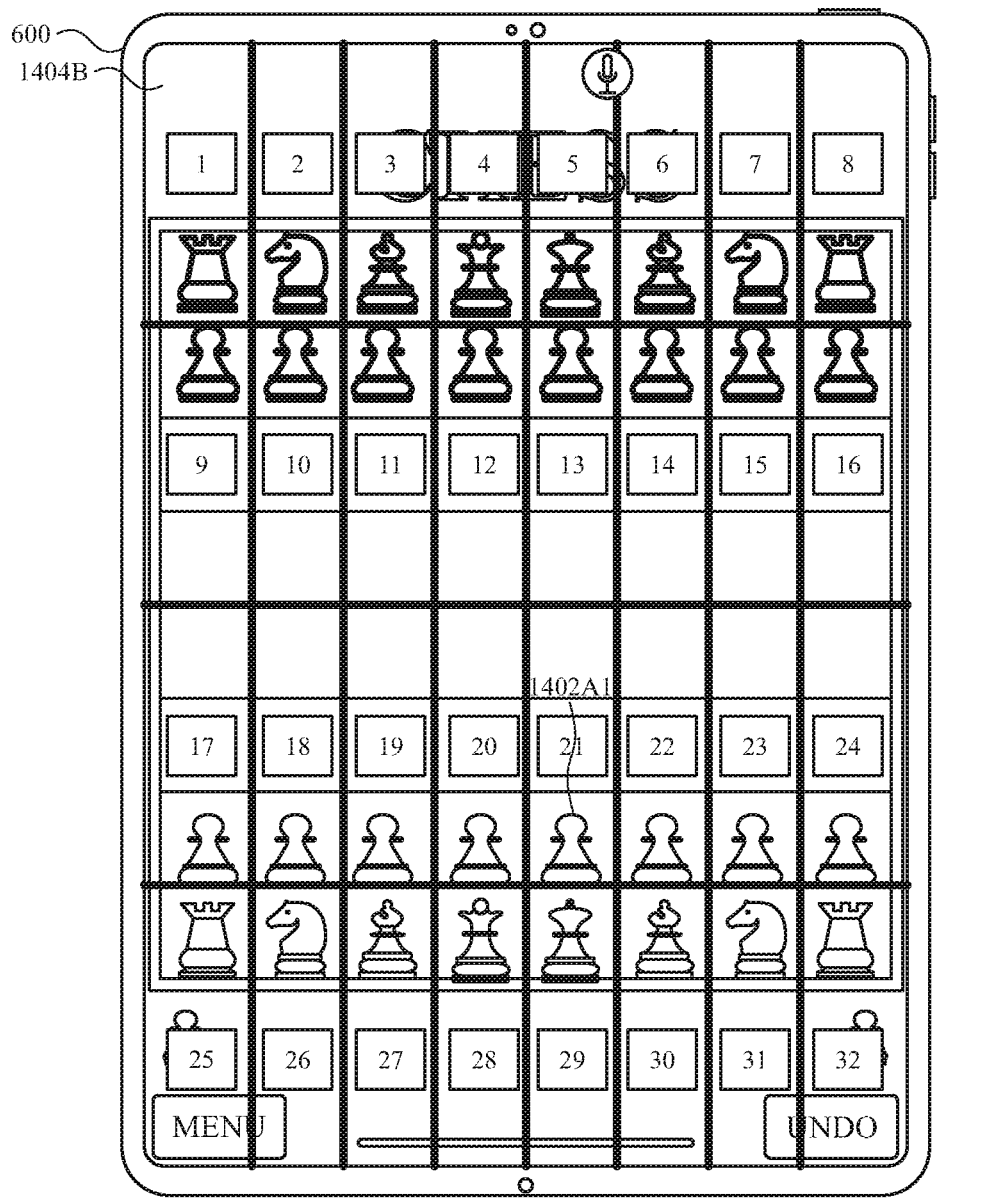
Figure 14C:
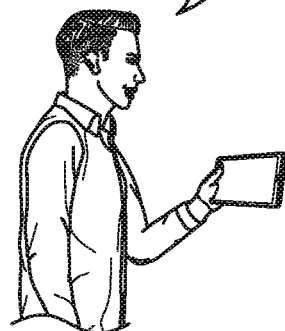

In FIG. 14B, device 600 detects, via microphone 602B, voice input 1401B ("SHOW GRID WITH EIGHT COLUMNS") and, in response, displays the modified grid shown in FIG. 14C.

In FIG. 14C, device 600 displays chess user interface 1202 with 8-column grid 1404B. Grid 1404B continues to have 4 rows and includes a total of 32 cell cues. While the columns now align to the columns of the chess board, pawn 1402A1 continues to occupy a grid cell with other pieces, due to the row configuration.

Figure 14D:
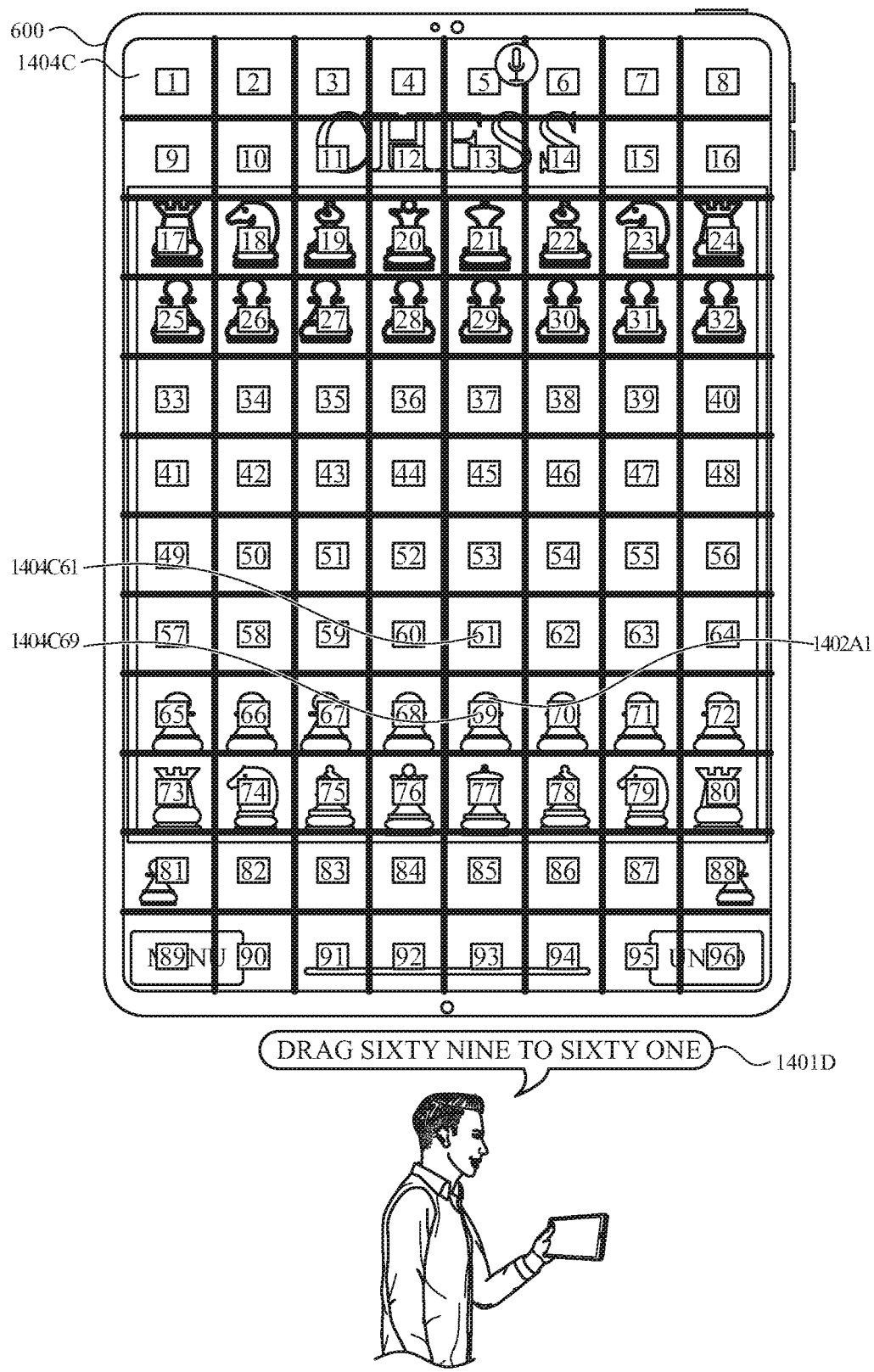

In FIG. 14C, device 600 detects, via microphone 602B, voice input 1401C ("SHOW GRID WITH TWELVE ROWS") and, in response, displays the modified grid shown in FIG. 14D.

In FIG. 14D, device 600 displays chess user interface 1202 with 8-column grid and 12-row grid 1404C. The cells of the grid include 96 numbered cell cues, including cell cue 1404C61 and cell cue 1404C69. Both the columns and the rows now align to the columns and rows, respectively, of the chess board. Pawn 1402A1 now solo occupies a grid cell that corresponds to cell cue 1404C69.

Figure 14E:
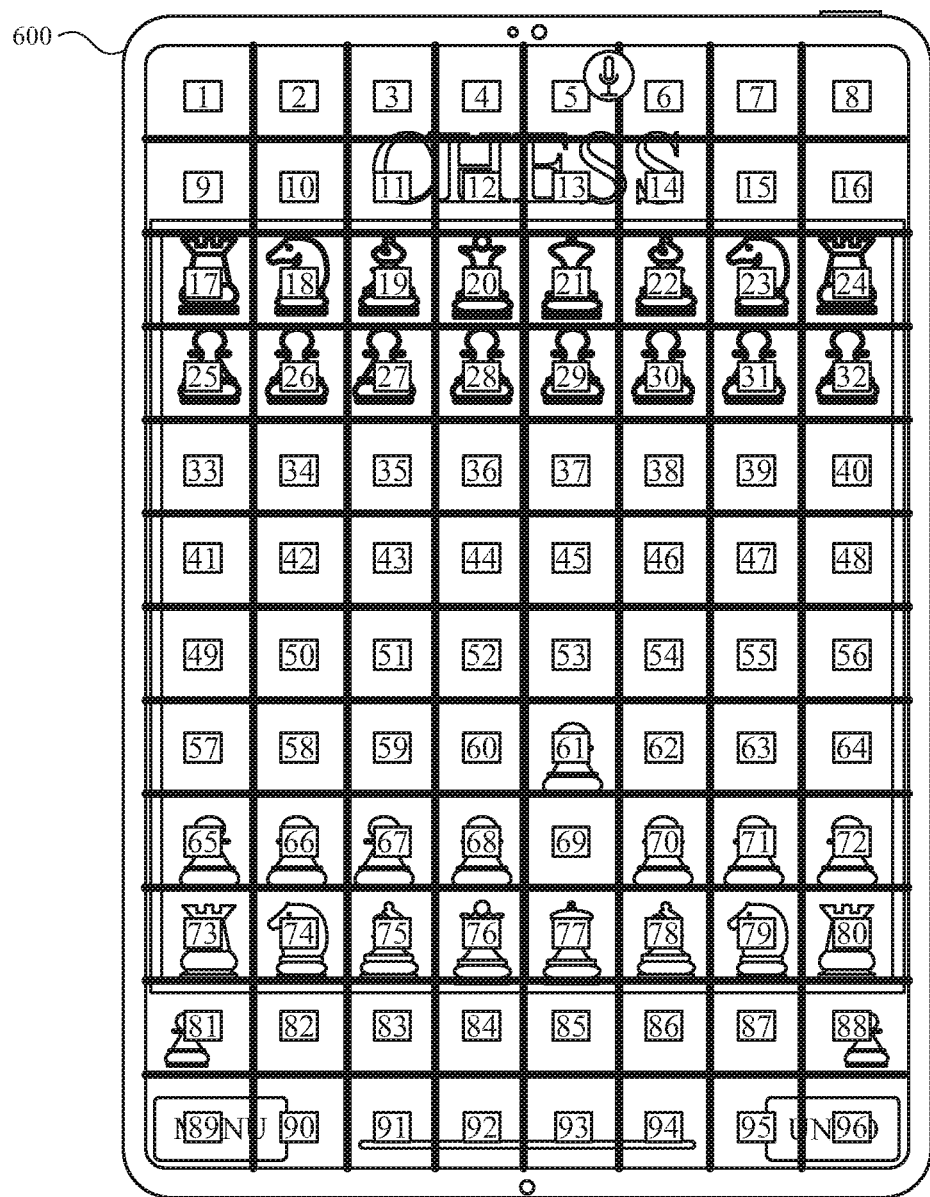
Figure 14E:
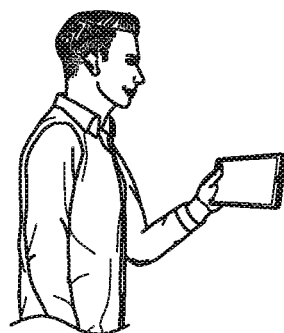

In FIG. 14D, device 600 detects, via microphone 602B, voice input 1401D ("DRAG SIXTY NINE TO SIXTY ONE"), which is processed as a request to simulate a drag gesture from the cell corresponding to cell cue 1404C69 to the cell corresponding to cell queue 1404C61 and, in response, displays the modified grid shown in FIG. 14E.

In FIG. 14E, pawn 1402A1 has been moved from the cell corresponding to cell cue 1404C69 to the cell corresponding to cell queue 1404C61. No other chess pieces have been moved as a result of the simulated drag gesture.

Figure 14F:
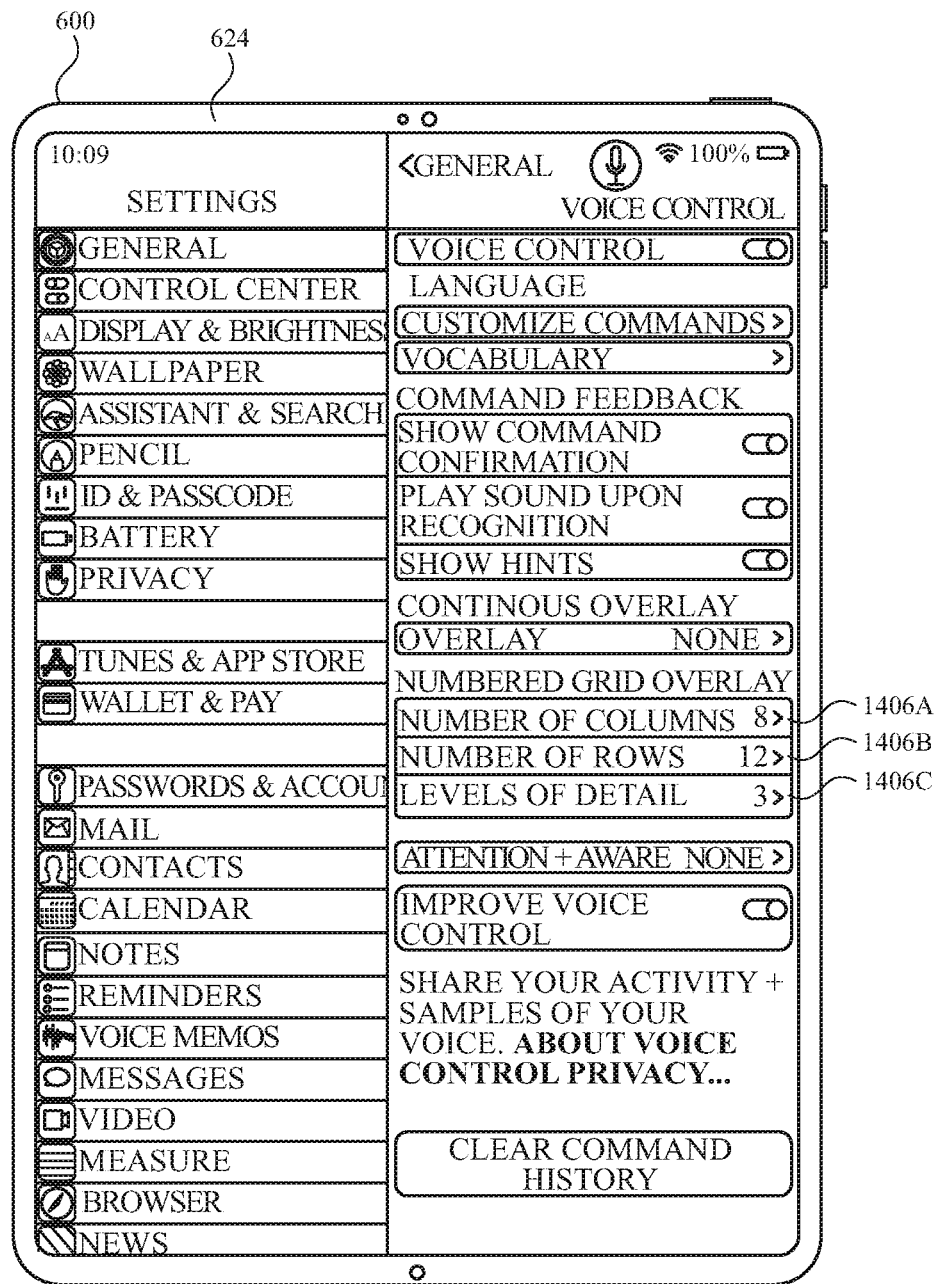
Figure 15A:
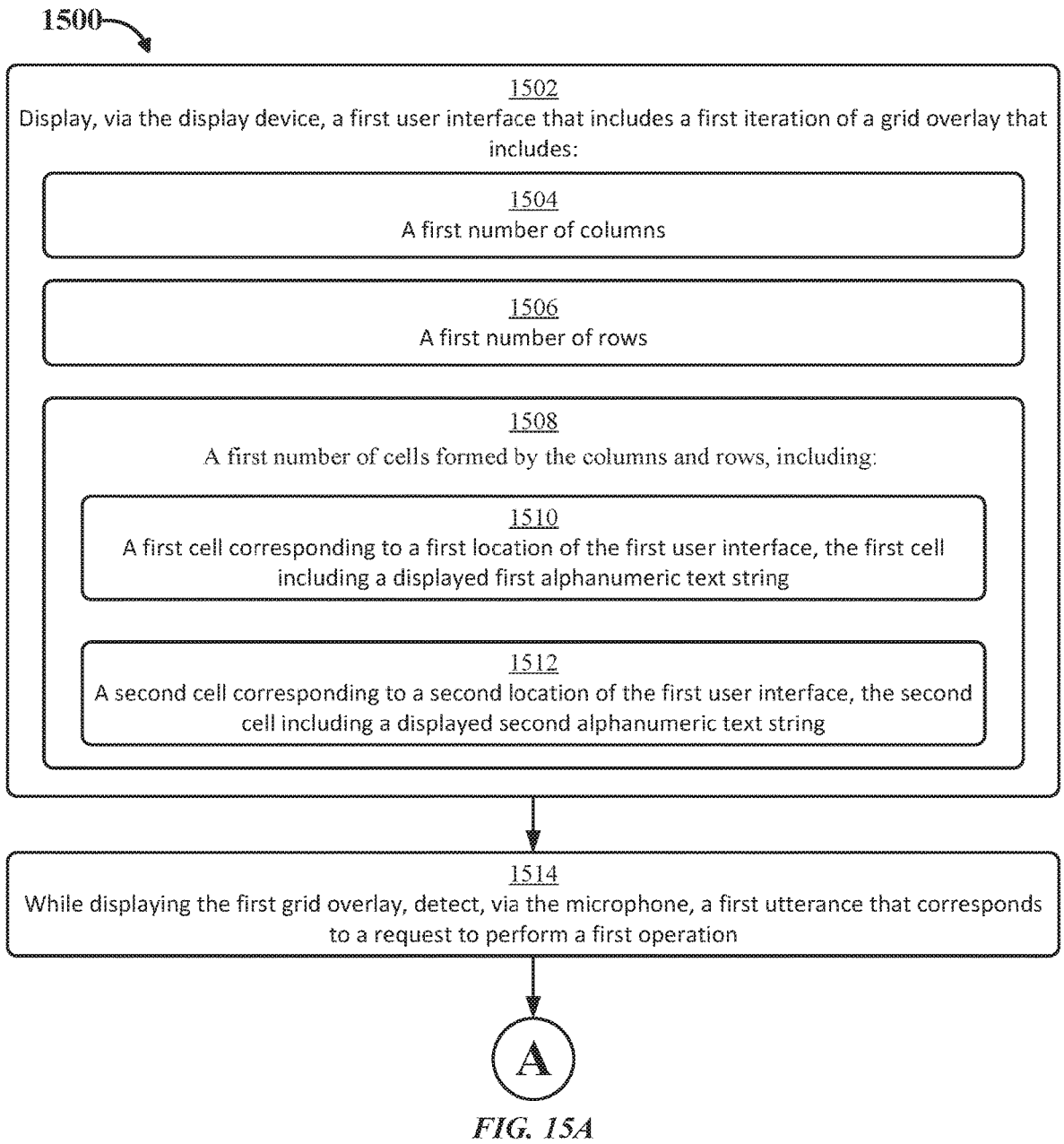
Figure 15B:
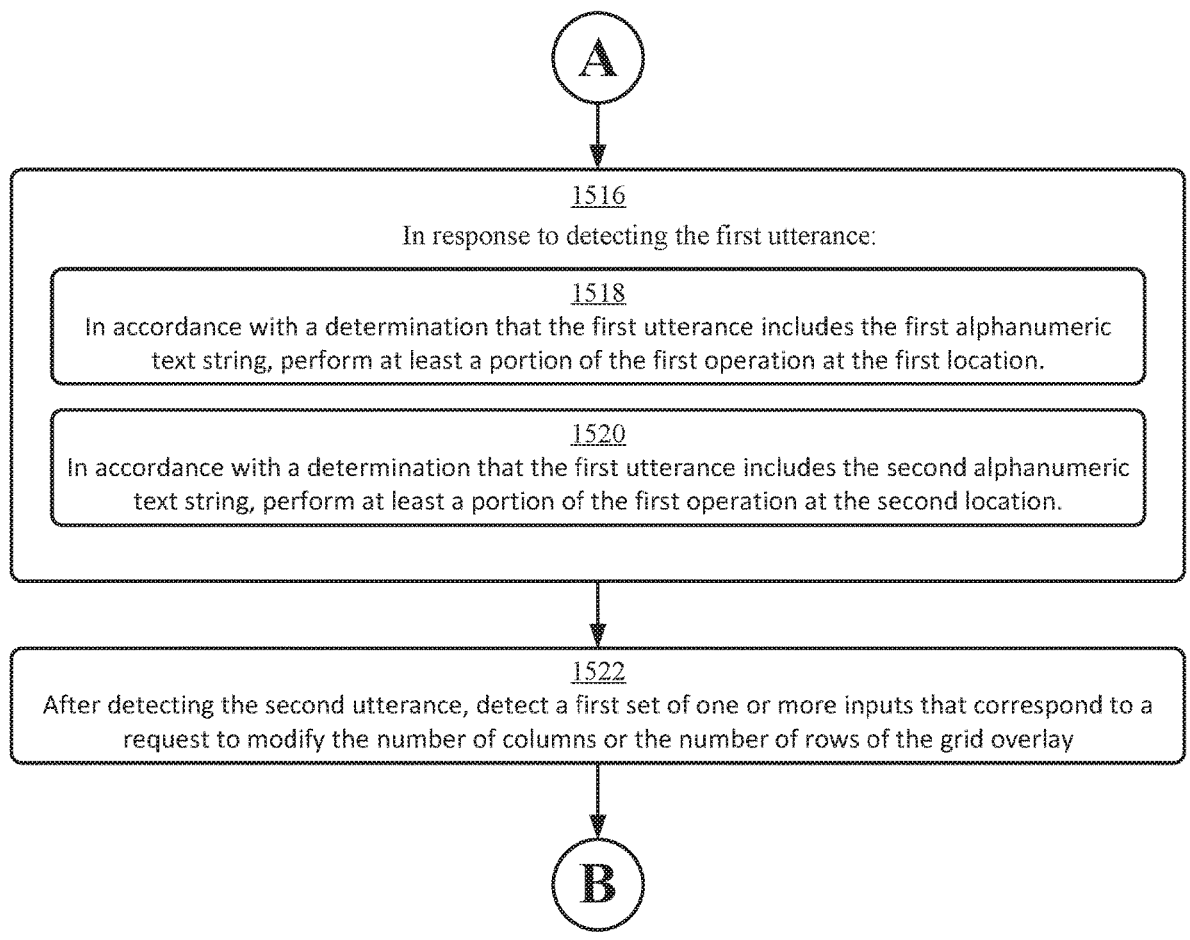
Figure 15D:
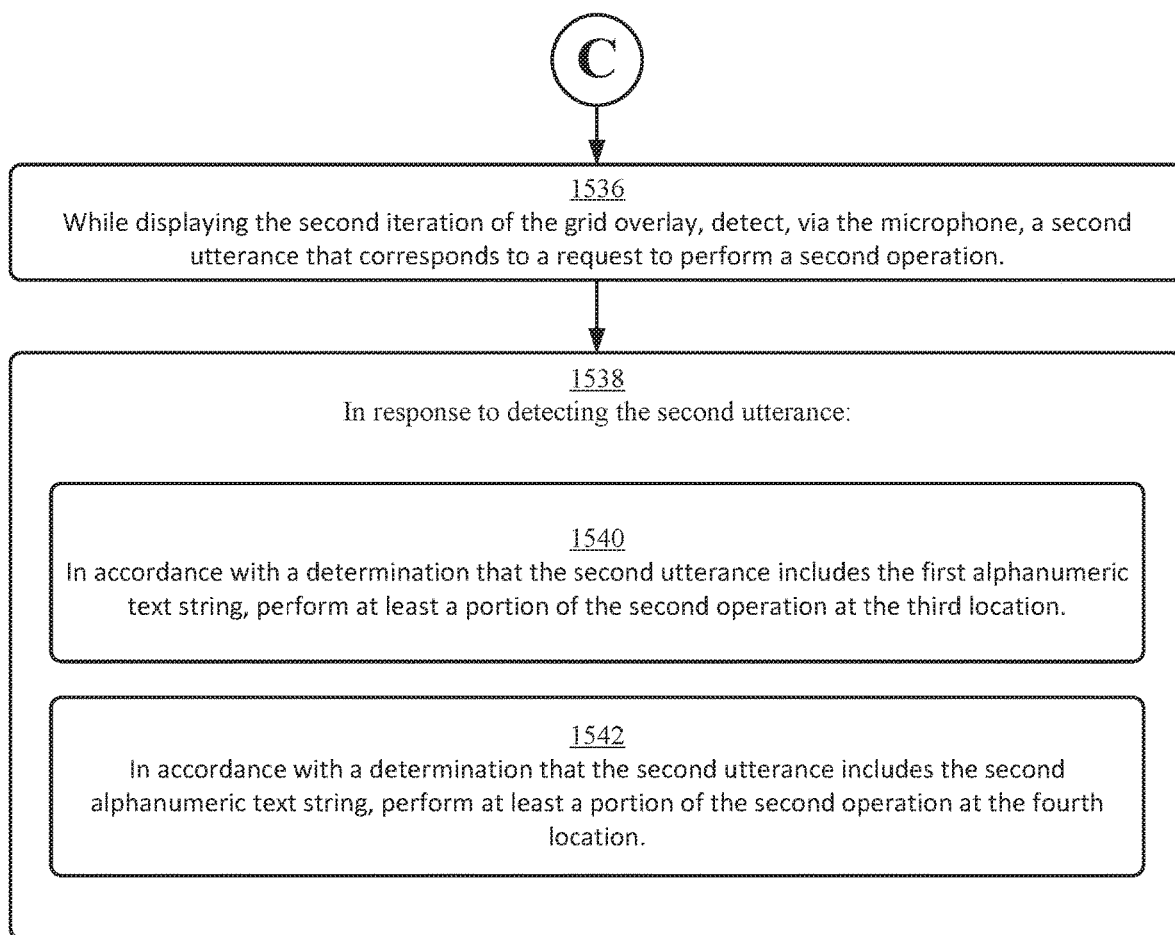

In FIG. 14F, device 600 displays voice control settings interface 624, as described with respect to FIGS. 6V and 12C. Interface 624 includes selectable regions 1406A-1406C corresponding to grid overlay options. Region 1406A indicates the current setting for columns of the grid overlay (e.g., 8 columns, or "auto" columns) and, when selected, initiates a process for modifying the number of columns. Region 1406b indicates the current setting for rows of the grid overlay (e.g., 12 rows, or "auto" rows) and, when selected, initiates a process for modifying the number of rows. Region 1406C indicates the current setting for levels of detail that grid overlay can be zoomed (e.g., as shown in FIGS. 6D and 6E), and, when selected, initiates a process for modifying the levels of detail for the grid overlay.

FIGS. 15A-15D is a flow diagram illustrating a method 1500 for voice-control of electronic devices in accordance with some embodiments. Method 1500 is performed at a device (e.g., 100, 300, 500, 600) with a display device. Some operations in method 1500 are, optionally, combined, the orders of some operations are, optionally, changed, and some operations are, optionally, omitted.

As described below, method 1500 provides an intuitive way for voice-control of electronic devices. The method reduces the cognitive burden on a user for enlarging user interface elements, thereby creating a more efficient human-machine interface. For battery-operated computing devices, enabling a user to utilize user interface elements faster and more efficiently conserves power and increases the time between battery charges.

The electronic device displays (1502) via the display device, a first user interface (e.g., 1402) (e.g., an interface of an application (e.g., a mail application)) that includes a first iteration (e.g., first version, first instance) of a grid overlay (e.g., 1404A) that includes: a first number of columns (1504); a first number of rows (1506); and a first number of cells (1508) formed by the columns and rows. The first number of cells formed by the columns and rows includes: a first cell (1510) corresponding to a first location of the first user interface, the first cell including a displayed first alphanumeric text string; and a second cell (1512) corresponding to a second location of the first user interface, the second cell including a displayed second alphanumeric text string. In some embodiments, the cells each include a displayed alphanumeric text string (e.g., "1") uniquely identifying the cell. In some embodiments, providing control options for adjusting a grid overlay for use with voice-control inputs reduces the number of inputs needed to perform voice-control operations. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently While displaying the first grid overlay, the electronic device detects (1514), via the microphone, a first utterance (e.g., 1401D) that corresponds to a request to perform a first operation (e.g., a swipe operation, a tap operation, a click operation; a location-dependent operation).

In response to (1516) detecting the first utterance, in accordance with a determination that the first utterance includes (e.g., consists of) the first alphanumeric text string (e.g., based on the content of the first utterance as determined via a natural language processing function (e.g., performed at the electronic device or performed at an external device (e.g., an NLP server); the first utterance includes a number that corresponds to the cell)), the electronic device performs (1518) at least a portion of the first operation at the first location. In some embodiments, the operation is a swipe operation that starts or ends at the first location.

In response to (1516) detecting the first utterance, in accordance with a determination that the first utterance includes (e.g., consists of) the second alphanumeric text string (e.g., based on the content of the first utterance as determined via a natural language processing function (e.g., performed at the electronic device or performed at an external device (e.g., an NLP server); the first utterance includes a number that corresponds to the cell)), the electronic device performs (1520) at least a portion of the first operation at the second location.

After detecting the first utterance, the electronic device detects (1522) a first set of one or more inputs (e.g., 1401B, 1401C) that correspond to a request to modify the number of columns or the number of rows of the grid overlay.

In response to detecting the first set of one or more inputs, the electronic device displays (1524) a second iteration of the grid overlay (e.g., 1404B) that includes: a second number of columns (1526) (e.g., the same as the first number, different than the first number); a second number of rows (1528) (e.g., the same as the first number, different than the first number); and a second number of cells (1530) formed by the columns and rows that is different from the first number of cells. The second number of cells formed by the columns and rows that is different from the first number of cells includes: a third cell (1532) corresponding to a third location of the first user interface different from the first location, the third cell including the displayed first alphanumeric text string (e.g., the same alphanumeric text string as displayed in the first cell); and a fourth cell (1534) corresponding to a fourth location of the first user interface different from the second location, the fourth cell including the displayed second alphanumeric text string (e.g., the same alphanumeric text string as displayed in the second cell).

While displaying the second iteration of the grid overlay, the electronic device detects (1536), via the microphone, a second utterance (e.g., 1401D) that corresponds to a request to perform a second operation (e.g., the same operation as the first operation; a different operation).

In response (1538) to detecting the second utterance, in accordance with a determination that the second utterance includes (e.g., consists of) the first alphanumeric text string (e.g., based on the content of the second utterance as determined via a natural language processing function (e.g., performed at the electronic device or performed at an external device (e.g., an NLP server); the second utterance includes a number that corresponds to the cell)), the electronic device performs (1540) at least a portion of the second operation at the third location.

In response to (1538) detecting the second utterance, in accordance with a determination that the second utterance includes (e.g., consists of) the second alphanumeric text string (e.g., based on the content of the second utterance as determined via a natural language processing function (e.g., performed at the electronic device or performed at an external device (e.g., an NLP server); the second utterance includes a number that corresponds to the cell)), the electronic device performs (1542) at least a portion of the second operation at the fourth location.

In some embodiments, the first set of one or more inputs includes a request to modify the number of rows of the grid overlay (e.g., 1401C). In some embodiments, the second number of rows is different from the first number of rows. In some embodiments, the first set of one or more inputs includes a request to modify the number of columns of the grid overlay (e.g., 1401B). In some embodiments, the second number of columns is different from the first number of columns.

In some embodiments, the first iteration of the grid overlay has a first number of levels of detail (e.g., levels of details that can be selected to progressively display reduced size versions of the grid overlay at a selected location to allow for identification that is more precise). In some embodiments, the first set of one or more inputs (e.g., selection of 1406C) includes a request to modify the number of levels of detail of the grid overlay. In some embodiments, the second iteration of the grid overlay has a second number of levels of detail that is different from the first number of levels of detail.

In some embodiments, the first set of one or more inputs includes one or more utterances (e.g., 1401C or 1401B). In some embodiments, the request to modify the grid overlay is an uttered request. In some embodiments, providing a voice-control option to modify the grid overlay provides additional control options. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of one or more inputs includes at least one input detected while displaying a grid overlay settings interface (e.g., 624) that includes at least a first affordance (e.g., 1406A) that, when selected, modifies the number of columns or the number of rows of the grid overlay. In some embodiments, the grid overlay is modified via a settings menu.

In some embodiments, the first operation is an operation that simulates a touch input response (e.g., simulates a swipe or a tap at a location).

Note that details of the processes described above with respect to method 1500 (e.g., FIGS. 15A-15D) are also applicable in an analogous manner to the methods described below/above. For example, methods 700, 900, 1100, and 1300 optionally includes one or more of the characteristics of the various methods described above with reference to method 1300.

For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve voice-control of electronic devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve voice-recognition. Accordingly, use of such personal information data enables users to improve voice-control of their electronic devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, voice-control of electronic devices or speech-recognition can be based on non-personal information data or a bare minimum amount of personal information, such as the content being requested by the device associated with a user, other non-personal information available to the content delivery services, or publicly available information.

What is claimed:

1. A non-transitory computer-readable storage medium storing one or more programs configured to be executed by one or more processors of an electronic device with a display device, a set of one or more biometric sensors, and a microphone, the one or more programs including instructions for:
  while the electronic device is in a first mode:
    detecting, via the one or more biometric sensors, a user gaze;
    determining whether the user gaze meets a first set of attention criteria, wherein the first set of attention criteria include a criterion that is met when data from the one or more biometric sensors indicates that the user gaze is focused on the electronic device;
    detecting, via the microphone, a first utterance that corresponds to request to perform a first operation;
    in accordance with a determination that the first set of attention criteria are met:
      displaying a graphical indication in a first visual state; and
      performing the first operation determined from the first utterance; and
    in accordance with a determination that the first set of attention criteria are not met:
      displaying the graphical indication in a second visual state, different from the first visual state; and
      forgoing performance of the first operation.

2. The non-transitory computer-readable storage medium of claim 1, wherein the one or more programs further include instructions for:
  while the electronic device is in the first mode, detecting, via the microphone, a second utterance that corresponds to a request to perform a second operation:
  in response to detecting the second utterance:
    in accordance with a determination that the second operation is an operation of a first type, performing the second operation;
    in accordance with a determination that the second operation is an operation of a second type and that the first set of attention criteria are met, performing the second operation; and
    in accordance with a determination that the operation is an operation of the second type and that the first set of attention criteria are not met, forgoing performing the second operation.

3. The non-transitory computer-readable storage medium of claim 2, wherein the operation of the first type include operations selected from the group consisting of:
  an operation that transitions the electronic device to a second mode in which voice commands, other than a command to transition out of the second mode, are not processed,
  an operation that includes disabling the microphone, and
  an operation that transitions the electronic device from the second mode to the first mode.

4. The non-transitory computer-readable storage medium of claim 2, wherein:
  a text entry operation is an operation of the second type; and
  a non-text entry operation is an operation of the first type.

5. The non-transitory computer-readable storage medium of claim 2, wherein all operations are operations of the second type.

6. The non-transitory computer-readable storage medium of claim 1, wherein the one or more programs further include instructions for:
  while the electronic device is in a third mode:
    in accordance with a determination that the first set of attention criteria are not met, disabling the microphone; and
    in accordance with a determination that the first set of attention criteria are met, forgoing disabling the microphone.

7. An electronic device, comprising:
  a display device;
  a set of one or more biometric sensors;
  a microphone;
  one or more processors; and
  memory storing one or more programs configured to be executed by the one or more processors, the one or more programs including instructions for:
    while the electronic device is in a first mode:
      detecting, via the one or more biometric sensors, a user gaze;
      determining whether the user gaze meets a first set of attention criteria, wherein the first set of attention criteria include a criterion that is met when data from the one or more biometric sensors indicates that the user gaze is focused on the electronic device;
      detecting, via the microphone, a first utterance that corresponds to request to perform a first operation;
      in accordance with a determination that the first set of attention criteria are met:
        displaying a graphical indication in a first visual state; and
        performing the first operation determined from the first utterance; and
      in accordance with a determination that the first set of attention criteria are not met:
        displaying the graphical indication in a second visual state, different from the first visual state; and
        forgoing performance of the first operation.

8. The electronic device of claim 7, wherein the one or more programs further include instructions for:
  while the electronic device is in the first mode, detecting, via the microphone, a second utterance that corresponds to a request to perform a second operation:
  in response to detecting the second utterance:
    in accordance with a determination that the second operation is an operation of a first type, performing the second operation;
    in accordance with a determination that the second operation is an operation of a second type and that the first set of attention criteria are met, performing the second operation; and
    in accordance with a determination that the operation is an operation of the second type and that the first set of attention criteria are not met, forgoing performing the second operation.

9. The electronic device of claim 8, wherein the operation of the first type include operations selected from the group consisting of:
  an operation that transitions the electronic device to a second mode in which voice commands, other than a command to transition out of the second mode, are not processed,
  an operation that includes disabling the microphone, and
  an operation that transitions the electronic device from the second mode to the first mode.

10. The electronic device of claim 8, wherein:
  a text entry operation is an operation of the second type; and
  a non-text entry operation is an operation of the first type.

11. The electronic device of claim 8, wherein all operations are operations of the second type.

12. The electronic device of claim 8, wherein the one or more programs further include instructions for:
while the electronic device is in a third mode:
in accordance with a determination that the first set of attention criteria are not met, disabling the microphone; and
in accordance with a determination that the first set of attention criteria are met, forgoing disabling the microphone.

13. A method comprising:
at an electronic device with a display device, a set of one or more biometric sensors, and a microphone:
while the electronic device is in a first mode:
detecting, via the one or more biometric sensors, a user gaze;
determining whether the user gaze meets a first set of attention criteria, wherein the first set of attention criteria include a criterion that is met when data from the one or more biometric sensors indicates that the user gaze is focused on the electronic device;
detecting, via the microphone, a first utterance that corresponds to request to perform a first operation;
in accordance with a determination that the first set of attention criteria are met:
displaying a graphical indication in a first visual state; and
performing the first operation determined from the first utterance; and
in accordance with a determination that the first set of attention criteria are not met:
displaying the graphical indication in a second visual state, different from the first visual state; and
forgoing performance of the first operation.

14. The method of claim 13, further comprising:
while the electronic device is in the first mode, detecting, via the microphone, a second utterance that corresponds to a request to perform a second operation:
in response to detecting the second utterance:
in accordance with a determination that the second operation is an operation of a first type, performing the second operation;
in accordance with a determination that the second operation is an operation of a second type and that the first set of attention criteria are met, performing the second operation; and
in accordance with a determination that the operation is an operation of the second type and that the first set of attention criteria are not met, forgoing performing the second operation.

15. The method of claim 14, wherein the operation of the first type include operations selected from the group consisting of:
an operation that transitions the electronic device to a second mode in which voice commands, other than a command to transition out of the second mode, are not processed,
an operation that includes disabling the microphone, and
an operation that transitions the electronic device from the second mode to the first mode.

16. The method of claim 14, wherein:
a text entry operation is an operation of the second type; and
a non-text entry operation is an operation of the first type.

17. The method of claim 14, wherein all operations are operations of the second type.

18. The method of claim 13, further comprising:
while the electronic device is in a third mode:
in accordance with a determination that the first set of attention criteria are not met, disabling the microphone; and
in accordance with a determination that the first set of attention criteria are met, forgoing disabling the microphone.

* * * * *